United States Patent
Gupte

(10) Patent No.: US 7,567,671 B2
(45) Date of Patent: Jul. 28, 2009

(54) ENCRYPTION METHOD AND APPARATUS FOR USE IN DIGITAL DISTRIBUTION SYSTEM

(76) Inventor: Aniruddha Gupte, 8053 N. 45th St., Brown Deer, WI (US) 53223

(*) Notice: Subject to any disclaimer, the term of this patent is extended or adjusted under 35 U.S.C. 154(b) by 817 days.

(21) Appl. No.: 11/150,526

(22) Filed: Jun. 10, 2005

(65) Prior Publication Data
US 2006/0280303 A1   Dec. 14, 2006

(51) Int. Cl.
| | |
|---|---|
| H04N 7/167 | (2006.01) |
| H04N 7/16 | (2006.01) |
| G06F 21/00 | (2006.01) |
| G06F 3/00 | (2006.01) |
| H04N 7/173 | (2006.01) |
| H04N 5/765 | (2006.01) |

(52) U.S. Cl. .......................... 380/239; 725/25; 725/44; 725/116; 705/52

(58) Field of Classification Search .................. 380/239
See application file for complete search history.

(56) References Cited

U.S. PATENT DOCUMENTS

| | | | |
|---|---|---|---|
| 6,069,952 A | 5/2000 | Saito et al. | |
| 6,282,653 B1 | 8/2001 | Berstis et al. | |
| 6,640,145 B2 | 10/2003 | Hoffberg et al. | |
| 6,714,921 B2 | 3/2004 | Stefik et al. | |
| 6,760,375 B2 | 7/2004 | Sugahara | |
| 6,763,065 B2 | 7/2004 | Sugahara | |
| 6,763,066 B2 | 7/2004 | Sugahara | |
| 6,795,500 B2 | 9/2004 | Sugahara | |
| 6,804,296 B2 | 10/2004 | Sugahara | |
| 6,804,297 B2 | 10/2004 | Sugahara | |
| 6,804,298 B2 | 10/2004 | Sugahara | |
| 6,816,549 B2 | 11/2004 | Sugahara | |
| 6,823,007 B2 | 11/2004 | Sugahara | |

(Continued)

FOREIGN PATENT DOCUMENTS

WO   WO 2005040987 A2 * 5/2005

OTHER PUBLICATIONS

J. Alex Halderman, Brent Waters, Edward W. Felten, "Privacy management for portable recording devices", Oct. 2004, WPES '04: Proceedings of the 2004 ACM workshop on Privacy in the electronic society, pp. 16-24.*

Primary Examiner—Matthew B Smithers
Assistant Examiner—Courtney D Fields
(74) Attorney, Agent, or Firm—Rahman LLC

(57) ABSTRACT

A method to securely distribute media content such as Audio or Video with associated media information as part of a media package, in a media distribution system. The media content is encrypted and can be decrypted using a code, process or algorithm called a program key which is further encrypted and stored in the media package as one or both of a service encrypted program key or a locally encrypted program key. When a payment arrangement is not required the program key can be obtained by decrypting the locally encrypted program key, but when a payment arrangement is required, the locally encrypted program key cannot be decrypted or is not present and the service encrypted program key must be decrypted using a decryption message provided by a server after the payment arrangement is made. Media content, the locally encrypted program key and the service encrypted program key are re-encrypted periodically to ensure the security of the media package.

23 Claims, 15 Drawing Sheets

U.S. PATENT DOCUMENTS

| | | |
|---|---|---|
| 6,834,156 B1 | 12/2004 | Marko et al. |
| 2003/0093792 A1 | 5/2003 | Labeeb et al. |
| 2003/0108336 A1 | 6/2003 | Schramel |
| 2003/0110130 A1 | 6/2003 | Pelletier |
| 2003/0140350 A1* | 7/2003 | Watkins et al. .............. 725/116 |
| 2003/0149621 A1 | 8/2003 | Shteyn |
| 2003/0316723 | 9/2003 | Stefik et al. |
| 2003/0206632 A1 | 11/2003 | Itoh et al. |
| 2003/0206720 A1 | 11/2003 | Abecassis |
| 2003/0221191 A1 | 11/2003 | Khusheim |
| 2004/0003397 A1 | 1/2004 | Boston et al. |
| 2004/0003404 A1 | 1/2004 | Boston et al. |
| 2004/0003413 A1 | 1/2004 | Boston et al. |
| 2004/0015993 A1 | 1/2004 | Yacenda |
| 2004/0015998 A1 | 1/2004 | Bokor et al. |
| 2004/0054630 A1 | 3/2004 | Ginter et al. |
| 2004/0073516 A1 | 4/2004 | Yamamichi et al. |
| 2004/0093615 A1 | 5/2004 | Boston et al. |
| 2004/0103305 A1 | 5/2004 | Ginter et al. |
| 2004/0220791 A1 | 11/2004 | Lamkin et al. |
| 2004/0220926 A1 | 11/2004 | Lamkin et al. |

* cited by examiner

| 102 Media Content |
|---|
| Movies |
| Television Programming |
| Music |
| Radio Programming |
| Sports Shows |
| Educational Courses |

Fig. 2

| 104 Media Information |
|---|
| 130 Unique Media Content ID |
| 131 Unique Media Package ID |
| Title |
| Description |
| List of actors |
| Writers |
| Director |
| Producer |
| Studio |
| Date of production |
| Presentation time (duration) |
| 132 Owner |
| 134 Cost |
| 134a Other Costs (e.g. Media Enhancements) |
| 136 Section flags |
| 138 Decryption information |
| 140 Link to additional information |
| 152 Digital Rights Rules |
| 176 Identifier of Media Enhancer |

Fig. 3

136 Section Flags

Section Data 172a
    Section Information 174a
        Identifier 176
        Cost 178a
    Section Information 174aa
        Identifier 176a
Section Data 172b
    Section Information 174b
        Identifier 176
        Cost 178b
    Section Information 174ba
        Identifier 176a

•
•
•

Section Data 172n
    Section Information 174n
        Identifier 176
        Cost 178 n
    Section Information 174na
        Identifier 176a

Fig. 4

| 330 Contents | |
|---|---|
| 160 e-PVR Information<br>    Account Number<br>    Serial Number<br>    Geographical location information<br>332 Owner ID<br>333 User List<br>    334 Preferences/Profiles<br>340 Common Local Library<br>    339 MAC Address List<br>    337 Local Hardware Identifiers List | Stored media package 306<br>Stored media package 306a<br>•<br>•<br>•<br>Stored media package 306n |
| 345 Local Security Database<br>Internet Addresses<br>    Distribution Service 120<br>    General Purpose Server 378<br>    Informative Message Server 380<br>    Streaming Video Source 382<br>Key List | Stored Informative Message Package 316<br>•<br>•<br>•<br>Stored Informative Message Package 316n |

Fig. 10

| 430 Decryption Request Message |
| --- |
| 160 Portion of e-PVR Information |
| 130 Media Content ID |
| 304 Portion of Media Information |
| 212 Service Decryption Information Service |
| 210 Encrypted Program Key |
| 200 Program Key |
| 434 User Payment or User Credit |
| 432 Decryption Flag |

Fig. 12

| 440 Decryption Message |
| --- |
| 442 Decryption Description |
|     Decryption Code |
|     Decryption Algorithm |
|     Decryption Process |
| 300 Program Key |

Fig. 13

| 450 Re/Encryption Message |
|---|
| 442 Decryption Description |
|     Decryption Code |
|     Decryption Algorithm |
|     Decryption Process |
| 454 Re/Encryption Description |
|     Decryption Code |
|     Decryption Algorithm |
|     Decryption Process |
| 452 Content Re/Encryption Description |
|     Decryption Code |
|     Decryption Algorithm |
|     Decryption Process |
| 130 Media Content ID |
| 210 Service Encrypted Program Key |
|     Encryption Code |
|     Encryption Algorithm |
|     Encryption Process |
| 212 Service Decryption Information |
| 210 Service Encrypted Program Key |
|     Encryption Code |
|     Encryption Algorithm |
|     Encryption Process |
| 210a New Service Encrypted Program Key |
|     Encryption Code |
|     Encryption Algorithm |
|     Encryption Process |
| 212 Service Decryption Information |
| 212a New Service Decryption Information |
| 472 Encryption Flag |

Fig. 14

| 460 Information Request Message |
|---|
| e-PVR Information 160 |
| Media Content ID 130 |
| Media Information 104 |
| Recording Information 462<br>    Date/Time of Broadcast<br>    Channel Information<br>    Other Information |

Fig. 15

| 470 Information Message |
|---|
| Media Information 104<br>    Media Content ID 130<br>    Owner 132<br>    Cost 134<br>    Section Flags 136 |

Fig. 16

| 480 Encryption Request Message |
|---|
| e-PVR Information 160 |
| Media Content ID 130 |
| Service Decryption Information 212 |
| Service Encrypted Program Key 210 |
| Program Key 200 |
| Encryption Flag 472 |

Fig. 17

| 490 Button List ||
|---|---|
| Alphnumeric Code | Button |
| 1 | Select |
| 2 | Enter |
| 3 | # |
| 4 | ▲ |
| 5 | ◄ |
| 6 | ► |
| 7 | ▼ |
| ... | ... |

Fig. 18

| 492 Instructions ||
|---|---|
| Persistence Flag 494 ||
| Alphnumeric Code | Action |
| 1 | Action 1 |
| 252+323 | Action 2 |
| 33/10 | Action 3 |
| 41 | Action 4 |
| ... | ... |

Fig. 19

ENCRYPTION METHOD AND APPARATUS FOR USE IN DIGITAL DISTRIBUTION SYSTEM

CROSS REFERENCE TO RELATED APPLICATIONS

This application is related to a previous invention Disclosure Document No: 547568 filed with the US Patent and Trademark Office on Feb. 18, 2004 and entitled "A System For And Various Business And Technical Methods For Storing and Distributing Motion Picture Content".

STATEMENT REGARDING FEDERALLY SPONSORED RESEARCH OR DEVELOPMENT

Not applicable.

BACKGROUND OF THE INVENTION

There are now on the market many products and services that present video and audio content to a user. These range from cable television, pay-per-view subscriptions, video on-demand, conventional video tape recorders (VCR's), digital video disks (DVD's), and more recently personal video recorders (PVRs). In the case of the PVR a user can conveniently record a television program from a cable or broadcast channel for play back at a later time. In fact the user can replay the recorded program as many times as they like.

PVRs are typically a microprocessor coupled to a large disk drive (e.g. in excess of 80 GB), a video presentation chip, a cable TV or broadcast tuner, and coordinating software to record and play back video content. PVRs are available from several companies, but in fact almost any contemporary personal computer can be configured to be a PVR. PVRs have become ever more popular for several reasons. First of course is the convenience of being able to record a program, even while watching another, and to play it back again. Another popular feature is the ability of viewers to fast forward through segments they do not want to watch. This is frequently done to skip over commercials or advertisements, and this has concerned many companies that pay to have their commercials aired during a show and therefore are paying to present the video content that was broadcast.

Another feature of some PVRs is the ability for their owners to duplicate the saved video content using a conventional DVD "burner" or recorder or to add an ancillary disk drive and then later remove it. When this is done the user can share video content on the DVD or disk drive with one or many friends. For sophisticated users the video content can even be rebroadcast or transferred over the Internet. With the right video editing software the video content can be altered, for example to remove commercials. This has caused a great deal of concern in various constituencies, from copyright holders of video content to the sponsors of broadcast programming. Some media content owners may be keeping certain video programming off the broadcast networks and cable services to prevent such potential copying. The content owners just do not want to let their valuable video content be replicated out of their control.

This problem is expected to become of much greater concern as higher quality (e.g. HDTV) broadcasting becomes more common. As movies are available in a sufficiently higher quality, duplication of this content may lead to reduction in revenue for movie studios and producers, perhaps similar to the effect that music sharing network software have been alleged to have on music CD sales.

To overcome the problem of duplication of valuable video content a number of encryption and encoding schemes have been put forward. Many use conventional cryptography algorithms such as public/private key encryption, private key encryption, and elliptical encryption. While any number of these can be deemed adequate at the moment, they are all subject to some level of suspicion that given enough time and computing power, they can be "cracked" i.e. subverted. When video content is recorded on a disk drive and when it is readily available (even at some cost) over the Internet, there may be a temptation for some people to decrypt the video content for illicit redistribution. Modern computers can process billions of instructions in a second, and this is increasing exponentially, so given time any of the current video encryption algorithms may prove vulnerable to being cracked.

Clearly there are enormous concerns over protecting the digital copies of movies that need to be addressed to encourage these content owners to distribute their best quality images over television, cable services, or via Internet communication. However, there are several other problems that need to be addressed to improve the use of current video program services (broadcast or cable).

For example, in spite of a seemingly endless number of cable or satellite channels available in the United States, there remain many demographic groups that cannot find programming to meet their needs. However, in the free market when there is a demand there is often a price at which goods or services will be provided. In the case of media content, it is anticipated that what is not currently available from standard broadcast or cable sources can be made available via the Internet if there is an adequate system of payment implemented. However, as previously discussed media content owners are concerned that an Internet distribution plan without adequate security may lead to a reduction or elimination of the value of their property.

Even when these fears are addressed, there needs to be a convenient method for charging for media content which has not heretofore been possible. This is compounded by the fact that many video consumers still anticipate that programming will be provided to them at no charge in exchange for the placement of commercials. However, if advertisers cannot rely on their commercials being seen by the audience whose programming they support, then they will no longer support the distribution of programming. While an alternative is to shift the cost of watching video content to the viewer, not all viewers will accept this or at least many might want to have a choice over what they have to pay for and what they can watch for free. Existing video media distribution schemes do not allow users to determine if they want to watch commercial messages and pay for programming or to skip these messages and pay a cost associated with each program.

Additionally, there exists the concern that an advertiser may only be interested in paying to sponsor a video program at certain times. For example, if an automobile manufacturer knew that a program they sponsor would be recorded and shown at a much later date (say 6 months later) they might not want to have an advertisement be shown for a model of a car that would no longer be in production at that time. Similarly, other advertisers might be more interested in having their advertisements shown only during the actual hours when they are open.

The concern over the payment for video content is not that of multi-national corporations alone. For example a PVR coupled with video editing software allows any person to record video content and add additional content to it, creating an enhanced video product. One example might be to add subtitles to a video program so an audience in another language can understand it. Another example is to add additional information to a video program (background information in the form or text, an audio track, or supplemental video). Needless to say not every person acting as a "desktop video-editor" will be interested in distributing their enhancements for free. Currently there is no convenient method for these individuals to market their work and receive payment for them.

Current video broadcast schemes do not allow for a high level of user interactivity. Most people are now familiar with highly interactive Internet sites, those that may change what they present based on what they know or think they know (for example from past purchasing history) about the person viewing a web page. For video content presentation, there have not been the same opportunities to customize information provided to the viewer or to let the user interact more meaningfully with a video program or a sponsor of a video program.

Furthermore, existing video media distribution schemes do not offer sponsors of the media any assurance that a commercial or other informative message will not be skipped over by a viewer. There is also no method to vary the advertisements shown to a user customized by the time of day when a video program is watched or other parameters related to the person watching, such as location or other customer specifics.

In general current media content distribution and presentation schemes and contemporary PVRs are relatively inflexible and are not capable of providing users with multiple choices of what they watch, when they watch it, and whether they have to pay for it or if others will. They also do not yet provide a media content security system that can be trusted. Furthermore, these schemes do not have an intelligent process to allow individuals to enhance existing video products or to create, distribute, and charge for their own video content.

A new distribution system is needed to answer these needs and provide the individual with greater control over what they watch.

SUMMARY OF THE INVENTION

The present invention deals with the problems described above. It provides a new secure method for the distribution and local recording of media content in the form of video and/or audio recordings. These will henceforth be referred to as media content. Although the examples and descriptions in this description generally refer to video, anyone versed in the art will appreciate that the descriptions can apply equally to audio recordings as well. Among other things, the new inventive method improves upon existing encryption technology by making it harder to decrypt media content even when stored on a local computer or PVR out of the direct control of the media content owner.

In one embodiment a customer subscribes to a media content distribution service. The service operates one or more video servers that provide media content to the user for download to a PVR of a customer or local computer, henceforth referred to as an enhanced PVR, or e-PVR. The service, its servers, and the e-PVR are connected to a wide-area network such as the Internet, but other transport networks such as wireless broadcast, cellular etc. are also anticipated. The server provides a catalog of available media content that is accessible to the customer using the e-PVR. While a single company can run the distribution service it can also be a distributed service where independent companies work together. For example some may provide media content for download, while others provide media content security services and yet others provide payment services.

To view media content a customer selects specific media content and commences to download it to the e-PVR for storage on its disk. Presumably, as Internet access speeds improve this only becomes faster, easier, and possible to do so the viewer can view the media content in real time. However even at conventional Internet access speeds, high quality video media content can be downloaded quickly if not yet in real time. Also, in this invention media content can be obtained through other several means of transferring files, for example copying onto physical media such as CDs or DVDs and even by transmission from traditional video sources.

To achieve the goal of improved security for media content, each media content is encrypted using any algorithm or encoding techniques suitable for this purpose, for example public/private key encryption or private key encryption. The video content is stored in a PVR or computer, enhanced with specialized application software, henceforth collectively referred to as an enhanced PVR or e-PVR.

To play media content stored in the e-PVR it must be decrypted. To do this the e-PVR can be programmed with a variety of decryption algorithms and related keys for this purpose.

However, in one embodiment the e-PVR first sends a decryption request message to a distribution service. The message can identify the e-PVR or its owner by including a registration number and/or a credit card number and/or account number and/or a GPS location and/or unique identifiers of the e-PVR. One example of an e-PVR identifier is the conventional Media Access Control address (MAC address) that uniquely identifies each node on a network such as the Internet or even small home networks. It is anticipated that each e-PVR can be part of a digital system such as a network that will have at least two MAC addresses associated with it; one for the connection of the e-PVR to a local network (for example in a home or business) and another for the connection gateway to the Internet or other wide area communication channel. Another e-PVR identifier could be a unique serial number coded within the microprocessor, such as those the Intel Corporation has proposed.

The distribution service determines from the decryption request message if there is an account corresponding to the identification information and if the account is active and in good standing, or it may use other methods to validate the request. The message sent to the service also identifies the media content to be played and some information about its encryption status. For example this may be the type of algorithm used to encrypt it, when it was encrypted, and in some cases, even a segment of the encrypted media content. The purpose of this information is to allow the server to determine what algorithm or process or decryption key is to be used to decrypt the media content.

Assuming there is a valid user account or the e-PVR is registered and/or validated, the distribution service sends to the e-PVR a decryption message including an decryption code or pointer. The decryption code or pointer is then used to enable or activate a decryption process so the media content can be presented using a multimedia display.

To improve the security of media content stored on the e-PVR, it is anticipated that the e-PVR will re-encrypt the video content after a threshold has been exceeded using a new encryption algorithm, encryption key, or encoding scheme. For example this could happen every 4 days, after 2 viewings, after a random number generator produces a particular number, or based upon a message sent from the distribution service. The algorithm for determining this threshold can take into account factors such as the length of time the account has been in existence, how often new devices are added or removed from the digital system and whether there have been administrative issues or complaints that might point to potential abuse of copyrighted content. Presumably a more stable account and one without complaints against it will have longer time intervals between re-encryption processes. Once again it is anticipated that the e-PVR will send a decryption request message to the service and receive a decryption message to decrypt the media content. In some embodiments the e-PVR also receives from the service a new encryption algorithm or new key to use with an existing algorithm. In this manner each item of media content is initially distributed in an initial encrypted format for storage by the e-PVR and after a threshold has passed the media content is decrypted and re-encrypted using a new key or algorithm.

Thus, the decryption process can be a function of the information contained in the media content as well as information on the distribution service. In some embodiments, the e-PVR will copy encryption/decryption information in anticipation of use from the service or the server into its local storage device so as not to be completely reliant on a communication channel to the service.

In another embodiment, the video content is not decrypted, but rather the encrypted content is encrypted again using a new key or encryption algorithm identifier. To play the media content each set of video encryption has to be decrypted to finally provide the decrypted media content. At least one and possibly all of the decryption steps must include the e-PVR requesting a decryption message from the distribution service or a local equivalent.

In another embodiment the media content is divided into portions, one being the main content (i.e. the portion that is to be presented to the user such as the Audio or Video Content), that can be decrypted using a key or specific algorithm or process, collectively referred to as a program key. A second portion includes the media content identification information such as owner, media content name or number, length, cost to play, and any other information of convenience to the user. This information may or may not be encrypted similar to the main content. A third portion contains the program key used to decrypt the main media content. This program key is encrypted using a code, algorithm, or process, which is provided by the service, and after encrypting, this third portion is referred to as the service encrypted program key. The service encrypted program key can be decrypted by the e-PVR requesting a decryption message from the distribution service. The distribution service in return sends to the e-PVR a decryption message (assuming the user has an account in good standing and/or the e-PVR is validated and some form of financial transaction takes place) that specifies a decryption, key, algorithm, or process the e-PVR is to use to decrypt service encrypted program key and thereby reveal the program key. The program key is in turn used to decrypt the main media content. Henceforth the service encrypted program key will be referred to as the SEPK.

However, in the preferred embodiment, the program key may be stored with the media content twice. As previously described, the program key is encrypted and stored as SEPK, which can be decrypted by receiving a decryption message from a distribution service. The second occurrence of the program key can be encrypted and decrypted using information local to the e-PVR and/or the e-PVR owner and/or the local digital system or network, to create keys or identify processes referred to as a locally encrypted program key. For example, when media content is initially stored on the e-PVR, the program key might be stored only once, that is, it is encrypted as the SEPK. The user can purchase the media content for use over a period of time, a number of replays, or for perpetual viewing. In this case, the service can send a decryption message identifying a code, algorithm, or process that is used to decrypt the SEPK to reveal the program key. The program key can then be re-encrypted using an encryption code, algorithm, or process based on the information local to or related to the e-PVR and/or the local digital system or network, and stored as the locally encrypted program key (henceforth referred to as LEPK). The SEPK is often retained for future use as described below. To play the media content the e-PVR then only has to use information local to the e-PVR and/or its local digital system to decrypt the LEPK. Also, the usage rules such as how many times the content can be played can be encrypted and stored along with the LEPK or with other information related to the media content. In this case the distribution service may not need to be contacted for multiple uses or presentations of the media content. By decrypting the LEPK the program key is revealed and then used to decrypt the main program as previously described provided the number of views or time period or other rules are still valid.

One advantage of using an SEPK and LEPK system to store the program key is that one e-PVR user can send or distribute a copy of specific media content to an e-PVR owned by second person. The second person will not be able to decrypt the LEPK created and stored by the first e-PVR as it is unique to the first e-PVR, its nearby network, or user; so the second e-PVR will not be able to use the LEPK and can delete it. However, the second e-PVR can send a message to the media content distribution service to request a decryption message to decrypt the SEPK, which is included in the transfer of the media content, to reveal the initial program key. Provided other conditions described above are met (for example a financial transaction is completed) a decryption message will be sent to decrypt the SEPK revealing the program key that is used to decrypt the media content allowing it to be presented, presuming that an associated financial transaction succeeds.

In some cases the decryption request message sent to the distribution service to request a decryption message may include identification of the first e-PVR or the account of its owner. In this manner distribution of media content not using the distribution service can be tracked, for example in a peer-to-peer community. In some cases a message including identification data is sent to the distribution service every time an e-PVR receives media content from another e-PVR, as opposed to the service. This will allow the service to track how media content is distributed, even if any e-PVR in a distribution chain does not decrypt it for presentation.

Similar to a previous embodiment, the LEPK can be decrypted revealing the program key and re-encrypted to form a new LEPK from time to time or after a certain number of media content presentations. Alternately the LEPK can be successively encrypted so that to decrypt it each level of encryption must be decrypted. The re-encryption process can be based on information uniquely attributable to the e-PVR and/or its owner and need not involve the distribution service. However, even in this case, the keys, algorithms and processes may have originally been obtained from the service.

It has previously been mentioned that the SEPK and/or LEPK can be decrypted and re-encrypted from time to time, after a number of presentations, by request from the service, etc. The main media content can also be decrypted and re-encrypted based on a time or activity threshold being exceeded or by command from the distribution service. This process need not be synchronized to the re-encryption of the SEPK or LEPK. However, it is anticipated that when the main media content is re-encrypted that a new program key will be created (that is the key that identifies a key, code, algorithm, or process to decrypt the media content) and will also have to be encrypted as previously discussed and stored as an SEPK and/or an LEPK.

Another advantage of the SEPK and LEPK system previously described is the ability given to the user to be able to view content recorded locally or purchased for multiple viewings as described earlier on the other e-PVRs on the same local digital system. For example, a home user who has purchased media content on one e-PVR can then view it on any other e-PVR in their home, and in some cases can even carry a portable device away from the home network and continue to play the content for a limited period of time.

Yet another advantage of this LEPK/SEPK system is that a first person can create or record their own media content and protect it using a program key, that is one that is locally generated, and also itself locally encrypted, that can in turn be decrypted without requesting a decryption message from the distribution service then allowing the media content to be decrypted. In this case the created media content can be sent or transferred to the e-PVR of second person. For the second person to decrypt the created media content they cannot use the LEPK as their e-PVR is not capable of doing this as it does not share the same local information or qualifiers of the first e-PVR. In order for the second person to play the created media content the first person who created the media content registers their created media content with the distribution service. As part of this registration process, the first e-PVR can provide the program key, which is then stored on the distribution service. When the second e-PVR requests a decryption message by identifying the created media content, it will then be provided the information needed to obtain the program key (again assuming a successful financial transaction) that is then used to decrypt the created media content. At this time, the program key can encrypted on the second e-PVR with a new code, algorithm, or process and this can be saved with the media content as an LEPK as described earlier.

When media content is recorded (for example from a broadcast or cable service) and the content is not owned by the person who recorded it, local law may require them to pay to view it again, or to distribute it, so they will need to supply the owner's name if it is not already captured, so that the owner can be credited financially for the content. However, as described later, the media content owner can embed all the necessary information into their content, even when the user obtains it from a source such as a TV broadcast (see description below of participating owners).

In some cases the created media content does not include a program key, but only information identifying who created the media content. When an e-PVR receives the created media content the receiving e-PVR contacts the distribution service identifying the created media content. The distribution service then contacts the e-PVR or other device that created the media content, which then sends the program key to decrypt the created media content to the distribution service. The service encrypts the program key as an SEPK and sends it to the receiving e-PVR for storage with the created media content. To play the created media content the receiving e-PVR contacts the distribution service to request a decryption message to decrypt the SEPK as before.

Similarly, a person can use an e-PVR to enhance an existing media content, for example by providing subtitles or other information to accompany the media content, such as viewer ratings so specific portions of the media content can be skipped over when it is presented, for example skipping adult scenes when presented in a family environment. The original media content can be encrypted as before and the enhancements can be encrypted using the same process described for created media content. In some cases the original media content and the enhanced content are encrypted together, similar to created media content referenced above.

In another embodiment the e-PVR is used to record media content from broadcast or cable television services. In this case, copies of the media content can be made (e.g. on a DVD) and sent to others to view. However, to provide improved security to the media content owners each media content recorded in the e-PVR can be encrypted as it is recorded. The encryption process can be directed by the e-PVR or distribution service. In the former case the encryption process can be related to one or more e-PVR identifiers or locally stored keys. In the later case the distribution service works cooperatively with the broadcast service. When media content is stored by the e-PVR, it appears to be just another media content downloaded from the distribution service that can be decrypted and when desired re-encrypted as before. In some cases media content can be originally transmitted in a form directly compatible with the encryption process of the e-PVR.

In another embodiment the distribution service customer may also be a media content creator in the sense that they produce original content or they add enhancements to existing media content. Their creative work can be stored on the e-PVR in an encrypted format or not. If they want to distribute their work with no controls over it they can make DVD copies of transfer it on the Internet as they choose. However, in this case their work may be further distributed without their permission or knowledge. Instead, the customer can use the distribution service and above described features of the e-PVR to aid in controlling how their work is distributed.

The customer can encrypt their work using an encryption key or process provided by the distribution service. The customer can describe their work and can add this information to the content as media information. The work can either be uploaded from the e-PVR to the service or another server or the e-PVR can act as a server, for example as part of a distributed network. Another person can select this work to download. However, it can only be decrypted for presentation by requesting and receiving a decryption message from a distribution service as previously described. It is further anticipated that the customer creating new work can specify controls over the distribution of their work, for example that it is only available to specific other subscribers, that it can only be presented or decrypted during a specific time period, or that a specific payment must be made to decrypt it, as described below.

In many cases the distribution service will work cooperatively with the media content owner, whether a dedicated media company or an individual creating their own media content or enhancing existing media content by adding additional content or information. This cooperation extends beyond just ensuring media content are encrypted and cannot be shared with others. In many cases media content owners have to pay the costs for producing media content and must be repaid for their investment. One method of doing this is to associate each item of media content with a cost. This information is stored as part of the media content and may be in the form of a fixed numeric cost, cost rules, a link to a cost or even as a link to cost rules. It is anticipated that by using these links the cost can be changed over time, for example to increase it for particularly popular media content or reduce it for those of low interest.

When media content is to be played the customer is notified of the cost of the media content and can agree to have this cost charged against an account maintained by the distribution service or a credit card or debit card account. By agreeing to pay for the media content the customer can obtain a decryption message from the distribution service and the media content owner is credited with a payment, presumably minus a service charge of the distribution service. Payment schemes are anticipated that allow the customer to view the media content once, several times, or even to play it as many times as they want. This information can be stored with the media content or in the account of the customer in a server.

However, there may be companies willing to subsidize the customer's viewing of media content in exchange for the customer also viewing informative messages during the presentation of the media content. Informative messages can be conventional advertisements or commercials or public service messages, but can also be interactive surveys that the customer responds to prior to the media content continuing. For example, let us say a media content owner has established a charge of $2.00 for media content to be presented. If there are enough companies willing to pay in aggregate $2.00 for presenting informative messages during the media content then the customer is given the option of not having to pay to watch the media content. However, to ensure good value for their sponsorship the software that presents the sponsored media content should be set to not fast forward over these informative messages. In some embodiments, the user may be allowed to fast-forward, but the credit for the informative message that is skipped will not be given to the user To facilitate the presentation of informative messages a media content owner or the distribution service may identify segments in media content before or after which an informative message can be presented. These segments can be marked using XML codes, time events, frame counts, or any other method the e-PVR can recognize to segment media content. It is anticipated that these informative messages can be downloaded or captured from a television feed, independently of the media content or they may even be received in real time as the media content is played, but separate from the media content. Informative messages can also be obtained by other methods in the same manner as media content is obtained, for example through any form of file transfer or traditional video broadcast.

The sponsors of media content may determine if and how much they want to pay for an informative message to be displayed based on a variety of factors. One is the time of day media content is played, for example a late night pizza restaurant may not want to advertise if media content is being played during the mid-morning. Another factor can be month of the year—a company promoting snow blowers will not sponsor a show during the summer. Similarly the company will not want to advertise its products to e-PVRs located in Florida, or they may want to pay a higher price for a specific area whose demographic is more attractive to them, so geography can be another factor. Other identification information about the e-PVR or the customer that uses it can be factored in to determine if and how much a sponsor will pay of the cost to present media content.

If there are not enough sponsors that in aggregate are willing to pay the $2.00 cost of the media content in this example, the customer can elect to pay the difference to present the media content or they can select a different media content. In one embodiment the customer is billed initially for the $2.00, and as informative messages are played their account is credited with the amount offered by the sponsor to present an informative message. In some cases it is possible that the customers account is actually credited with more than the $2.00 cost, or the payment for the informative messages total more than $2.00 and the remainder is credited to the distribution service or other related entity. In fact there is no reason to inform a sponsor either of the total cost of the presenting media content or how much money has already been accumulated to present it, or the amount of the credits to the customer or the distribution service.

Generally, the cost charged to the sponsor for the informative message is embedded in the informative message, in a manner similar to the media information and the cost that is embedded in the media content. As described above, this may be a simple number, a set of rules, or a link to either of these.

Thus, the development of an e-PVR coupled with a distribution server allows an increased level of security for media content owners and at the same time provides several new services to customers using the distribution server.

BRIEF DESCRIPTION OF THE DRAWINGS

FIG. 2 is a table listing examples of media content;

FIG. 3 shows typical contents of media information;

FIG. 4 shows typical contents of section flags related to media content;

FIG. 10 shows the typical contents of a storage device of a e-PVR;

FIG. 12 shows the contents of a decryption request message;

FIG. 13 shows the contents of a decryption message;

FIG. 14 shows the contents of a re-encryption or encryption message;

FIG. 15 shows the contents of an information request message;

FIG. 16 shows the contents of an information message;

FIG. 17 shows the contents of an encryption request message;

FIG. 18 shows an example of the contents of a button list;

FIG. 19 shows an example of the instructions used to interact with media content and informative messages;

DESCRIPTION OF THE INVENTION

Figure 1:
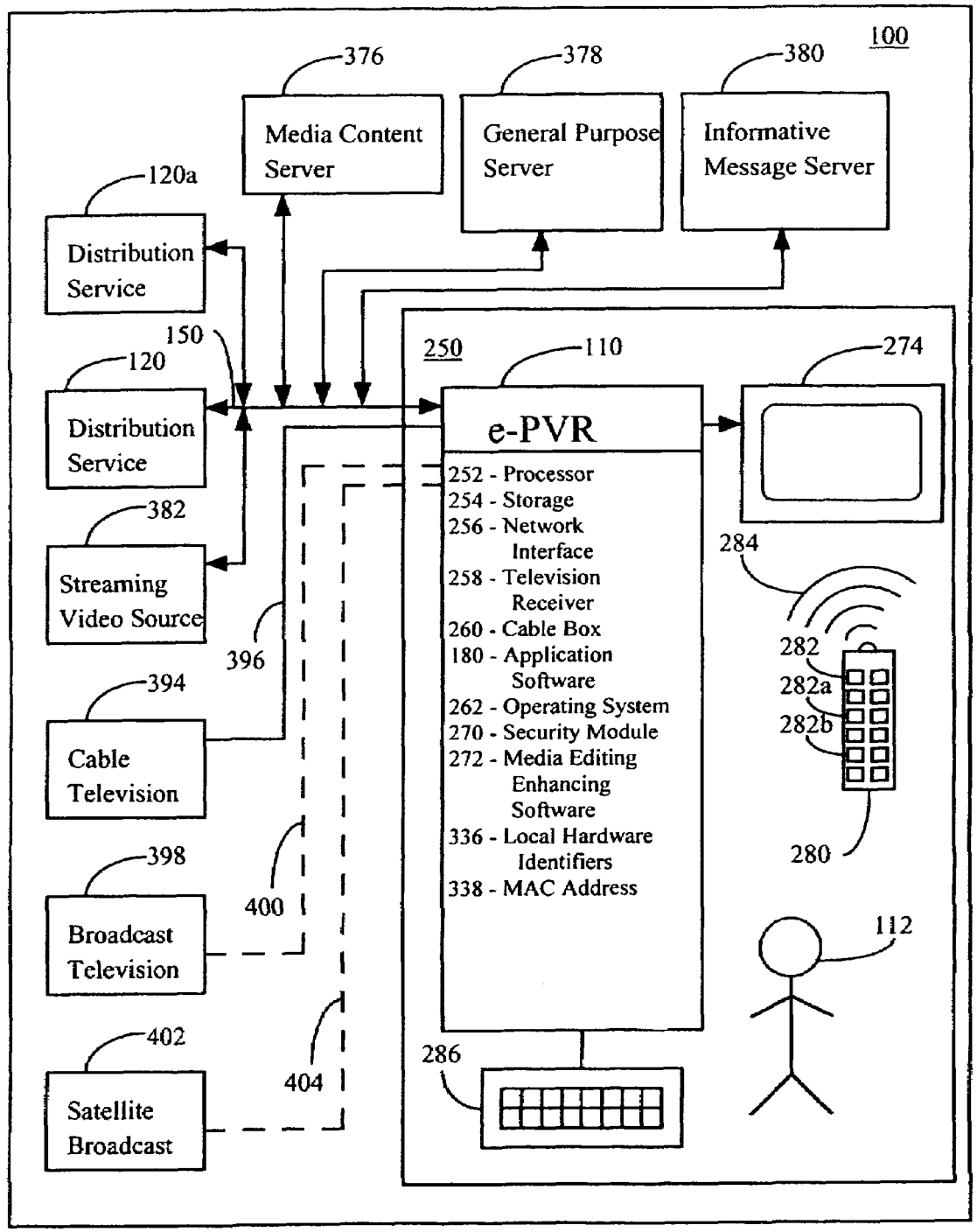
FIG. 1 is a schematic drawing of a media distribution system.

In the description of the invention similar objects or items will be referred to by the same number where for the second, third, or fourth such item the number will be followed by a lower case letter, for example two separate processors 384 performing the same or very similar purpose will be referred to as processor 384 and 384*a*. Typically a lower case letter "n" signifies the possibility of an indeterminate number of instances and a lower case "i" signifies an index such as the "ith" item out of "n items". Also, multiple subscripts are used to signify a relationship, for example section information 174*aa* is different from but related to (for example in conjunction with or instead of) section information 174*a*.

This invention relates to a multi-platform media distribution system 100 (see FIG. 1) for media content 102. Media content 102 (see FIG. F2) can be a video with audio recording (for example movies, television programs, educational courses, sports programs, etc.), video only recording, or an audio recording (for example music or educational presentations). Media content 102 is typically encrypted and decrypted prior to presentation by any of several methods described below. Preferably, media content 102 is associated with media information 104 (see FIG. 3), which generally describes media content 102 or provides information about media content 102. Media content 102 and media information 104 are combined to form media package 106 (See FIG. 8).

Media package 106 is obtained from computers or servers by a personal video recorder enhanced with specific programming described below, now referred to as enhanced personal video recorder or e-PVR 110, to allow user 112 of e-PVR 110 to view media content 102 when desired. The servers can be part of a distribution service 120 that user 112 of e-PVR 110 subscribes to or the servers may be run independently of distribution service 120. In some cases media package 106 is obtained from a second e-PVR 110*a*.

Figure 7:
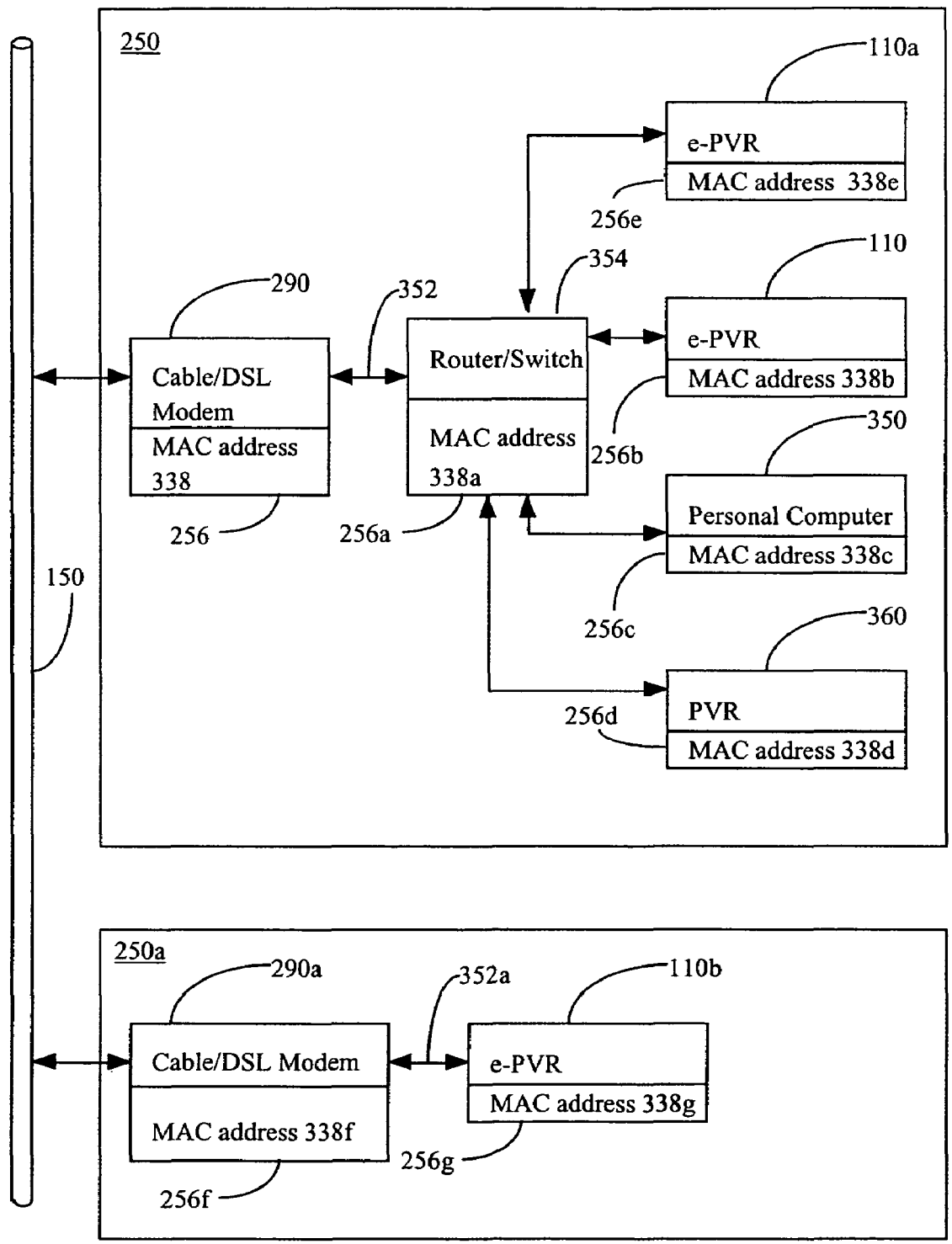
FIG. 7 is a schematic of digital systems with enhanced e-PVRs.

Media information 104 is comprised of a unique media content identifier 130, a unique media package identifier 131, a title, list of actors, writers, director, producer, studio, date of production, owner 132 of media content 102, cost 134 to present media content 102, presentation time duration, sections flags 136 (which allow content to be logically divided into sections), and in some cases decryption information 138 that describes how media content 102 can be decrypted. When appropriate, one or more link to additional information 140 is included, which can be used to link media package 106 to another media content 102*a* or to other information available within media distribution system 100 or over the Internet or other wide area network 150 (FIG. 7). Link to additional information 140 may be a hyperlink, a file transport protocol (FTP) request, a database access command or other means of obtaining information from a specified computer. All or most of the information within media information 104 may be a link to information on another computer, for example cost 134 instead of being a cost expressed numerically may instead be a link to computer that determines the cost on a dynamic basis using various rules and/or scripts.

Media information 104 can also include digital rights rules 152, which can be used to determine when and how many times media content 102 can be presented and may govern other aspects of the rights of owner 132 related to media content 102.

Any or all of media information 104 can be static or it can be dynamically determined using calculations or rules. For example cost 134 may include rules for different costs based on the zip code or other components of e-PVR information 160 or the rules can be looked up using links to additional information 140.

As previously mentioned media content 102 can be divided into one or more sections 170 as seen in FIG. 5. Section flags 136 (see FIG. 4) are used to characterize each section 170 and can be comprised of section data 172 which defines the start and end of a section of media content 102 and may be expressed as times, frame counts, or pixel numbers. Each section data 172*i* may also have corresponding section information 174*i*, providing information about that section, for example a violence rating or information otherwise associated with that section such as subtitles.

In some cases section data 172 may have more than one section information 174 associated with it, for example to store subtitles and additional ratings relevant to section 170. Section information 174 can also include an "External User Action" for that section that can be selected by user 112 when section 170 is presented or another section 170*a* proximate to it is presented. Section information 174 can also be associated with identifier 176, which identifies the person or group who provides section information 174, for example the identify of owner 132 or that of user 112 acting as a Media Enhancer. Section information 174 can also be associated with section cost 178, which is similar to cost 134, but now related to just a specific section 170.

Sections 170 may be logical or physical sections consisting of separate video segments and media content 102 is presented by playing each section 170 successively. For most uses of these sections it may be assumed, unless noted, that sections are created by logical segmentation rather than physical. Sections may coincide with events related to the content such as scene changes. The sections 170 and section data 172 can be created by owner 132 or by user 112 acting as a Media Enhancer who can enhance the content by adding additional media information 104*a* as described below.

As mentioned section information 174 can include ratings for that section on various scales such as for Sex and for Violence. These are similar to, for example ratings such as "G", "PG", or "R common to ratings of entire movies, but now applied to specific sections 170 of media content 102 and can be significantly more granular (allowing for example, rating from 1 to 100 or from DDD– to AAA+). Ratings on other scales are also be anticipated such as quality of acting or cinematography and can also be qualitative and descriptive rather than quantitative. When ratings are present, e-PVR information 160 can be used, such as the preferences/profiles 334 in user list 333, to determine which sections 170 are to be shown to user 112.

Media package 106 (see FIG. 8) includes media content 102 which can be encrypted and media information 104 which can optionally be encrypted. In all the embodiments of the invention media content 102 is decrypted using program key 200. Program key 200 can be obtained in some embodiments by using decryption information 138, while in other embodiments program key 200 is obtained using one of service encrypted program key (SEPK) 210 in conjunction with service decryption information 212 or locally encrypted program key (LEPK) 220 in conjunction with local decryption information 222. When used, SEPK 210 and service decryption information 212 and/or LEPK 220 and local decryption information 222 are stored as part of media package 106.

Media information 104 may consist of some or all of the elements shown in FIG. 3, but may also contain information not shown. It should be emphasized that media information 104 is a flexible format allowing for the introduction of other elements not envisioned in the current invention. Any of the above described information may be omitted, and this may impact the use of the media content, however no information is absolutely required in every situation. The information comprising media information 104 including those mentioned above can be present anywhere within media package 106, and can be delineated by tags, symbols, names, field definitions sub-field definitions or any other recognizable markers or combinations thereof.

Media information 104 can be encrypted and may use encryption and decryption methods including, but not limited to using the same key/algorithm/process used to decrypt media content 102. Preferably, as described later, relevant portions of media information 104 should be available either without decryption, or without requiring the security of any other portion of media package 106 to be compromised.

Figure 6:
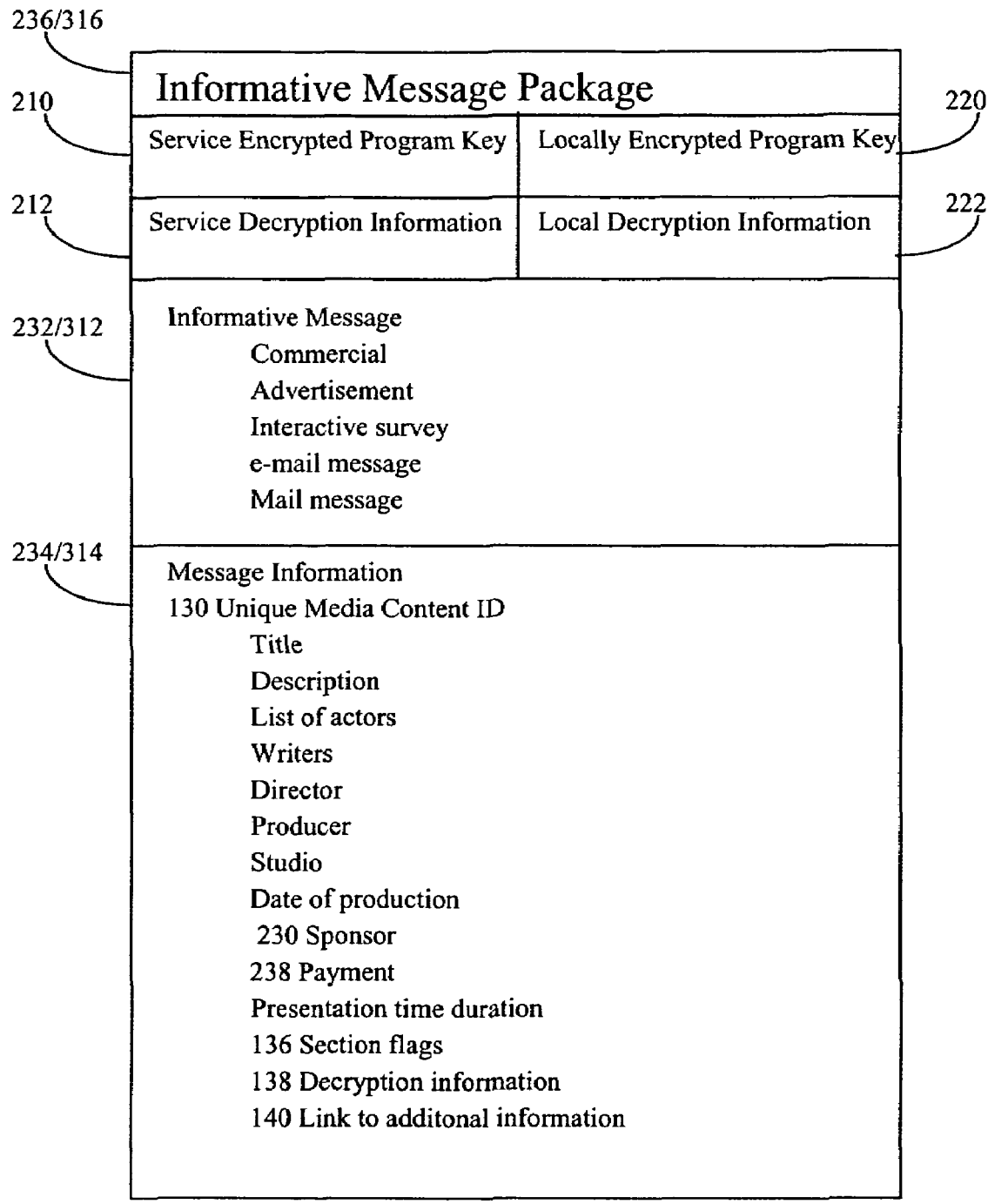
FIG. 6 shows typical contents and examples of informative messages.

One or more sponsors 230 (commonly referred to as advertisers in traditional TV broadcasting) may choose to pay part or all of cost 134 to present media content 102, in exchange for user 112 being presented with informative messages 232 (see FIG. 6). Informative messages 232 are similar to media content 102. Informative message 232 is combined with message information 234 to create informative message package 236. Informative message 232 can be a commercial, advertisement, or an email message; or in some cases it may be the information needed to create any of the above. Message information 234 is similar to media information 104, however where media information 104 has owner 132 and cost 134 message information 234 has sponsor 230 and payment 238. In some cases informative message 232 can have SEPK 210 and service decryption information 212 and/or LEPK 220 and local decryption information 222. Informative messages 232 can be obtained as part of informative message package 236 by user 112 in the same way as media packages 106 are obtained (for example by downloading), or they may be automatically acquired by e-PVR 110.

e-PVR 110 is used within digital system 250 (see FIG. 7) and is typically comprised of processor 252, storage device 254 (e.g. a disk drive), network interface 256, a conventional television receiver 258 or a link to one, a cable television box 260 or a link to one, application software 180 running on an operating system 262 (application software 180 and e-PVR 110 are used interchangeably in this document), a special security module 270 (described more fully below), and optional media editing, creation, or enhancement software 272. e-PVR 110 is typically connected to an audio visual system such as a home entertainment center or an audio visual display or presentation device 274, such as a television or a LCD or plasma display or even an audio only presentation device. Some functions of application software 180 may be performed in the hardware and so a function that is described as performed by e-PVR 110 may be performed by application software 180 or by hardwired components of e-PVR 110. The e-PVR need not have all of the components described here. For example, it is anticipated that some specialized versions of the e-PVR may not contain television receivers 258 or cable boxes 260 and may only have a network interface 256. In fact, any standard desktop PC with application software 180 may be called an e-PVR. e-PVR 110 also typically contain certain unique identifiers such as a MAC (Media Access Control) address 338 associated with network interface 256 and local hardware identifiers 336 that can consist of one or more of a processor serial number, a serial number and other such identifiers.

Typically, one or more e-PVRs 110 are part of digital system 250 (see FIGS. 1 and 7) which is generally used to create a localized network or group of cooperative electronic devices. Frequently digital system 250 is owned or operated by user 112 and used within the residence or office of a user 112.

Also shown in FIG. 1 is remote control 280 with at least one selection knob or buttons 282, 282a, 282b and a communication channel (for example infrared or Bluetooth) 284 to e-PVR 110. Remote control 280 is typically used in conjunction with presentation device 274 allowing user 112 of e-PVR 110 access to common functions such as to start, stop, rewind, fast-forward etc. or to interact with media content 102, media information 104, or application software 180; through which it can also be used to interact with distribution service 120 or other media content or devices on network 150 or digital system 250. Other input devices 286 such as a keyboard, touch screen or voice recognition apparatus may also be used to provide interaction between the user 112 and e-PVR 110 and by extension the rest of the system as described above. User 112 may also use these devices interchangeably with remote control 280 for example to perform more complex tasks such as entering passwords if needed or performing text searches for content or within content. User 112 when enhancing media package 106 by means of media editing, creation, or enhancement software 272 may presumably also use these input devices and when doing so user 112 will henceforth be referred to as a Media Enhancer. A Media Enhancer can also be a person who uses a personal computer or workstation using a version of media editing, creation, or enhancement software 272, conceivably unrelated to application software 180.

e-PVR 110 communicates via network interface 256 and Internet gateway connection 290 across network 150 with various components of media distribution system 100, for example distribution service 120 and other information and content sources described below. Using network 150 e-PVR 110 can send messages to and receive messages from distribution service 120. e-PVR 110 can interact with distribution service 120, or other sources to obtain a list of media content 102 that can be obtained and by selecting a specific media content 102 it is downloaded or sent to e-PVR 110 by other means as part of media package 106. Media package 106 can also be transferred to e-PVR 110 by copying it using commonly used media such as a CD or DVD or transferred using email, FTP or any other methods of file transfer (such as incremental or progressive transfer or using systems like BitTorrent). In fact all packages described in this invention can be transferred by any of these means and by any other means used now or in the future to transfer computer files. They can also be transferred as described later by any means of transferring video whether by analog or digital means, and the transfer can include media information 104, which can be embedded in the transmission in various ways as described later in this document. Hence, in this document, all references to "obtaining" should be taken to mean any of these means of transferring content or information or packages containing them and the terms "obtaining" and "downloading" can be taken to mean the same act unless repugnant to the context in which the terms are used.

Figure 8:
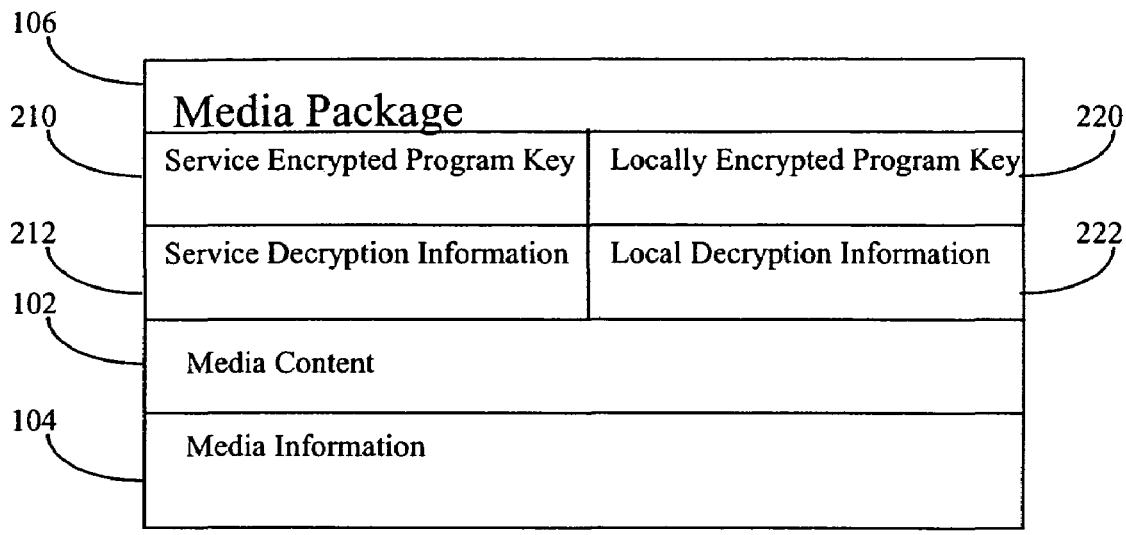
FIG. 8 shows the contents of media package as stored on a media distribution server.
Figure 9:
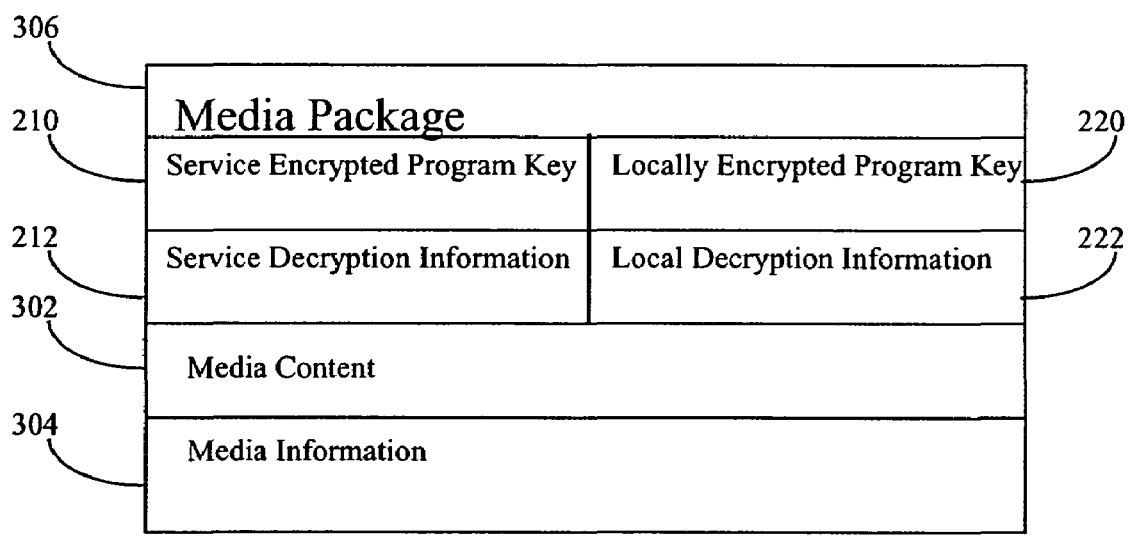
FIG. 9 shows the contents of media package as stored on an e-PVR.

For clarity when discussing media content 102 transferred, residing, or stored on e-PVR 110 it will henceforth be referred to as media content 302, for example when stored using storage device 254 (compare FIGS. 8 and 9). Similarly media information 104 when transferred, residing, or stored by e-PVR 110 will be referred to as media information 304 (see FIG. 9). Media package 106 transferred, residing, or stored by e-PVR 110 will be referred to as media package 306.

Furthermore, informative messages 232 when transferred, residing, or stored on e-PVR 110 will henceforth be referred to as informative messages 312, message information 234 will be referred to as message information 314, and informative message package 236 will be referred to as informative message package 316 (See FIG. 6).

e-PVR 110 is designed to allow obtained media content 302 (as part of media package 306) to be decrypted and presented using presentation device 274. In some cases media package 306 is obtained partially, for example, media information 304 is downloaded and only a location is reserved for media content 102 in media package 306. Downloaded media information 304 is presented to user 112 to make a decision on whether they want to view it. A first portion of the media content 102 can be downloaded on request and this portion may represent a first section 170 as marked by section flags 136 (see FIGS. 4 and 5). The remainder of the media content 102 can be downloaded when user 112 chooses it either to download and/or to present. This can be done simultaneously while e-PVR 110 is presenting media content 302, that is, media content 102 is decrypted and presented simultaneously while it is being stored as media content 302. Further, only certain sections 170, 170a can be downloaded or certain sections 170 can be downloaded first and others say, 170b, 170c may be downloaded later.

Storage device 254 is used to store a variety of information referred to as contents 330 (see FIG. 10) such as e-PVR information 160, which can include distribution service 120 account number, the serial number of e-PVR 110, owner identification information (for example name, credit card number, or other identifier) 332, a user list 333 which may include viewing preferences/profiles 334 for each user or groups of users (for example different preferences for children versus adults). Storage device 254 is also used to store a variety of media packages 306 and informative message packages 236. Storage device 254 may be logically extended by using storage on a personal computer 350 or another e-PVR 110a on the same digital system 250, or even on remote storage such as storage and backup services provided by service providers and these can all be considered local to e-PVR 110.

Personal computer 350 may have many of the same features of e-PVR 110 for example storage device 254 with contents 330 as described above. It may also optionally contain a special version of the application software 180a to allow personal computer 350 to act as an e-PVR 110 as well as a special version of media creation, editing and enhancement software 272a to allow a user acting as a Media Enhancer greater flexibility and power when using or enhancing media information 104 or media content 102. Additionally, personal computer 350 can be used to control e-PVR 110, to store and send content in the form of media packages 106 to e-PVR 110, or for other functions described below.

As previously mentioned media content 302 is encrypted using various methods as described above prior to distribution. Media information 304 can be encrypted or not and when encrypted it is desired that at least portions of it can be decrypted by e-PVR 110 without assistance of distribution service 120, or that after portions of it are decrypted once they can be stored and accessed without an additional decryption process. Usually, any time that the Media Information 304 is decrypted, such as for presentation to the user, relevant portions are copied into another section of the Media Package 306, as plain unencrypted text that can be presented to the user at any time. Additional media information 304a that is created (as described later under Enhancing Media Package) by a Media Enhancer and not the original content owner 132 can also be included for display or presentation in plain text.

FIG. 7 shows e-PVR 110 as part of digital system 250. Now shown is Internet gateway connection 290 such as a Cable/DSL modem that connects to the network 150 and creates a local area network 352, such as an Ethernet LAN. On local area network 352, router 354 can be attached to allow local area network 352 to be shared by multiple digital devices such as e-PVR 110, one or more personal computers 350, or one or more conventional PVRs 360. An accessory e-PVR 110a is also shown as more than one may be used with digital system 250 and they may share media content 302 and otherwise work cooperatively and divide work and available storage.

Also shown is second digital system 250a separate from, but similar to, digital system 250, with its own e-PVR 110b.

In some situations, e-PVR 110b can obtain media content from e-PVR 110 (and vice-versa) as well as from distribution service 120.

Media distribution system 100 is comprised of one or more distribution services 120 linked via network 150 to digital system 250 and thereby to e-PVR 110. Preferably, e-PVR 110 communicates with distribution service 120 and other computer systems or servers or any other capable devices in an encrypted manner for secure communication.

Figure 11:
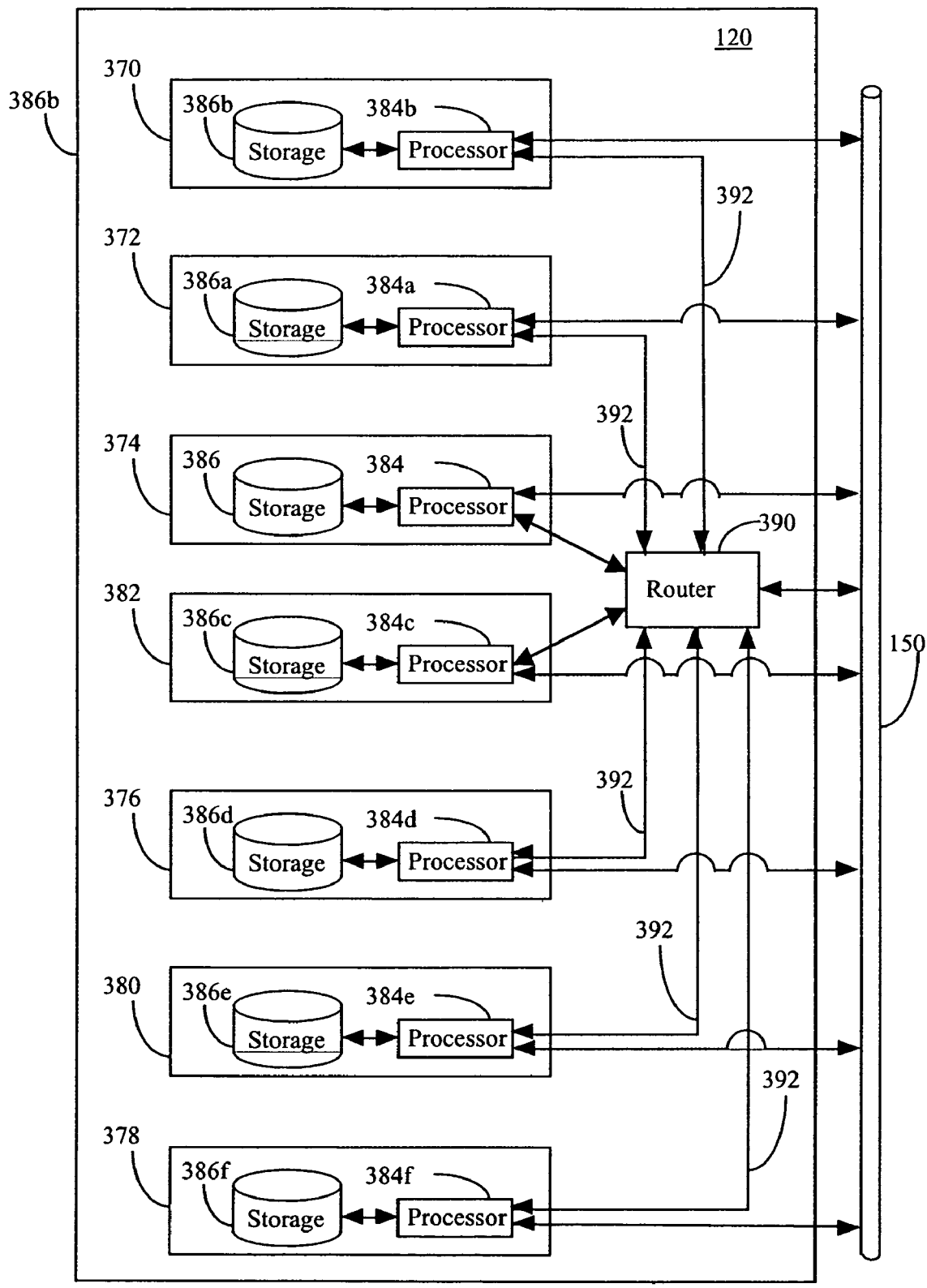
FIG. 11 is a schematic view of a possible configuration of a distribution service.

Distribution service 120 is designed to be a service to customers allowing media content 102 obtained from any source using e-PVR 110 to be presented to them and to control the use of this media content 102, even when it is obtained from other sources outside of distribution service 120, for example from one e-PVR 110 to another e-PVR 110b in separate digital system 250a. Specifically distribution service 120 can be comprised of (see FIGS. 1 and 11) at least one each of encryption/decryption server 370, payment server 372, and distribution server 374. Optionally, and preferably, it can also include one or more media content servers 376, general purpose servers 378, informative message servers 380 and streaming video sources 382. Multiple instances of payment server 372a, media content server 376a, general purpose server 378a, informative message server 380a and streaming video source 382a may also exist independently outside of distribution service 120. In some cases it is possible to envision distribution service 120 without some of the usually included components, for example a distribution service 120 that distributes free content may not include a payment server 372.

These servers and their roles are fully described below, but are logically composed of one or more processors 384, 384a, . . . 384n (See FIG. 11) each coupled to one or more digital storage devices 386, 386a, . . . 386n, such as large magnetic disk drives. Processors 384, 384a, and others can be linked by a router 390 to the Internet or similar wide area network 150 or other communication channel. Processors 384, 384a, . . . 384n can communicate with each other using internal communication channel 392 or via network 150. Each server may be comprised of more than one processor 384 and more than one storage device 386 to accommodate its computational and storage needs.

Distribution server 374 can be used to direct messages or portions thereof to the appropriate server. When needed, distribution server 374 can maintain information about user accounts and receive decryption and encryption requests, payment information messages, and can manage other servers. When distribution service 120 receives messages from e-PVR 110 these messages (or portions of the message) are routed to the appropriate server, for example financial transactions can be forwarded to payment server 372.

Encryption/decryption server 370 provides keys, algorithms, and processes as requested by e-PVR 110 for various decryption and encryption tasks.

Payment server 372 is used to complete financial transactions such as charging users credit cards, paying for content in a pay-per-view scheme, or for managing the financial portions of subscriptions or memberships to various media content servers.

General purpose server 378 is used for ancillary tasks, for example to provide information or support to the links to additional information 140 embedded in media information 104. Generally such a server may have application software associated with tasks it is able to perform, for example a database, or web server software. Media content server 376 is used to store media packages 106 which can be obtained by e-PVR 110. Informative message server 380 is used in a parallel fashion to store informative messages 312 as part of informative message packages 236 (see FIG. 6), which can be obtained by e-PVR 110. Streaming Audio/Video source 382 can be an encoder or server providing for example, a Multicast or Unicast stream of content.

Payment servers 372a, media content servers 376a, general purpose servers 378a and informative message servers 380a that exist independently outside of distribution service 120 can be owned or operated by their respective owners or agents. For example, media content server 376 may be operated by a studio that owns the content or by a distributor of video content who distributes content from many different owners.

All or any combination of the above mentioned servers can be physically or logically a single server. If however, they are separate servers, they can be located physically within different networks and they may even be owned and operated by separate business entities no matter where they are located. For example a production studio can maintain media content server 376, and a credit card company or an Internet transaction company such as PayPal can maintain payment server 372. If these servers are separate they can be linked to each other directly via router 390, a communication channel 392 to processor 384, via network 150 or by any other communication network or channel.

Distribution system 100 can also include cable television service 394 connected to e-PVR 110 by cable 396, wireless television broadcast system 398 transmitting via terrestrial based wireless communication 400, satellite television broadcast system 402 via satellite wireless communication 404, or connections to other media transmission systems.

It is also anticipated that when e-PVR 110 receives media content 102 from television or other wireless or cable broadcasts, that it can digitize these and store it as part of stored media package 306. When media editing, creation or enhancement software 272 is used by a Media Enhancer to create or modify media content 302 to create an enhanced media content 302a, e-PVR 110 will store this as part of media package 306. This process is described more fully under "Recording Media Content from Video Input" and other sections later in this document.

When media content 102 is received via broadcast means (for example by cable, broadcast television, or satellite broadcast) media information 104 may also be provided. In other cases it is not provided and can be created and/or obtained, so media information is preferably present, but media package 106 is ultimately always present for this media content.

As described above distribution system 100 can also include a variety of media content servers 376 outside those of distribution service 120. In fact media content can be obtained from e-PVR 110b in a second digital system 250a, from traditional PVRs 360 and even other digital and analog devices such as traditional Video Cassette players or DVD players. This content may be obtained by downloading, via email or even by copying DVDs or other such media and physically moving the media between devices. When downloaded, the content may actually be obtained using FTP, HTTP or similar well-known protocols, but also by non-standard protocols such as BitTorrent and others. e-PVR 110 is also capable of receiving media content 102 from cable television service 394, television broadcast system 398, or satellite television broadcast system 402 by digitizing it when necessary. When obtained from such traditional or new analog sources such as cable television service 394 and others described above, content is captured rather than downloaded, and this process is described more fully under "Recording Media Content from Video Input" later in this document.

FIRST EMBODIMENT

In the first embodiment e-PVR 110 interacts with at least one distribution service 120, storage 254 on e-PVR 110, media content server 376, a second e-PVR 110a, a third e-PVR 110b in a different digital system 250a, or transferred by commonly used media such as DVD, email, FTP or other protocols or any file transfer or data transfer methods including analog sources described above such as broadcast TV. Thus, a list of available media content 102 is provided to the user of e-PVR 110 to select from. By making a selection from this list, a specific media package 106 is retrieved for example, by processor 384d from a storage device 386d that is part of a distribution service 120 and sent to e-PVR 110 via network 150. This can be via any of a data transport protocol such as FTP, HTTP, or via an e-mail attachment or a simple read from disk operation or any other data transfer method. e-PVR 110 stores the received media package 106 as stored media package 306, as part of contents 330 on storage device 254 (see FIG. 10).

In this embodiment only media content 102 and media information 104 are needed as part of media package 106. Media content 102, and in some cases portions of media information 104 are encrypted prior to distribution by distribution service 120, media content server 376, general purpose server 378, or even e-PVR 110 (for example when acting as a media content server 376) using any suitable encryption algorithm or process, such as DES-5, public-private key encryption, private key encryption, or others. Media information 104 has information that describes the media content 102. In this embodiment it also includes decryption information 138 which can be used to obtain the information describing the decryption code, algorithm, process or combination thereof (collectively referred to as the program key 200) used to decrypt media content 102.

When transferred to e-PVR 110 media content 102 is stored as media content 302. When it is to be played or presented, e-PVR 110 can use media information 304 to determine if media content 302 is still available for presentation (for example by checking cost 134 rules or by checking digital rights rules 152).

e-PVR 110 then sends at least a portion of media information 304 and in some cases at least a portion of e-PVR information 160 to distribution service 120 in decryption request message 430 (see FIG. 12). Not all the elements of decryption request message 430 are required to be present. In this embodiment, for example, service decryption information 212 and SEPK 210 are not provided, but decryption information 138 (part of media information 304) is provided. Additionally, other than decryption information 138, only the portion of media information 304 that is enough to identify stored media package 306, and the portion of e-PVR information 160 that is enough to identify the e-PVR 110 to distribution service 120 are needed to be sent.

Decryption flag 432 may be included indicating that media content 302 is to be decrypted and presented. In other embodiments decryption flag 432 is used to convey information to distribution service 120 indicating a specific operation is to be started regarding the decryption and/or encryption of media content 302 or other encrypted portions of media package 306. In some cases user 112 uses remote control 280 to select payment 434, which is also sent to distribution service 120. Payment 434 is debited from a financial account of user 112 and paid to distribution service 120 and/or owner 132. In some cases payment 434 can be substituted for decryption flag 432.

When distribution service 120 receives decryption request message 430 and it is flagged for presenting media content and by extension a financial transaction, it performs a "Payment Step" as described under "Paying for Media Content"—in some cases even when cost 134 is zero or negative. If "Payment Step" is successful, encryption/decryption server 370 is then used to determine how media content 302 is to be decrypted by examining decryption information 138.

Decryption message 440 (see FIG. 13) is then created by encryption/decryption server 370 and sent to e-PVR 110. e-PVR 110 uses the decryption message 440 to determine how to decrypt media content 302. For example the decryption message can provide a code or identify an algorithm or process or any combination of these, collectively referred to as decryption description 442. Decryption description 442 is used by security module 270 to decrypt media content 302, which is then presented using presentation device 274.

To increase the security of stored media package 306, media content 302 can be decrypted and then re-encrypted by security module 270 based on a threshold being exceeded. This process will be referred to collectively as re-encryption and a variety of thresholds can be used to determine when this will be done. For example it might be done after a period of time has passed such as every 2 days, or after a number of viewings or presentations has been exceeded, when a random number generator provides a predetermined result, or re-encryption can be remotely commanded by distribution service 120 or in some cases by content owner 132, by sending a message to e-PVR 110. Any one of these thresholds can be monitored or a combination of them can be used. The algorithm for determining this threshold can also take into account factors such as the length of time the account has been in existence, how often new devices (such as e-PVR 110a . . . 110n, or personal computers 350) are added or removed from the digital system and whether there have been administrative issues or complaints that might point to potential abuse of copyrighted content. For example, a more stable account that has been without complaints can have longer time intervals between re-encryption processes.

When media content 302 is to be re-encrypted, e-PVR 110 sends decryption request message 430 with decryption flag 432 indicating a re-encryption process is to be started. Distribution service 120 uses encryption/decryption server 370 to create re-encryption message 450, which is sent (see FIG. 14) to e-PVR 110. When distribution service 120 is remotely commanding e-PVR 110 to re-encrypt media content 302, it sends re-encryption message 450 to e-PVR 110 without a prior request to initiate the re-encryption process.

Security module 270 uses decryption description 442 (in re-encryption message 450) to decrypt media content 302, and to then encrypt the decrypted media content 302 using content re-encryption description 452, which as before can be an encryption code, designated algorithm, or processes or a combination thereof. Following the re-encryption process decryption information 138 in media information 304 is updated to identify how media content 302 can be decrypted. This information can then be sent in the future to distribution service 120 when a new decryption message is requested.

In some cases it may be sufficient to instead of decrypting media content 302, that it be encrypted again using content re-encryption description 452. To obtain media content 302, it must be decrypted multiple times (once for each encryption process that it has been subjected to). Decryption information 138 is updated to reflect each encryption performed on media content 302.

SECOND EMBODIMENT

In a second embodiment, media package 306 includes SEPK 210 and service decryption information 212. In this case media content 302 is encrypted in such a way that a code, algorithm, or process or any combination of them, referred to as program key 200 can be used to decrypt it at any time. However, program key 200 is also encrypted using another encryption process and stored as SEPK 210. Information relating to how SEPK 210 can be decrypted is stored in service decryption information 212. Distribution service 120 uses service decryption information 212 to determine how to decrypt SEPK 210, for example using encryption/decryption server 370. SEPK 210 cannot be decrypted only using service decryption information 212, but further decryption information must be obtained from encryption/decryption server 370.

As before the user of e-PVR 110 selects media content 102 from a catalog of available media content 102 from distribution service(s) 120, 120a, media content servers 376, . . . 376a, locally from e-PVR 110, a separate e-PVR 110a, other devices in digital system 250, or even a second e-PVR 110b in a second digital system 250a. If needed, media package 106 with selected media content 102 is downloaded or transferred from one of the above sources to e-PVR 110 where it is stored as media package 306. The user can select media content 302 (part of media package 306) for presentation when it is either wholly or partially available or transferred. e-PVR 110 then sends decryption request message 430 now including service decryption information 212 and/or SEPK 210 as well as portions of e-PVR information 160 and portions of media information 304 to encryption/decryption server 370 linked to distribution service 120. In some cases e-PVR 110 reads media information 304 and contacts distribution service 120, separate media content server 376, general purpose server 378 or an appropriate location as specified in links to additional information 140 in media information 304 to determine that the media content 302 can be presented.

Encryption/decryption server 370 uses the contents of decryption request message 430 to determine how to decrypt SEPK 210. In this step, "Payment Step" as described under "Paying for Media Content" is also undertaken—in some cases even when cost 134 is zero or negative. If "Payment Step" is successful, distribution service 120 then sends back to e-PVR 110 decryption message 440 that specifies decryption description 442, for example a code, process or algorithm used to decrypt SEPK 210. e-PVR 110 receives decryption message 440 and security module 270 uses decryption description 442 to decrypt SEPK 210 to obtain program key 200. Program key 200 is then used by security module 270 to decrypt media content 302. When desired, e-PVR 110 then sends another decryption request message 430a, this time including program key 200 and similar to the above process receives a second decryption message 440a containing decryption description 442a which is then used by security module 270 to decrypt media content 302 for presentation. Program key 200 can typically be sufficient by itself to decrypt media content 302 or any further information need to decrypt media content 302 using program key 200 can be obtained from local security database and/or security module 270. Alternately, service decryption information 212 can also include information directing how security module 270 is to use program key 200 to decrypt media content 302. In some cases distribution service 120 also receives SEPK 210 and, after "Payment Step" is completed, decrypts it directly to reveal program key 200, which is sent to e-PVR 110 as part of decryption message 440. See FIG. 20 for an illustration of a typical sequence of events needed to present media content in this embodiment.

When a process is used to decrypt SEPK 210 it may include one or more additional messages that are sent to distribution service 120, owner 132, or other entity or location specified in media information 304 requesting additional information or permissions. By receiving a corresponding message back e-PVR 110 is enabled to decrypt SEPK 210.

To increase security of stored media package 306, SEPK 210 can be decrypted and then re-encrypted again by e-PVR 110 similar to the re-encryption process of the first embodiment. As before a process determines when a threshold is exceeded or met (such as a time limit, a change to the local digital system, a number of presentations of media content 302, a random number provided by a random number generator, or a command from distribution service 120), in which case SEPK 210 will be re-encrypted. When stored SEPK 210 is to be re-encrypted, e-PVR 110 sends at least a portion of service decryption information 212 to distribution service 120 as part of decryption request message 430, with decryption flag 432 indicating a re-encryption process is commencing. Distribution service 120 uses encryption/decryption server 370 to create re-encryption message 450, which is sent to e-PVR 110. When distribution service 120 is remotely commanding e-PVR 110 to re-encrypt media content 302, it sends re-encryption message 450 to e-PVR 110 to initiate the re-encryption without a prior request from e-PVR 110.

When re-encryption message 450 is received security module 270 uses the decryption description 442 to decrypt SEPK 210, and to then encrypt the decrypted contents using re-encryption description 454, which as before can be an encryption key or a designated algorithm, or processes or a combination. Following the re-encryption process a new SEPK 210a is created and new service decryption information 212a is created to identify how SEPK 210a is to be decrypted. Service decryption information 212a can then be sent in the future to distribution service 120 when a new decryption message is requested.

As part of a re-encryption process it is also anticipated that encryption/decryption server 370 as part of distribution service 120 may receive SEPK 210 and service decryption information 212 as part of decryption request message 430. In this case encryption/decryption server 370 decrypts SEPK 210 to obtain program key 200 and re-encrypts program key 200 as a new SEPK 210a and updates or creates a new service decryption information 212a and sends new SEPK 210a and new service decryption information 212a back to e-PVR 110 to be stored as part of media package 306.

In some cases it may be sufficient to instead of decrypting SEPK 210, that it be encrypted again using re-encryption description 454. To obtain program key 200, SEPK 210 must be decrypted multiple times (once for each encryption process that it has been subjected to). Service decryption information 212 is updated to reflect each encryption performed on SEPK 210.

It is also anticipated that when a threshold is exceeded (such as a time limit, a change to the local digital system, a number of presentations of media content 302, a random number provided by a random number generator, or a command from distribution service 120) that e-PVR 110 sends decryption request message 430 with decryption flag indicating that media content 302 is to be re-encrypted to distribution service 120. As before re-encryption message 450 (see FIG. 14) is returned allowing security module 270 to decrypt SEPK 210, revealing program key 200 that is used to decrypt media content 302. Decrypted media content 302 is then re-encrypted using content re-encryption description 452 by security module 270. A new SEPK 210a and service decryption information 212a are also sent in re-encryption message 450 and stored as part of media package 306. Alternately, program key 200 is sent by the distribution service 120 and is then re-encrypted as new SEPK 210a by security module 270, using re-encryption description 454. New service decryption information 212a is also created to reflect the decryption process used to decrypt SEPK 210a. SEPK 210a and service decryption information 212a are then stored as part media package 306. It is also anticipated that a new program key can be created using local security database 345 or security module 270 or both, thus without contacting distribution service 120.

THIRD EMBODIMENT

In a third and preferred embodiment, media package 306 includes program key 200 encrypted as SEPK 210, and includes service decryption information 212 as described in the second embodiment, but also additionally includes LEPK 220, and local decryption information 222. It is anticipated that media packages 106 in the other embodiments may be transformed to comport with this embodiment, for example by automated processes or as described below, while of course maintaining the security of the encryption systems in place.

As in the second embodiment media content 302 is encrypted in such a way that a code, algorithm, or process referred to as a program key 200 can be used to decrypt media content 302 and if needed, media information 304 at any time. However, program key 200 is encrypted as SEPK 210 and service decryption information 212 is also prepared, as in the second embodiment.

Certain payment options described below allow e-PVR 110 to send decryption request message 430 including payment 434. When distribution service 120 approves payment 434, decryption message 440 is prepared by distribution service 120 and sent to e-PVR 110. In turn security module 270 uses decryption description 442 to decrypt SEPK 210 to reveal program key 200. Program key 200 is then re-encrypted using second encryption process that is related to e-PVR 110 and digital system 250 and stored as LEPK 220. Information about LEPK 220 or how it can be decrypted is stored in local decryption information 222. As mentioned, use of LEPK 220 is typically related to various payment options described below under "Paying for Media Content" and also controls the ability of users 112 to transfer the content to other users 112a.

In this embodiment to present media content 302, e-PVR 110 preferably determines if LEPK 220 is present. If it is present, e-PVR 110 attempts to decrypt LEPK 220 without contacting distribution service 120. To this end e-PVR 110 uses local decryption information 222 and other locally available information to determine how to decrypt LEPK 220 to reveal program key 200, which in turn is used to decrypt media content 302 for presentation.

Figure 21:
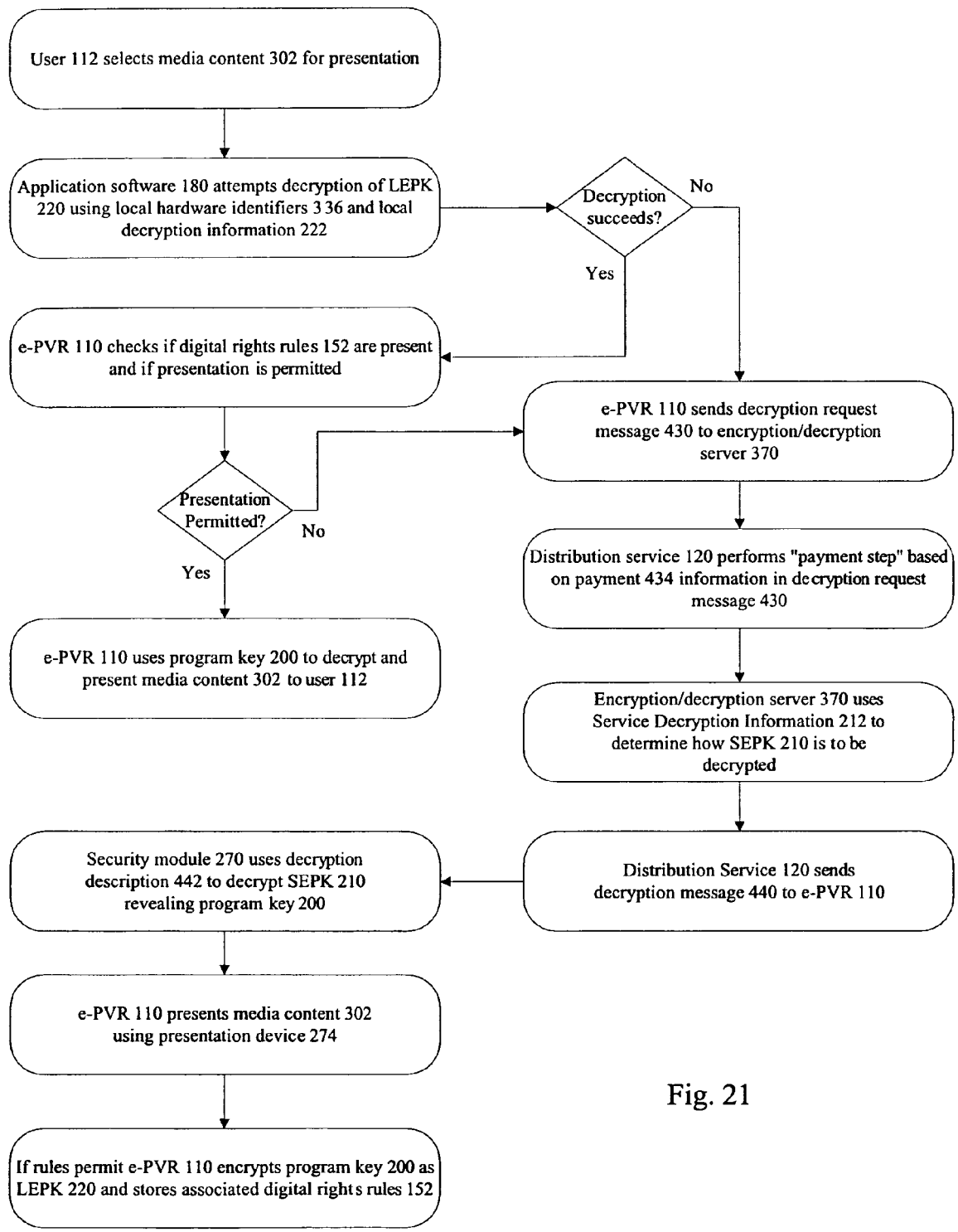
FIG. 21 is a flowchart showing the typical steps used to obtain, decrypt, and present media content for in third embodiment.

When LEPK 220 is not present or cannot be decrypted (for example when stored media package 306 has been transferred from a second e-PVR 110b) e-PVR 110 creates decryption request message 430 from service decryption information 212 and/SEPK 210. As previously described, distribution service 120 uses decryption request message 430 to create decryption message 440, which is sent to e-PVR 110, where security module 270 uses it to decrypt SEPK 210 to reveal program key 200. See FIG. 21 for an illustration of a typical sequence of events needed to present media content in this embodiment.

All e-PVRs 110, or 110a on a common digital system 250 may use similar methods to encrypt program key 200, for example, by selecting an encryption algorithm and/or common private key from a local security database 345, thus creating LEPK 220 and local decryption information 222. It is preferred that no two e-PVRs 110 and 110b in separate digital systems 250 and 250a encrypt program key 200 identically, but two e-PVRs 110 and 110a in the same digital system 250 do, thus allowing decryption and presentation of media content 302 anywhere in the same digital system 250. To do so e-PVR 110 when creating LEPK 220 and local decryption information 222 can query the local digital system 250 to find the local hardware identifiers 336 needed. e-PVR 110 can also be given a unique public-private or private key list when it is manufactured and this can be stored in the common local library 340 as part of e-PVR information 160. The common local library 340 can then be shared between all the e-PVRs 110 on the local digital system 250. Another approach available to encrypt program key 200 is to use an encryption code based on a least a portion of the local hardware identifiers 336 on digital system 250 such as media access control (MAC) addresses, which are part of every Ethernet and Internet connection point. In a typical digital system 250 with an e-PVR 110 there are at least 2 unique MAC addresses 338 present— one for network interface 256 of e-PVR 110 and another related to Internet gateway connection 290. Others are also likely to be present such as a PC 350 or printers and other devices. Any combination of processor serial numbers, an account number related to owner 132 and MAC addresses 338 can be used for this purpose. The preferred method in this invention is to use MAC Addresses 338 because these are obtained using a broadcast message, which by the rules of current network protocols does not travel beyond the "local subnet", in this case the local digital system 250. This limits the decryption of content locally to a single home, business or similar entity.

One advantage of using MAC addresses 338 is that to find the key all the devices will need to be "hacked" (i.e. their security is compromised by a malicious user) to obtain or "spoof" their MAC addresses 338, which is more difficult to do than to get the MAC address 338 for a single type of device. Also, "hacking" or "spoofing" of multiple devices even of the same type is harder than for a single device. Additionally, MAC addresses 338 are easily obtainable on digital system 250 not only from e-PVRs discussed herein, but also from devices other than e-PVRs. In an alternative scenario, other local hardware identifiers 336 may be used such as the serial numbers of e-PVRs 110, and these can be requested by one e-PVR 110 from another e-PVR 110a easily over a digital system 250 that contains for example an Ethernet network.

These local hardware identifiers 336 need not be shared with distribution service 120—however, distribution service 120 may keep a record of such addresses and their associated digital systems 250 or user accounts, to prevent "spoofing" of hardware identifiers 336. Local hardware identifiers 336 can also be obtained as needed for example by application software 180 by querying the hardware. Security module 270 can use these local identifiers with the time of day and/or media information 304 or a construct derived from media content 302 (for example a hash table based on media content 302) to determine an encryption process or code to encrypt program key 200. However, even when program key 200 is created from purely local information, e-PVR 110 may obtain the algorithm or process from encryption/decryption server 370, which is part of distribution service 120.

The most important advantage of using MAC addresses 338 or other localized hardware identifiers 336 is that no second e-PVR 110b in a second digital system 250a can decrypt LEPK 220 should stored media package 306 be transferred to a second e-PVR 110b because it will not have access to these same information.

Some provision must be made to allow equipment in digital system 250 to be replaced over time, and therefore MAC addresses 338 or other identifiers will change. Hence historical MAC addresses 338 can be stored in a MAC address list 339 for use and this can be stored in e-PVR information 160 either by itself or as part of common local library 340. Similarly historical local hardware identifiers 336 can be saved to a local hardware identifiers list 337. If decryption fails, MAC addresses 338 from MAC address list 339 or local hardware identifiers 336 from local hardware identifiers list 337 can be used as a backup. If the media content 302 or LEPK 220 had been encrypted with old MAC addresses 338 no longer on digital system 250, the MAC address list 339 will provide these addresses. When such a situation occurs, e-PVR 110 may decrypt all LEPKs 220 using the MAC address list 339 in conjunction with current MAC addresses 338 and the corresponding local decryption information 222. Having done this each program key 200 is revealed which e-PVR 110 then encrypts again using the new set of MAC addresses 338 or other new information to create new LEPKs 220a. Local decryption information 222 is also updated (as local decryption information 222a) indicating how LEPK 220a is to be decrypted. This process can be a part of the normal re-encryption process based on a threshold being exceeded as described below and in other embodiments. Additionally, e-PVR 110 can retain a history of all local information, in case there is any media package 306 that needs to be decrypted for presentation before it has been re-encrypted with the new information.

An advantage of using a pool of addresses or identifiers or a combination of them that is localized allows for the moving of content from one e-PVR 110 to another e-PVR 110a or even for example, a personal computer 350 within the same digital system 250, thus allowing "Fair Use". "Fair Use" is the common name given to certain rights granted in the USA, that, among other things, allow a user to view legally purchased content on any device owned by the same user.

In some cases the local hardware identifiers 336 can be used only to monitor that e-PVR 110 and its content hasn't been transferred inappropriately. For example, e-PVR 110 can refuse to decrypt LEPK 220, in some cases SEPK 210, or media content 302 or even update it's local decryption information if all of the local hardware identifiers 336 are changed at the same time. An appropriate algorithm would let the user remove and replace any one device corresponding to at least one local hardware identifier and would also allow for brief periods of time when such a device is not available, such as when it is powered down or when, say, a laptop is taken to a different location. e-PVR 110 can detect this change and add or remove any changed hardware identifiers 336 or in some cases ignore the change for a period of time.

Similar to the re-encryption of SEPK 210 described in the second embodiment, LEPK 220 can be decrypted and encrypted again based upon a threshold being met. In this case security module 270 decrypts LEPK 220 to reveal program key 200. Next security module determines the new code, algorithm, or process to be used to encrypt program key 200 to create a new LEPK 220a and updated local decryption information 222a. This is then substituted for the previous LEPK 220 and local decryption information 222 in media package 306.

As in the second embodiment, media content 302 can be decrypted and re-encrypted based on a threshold being met or by request of distribution service 120. When this happens a new program key 200a is generated along with new SEPK 210 and service decryption information 212. However, now e-PVR 110 must also re-encrypt program key 200a as new LEPK 220a and new local decryption information 222a and store them as part of media package 306.

It is anticipated that when e-PVR 110 receives media package 106 in some case only space for LEPK 220 and local decryption information 222 may be provided. Also as mentioned above, LEPK 220 and local decryption information 222 may be provided but will be unusable when they have been created on a different e-PVR 110b in a different digital system 250a, because they are designed to be used only with the same digital system 250 that they were created on.

FOURTH EMBODIMENT

In some cases, such as when media content 302 is created or recorded by the owner of e-PVR 110, SEPK 210 is not available nor stored as part of media package 306, although an empty location for this information may be present. Only LEPK 220 and local decryption information 222 need be present. Media content 302 in this case is encrypted with program key 200 and this is then encrypted as LEPK 220 as in previous embodiments.

In a situation where media content 102 is received without media information 104, it can be obtained as more fully described under "Recording Media Content from Video Input" later in this document. However, by way of example external information such as a schedule, which can provide the name and description of the content based on the time and channel it was broadcast, can be used to obtain media information 104. To do this, application software 180 on e-PVR 110 sends a request to distribution service 120 in the form of information request message 460 (see FIG. 15) and can include program schedule information. At distribution service 120, media information 104 may be created automatically by software or manually by personnel based on the information supplied, especially recording information 462 and e-PVR information 160. However, when media information 104 is not available, or for legal or administrative reasons media content 102 cannot be distributed, information message 470 (see FIG. 16) that is returned to e-PVR 110 will not contain owner 132 information or will contain a flag or some other information that allows e-PVR 110 to determine that it is not distributable.

e-PVR 110 will send encryption request message 480 (see FIG. 17) containing at least a portion of e-PVR information 160. Distribution service 120 then returns encryption message 450, which contains content encryption description 452 (previously referred to as content re-encryption description 452, but in this case media content and/or program key 200 have not previously been encrypted). In addition encryption flag 472 is sent specifying that media content 302 is to be encrypted and program key 200 created for it. Media content 302 is therefore encrypted using content encryption description 452 and stored in media package 306. In addition program key 200 is further encrypted and stored as LEPK 220 and local decryption information 222 is created, which is used along with e-PVR information 160 to decrypt LEPK 220. This last step may use encryption description 454 included in encryption message 450, but this information is then stored locally including portions of it being stored as local decryption information 222, so that LEPK can be decrypted as required without contacting distribution service. Of course, content encryption description 452 may also be kept locally since it is needed to decrypt media content 302 using program key 200. More information about this scenario, where content cannot be redistributed is more fully described under "Recording & Creating Media Content".

In this case, media information 104 is still supplied to application software 180; however, it may have limited information in it. One element that may be placed in media information 104 is a flag signifying that the content is not distributable and optionally a date of the refusal. This allows the application software 180 to repeat the request when a sufficient time has elapsed. Distribution service 120 can choose to reject the request if it determines that sufficient time has not elapsed for another request to be presented.

Thus, in some cases, an SEPK 210 is not provided to the e-PVR 110 for this media package 306 and the program key 200 can only be obtained by decrypting the LEPK 220. Since the LEPK 220 is shared by all e-PVRs 110, 110a to 110n etc. within the same digital system 250, those e-PVRs will be able to decrypt and present the media content 302 to the user at any time, (thus allowing for "fair use" as defined in the USA). However, when user of e-PVR 110 sends this content to a different user of e-PVR 110b in a different digital system 250a, that e-PVR 110b cannot construct the appropriate LEPK 220 because the digital system and hence local information is different and hence will not be able to decrypt and present the media content 302, thus protecting the rights of content owner 132.

Media information 104 for the above media package 306 may contain some information that was described above, such as the name, description and so on, captured from a schedule or external database or service. User 112 of e-PVR 110 where the content was recorded, may be allowed to edit media information using media editing, creation, or enhancement software 272 to the extent of editing the titles, descriptions etc. since redistribution is not possible in any case.

ELEMENTS COMMON TO ALL EMBODIMENTS

As described in the various embodiments, the ability of anyone to decrypt media content 302 is severely limited. Even if a variety of advanced programs were applied to crack or by trial and error to decrypt SEPK 210 they are likely to take so long that SEPK 210 may have changed and/or the encryption of media content 302 will have changed, forcing a cracking program to restart. Similarly if someone tries a variety of techniques to crack LEPK 220, they are likely to take so long to crack it that the LEPK 220 may have changed, and/or the encryption of media content 302 may have changed. Note that any or all of a code, algorithm or process may have changed, so that determining for example the algorithm used may still not allow decryption of the LEPK 220, the SEPK 210 or the media content 302, because the process or key may remain unknown. Again, this applies to program key 200 as well—any attempted cracking will likely not be useful, because of the above reasons.

It is anticipated that either by design or by coincidence, two or more of the codes, algorithms or processes used to encrypt or decrypt SEPK 210, LEPK 220 or media content 302 may be the same. However, by the nature of the process, "Payment Step" as described elsewhere and referenced above may still take place as described under the various embodiments and "Paying for Media Content" below, so that the rights of the content owner 132 are always protected.

It should also be noted that any of the codes, algorithm, or processes used to decrypt SEPK 210, LEPK 220, media information 304 (when encrypted), or media content 302 can be obtained by e-PVR 110 from distribution service 120 before they are actually needed, and these can be stored locally in a local security database 345 (which can preferably be encrypted as well) to be used when needed. This allows e-PVR 110 to be able to present media content 302 even in the event of a short-term failure of communication between e-PVR 110 and distribution service 120 (e.g. when Internet connectivity is lost for a period of time). Distribution service 120 may send new or replacement code, algorithms, or processes as they become available, after a specific time interval passes, when a media package 106 is obtained, or on request from e-PVR 110. The actual decryption information stored locally can be cloaked as described under "Encryption Information Cloaking", so that a malicious user cannot obtain decryption information even if the stored name or identifier of the decryption process, algorithm or code are discovered.

Also, the encryption/decryption information can be obtained from a card or device inserted into or read by e-PVR such as a user identity card, or fingerprint recognition module. However, in this description, for the sake of clarity, security module 270 is described as interacting with encryption/decryption server 370 or simply with distribution service 120 and in some cases with local security database 345.

As described above, media content 302, SEPK 210 and/or LEPK 220 may be re-encrypted. In some cases it may be sufficient to instead of decrypting media content 302 and then re-encrypt it, that it instead be encrypted again using content re-encryption description 452. To obtain media content 302, it must be decrypted multiple times (once for each encryption process that it has been subjected to). Decryption information 138 is updated to reflect each encryption performed on media content 302. Similarly, in some cases it may be sufficient to instead of decrypting SEPK 210, or LEPK 220 that it be encrypted again using re-encryption description 454. To obtain program key 200, SEPK 210 must be decrypted multiple times (once for each encryption process that it has been subjected to). Service decryption information 212 is updated to reflect each encryption performed on SEPK 210.

Transferring Media Content

An advantage of the four embodiments is that they can track and limit how stored media package 306 can be transferred from one e-PVR 110 in digital system 250 to another e-PVR 110b in second digital system 250a. Consider the first embodiment, where stored media package 306 can be copied from one e-PVR 110 to a second e-PVR 110b in a different digital system 250a, by any means of transferring electronic data, such as by copying it to a DVD or CD using e-PVR 110 and then copying from the DVD to a second e-PVR 110b or by transferring it via network 150 from one e-PVR 110 to the other. When the second e-PVR 110b attempts to play the copied stored media content 302, it will attempt decryption of LEPK 220, which will of course fail since LEPK 220 is not present at all and SEPK 210 is also not present. Hence, distribution service 120 will receive decryption request message 430 requesting a decryption message 440. Provided the various steps as described in the appropriate embodiment takes place including a "payment step" and receiving decryption information to decrypt SEPK 210, media content 302 can be decrypted and presented. The steps required to decrypt and present the media content may vary in the various embodiments.

In some cases media information 304 will include an identifier of the first e-PVR 110 that stored media package 306. When this identifier is sent as part of media information 304 to distribution service 120 the original e-PVR 110 from which the stored media content 302 was obtained is identified and can be tracked by distribution service 120. When desired, a portion of e-PVR information 160a of the second e-PVR 110 can then overwrite the e-PVR information 160 stored in media information 304. This can then be used to identify the second e-PVR 110b should it send a copy of stored media package 306 to yet another e-PVR 110c in yet another digital system 250c.

In the second embodiment, when stored media package 306 is sent to a second e-PVR 110b and is to be presented, again LEPK 220 is not present and therefore second e-PVR 112b sends decryption request message 430 to distribution service 120. Distribution service 120 performs a payment step, after which decryption message 440 is sent to second e-PVR 110b so that SEPK 210 can be decrypted revealing program key 200 that is then used to decrypt media content 302. As with the first embodiment, a portion of e-PVR information 160 for the original e-PVR 110 can be included in service decryption information 212 sent as part of decryption request message 430. Distribution service 120 can use this to determine from which e-PVR 110 the second e-PVR 110b obtained the stored media package 306. Once this has been determined the distribution service 120 or the second e-PVR 110b can overwrite this section of the service decryption information 212 with a similar portion of e-PVR information 160a so if the stored media package 306 is later transferred to a third e-PVR 110c the second e-PVR 110b can be identified as the one that sent it to them.

In the third embodiment, when stored media package 306 is sent to a second e-PVR 110b and is to be presented, the second e-PVR 110b attempts first to decrypt LEPK 220 using local decryption information 222. However, since the second e-PVR 110a does not have access to the same local library as e-PVR 110, where the LEPK 220 was created, LEPK 220 cannot be decrypted.

When the owner of e-PVR 110 is also owner 132 of media content 302 and has included media information 304 sufficient to identify the media content 302 and the owner 132, second e-PVR 110b can send decryption request message 430 to the distribution service with media information 304 which contains the unique media content identifier 130 and owner 132 information, this being sufficient to identify the media package 306 and media content 302. If the media content 302 has been registered with distribution service 120 by user of e-PVR 110, decryption message 440 can be sent from distribution service 120 to the second e-PVR 110b allowing SEPK 210 for media package 306 to be decrypted. If the package has not been registered, distribution service 120 may contact the original e-PVR 110, and, assuming it is available, request the e-PVR 110 to register the media content 102.

When stored media package 306 was provided by but not created by the first e-PVR 110 LEPK 220 may be present or not, but to present media content 302 on e-PVR 110b, SEPK 210 and subsequently program key 200 must be decrypted, since LEPK 220 is not present or cannot be decrypted. Second e-PVR 110b sends decryption request message 430 to distribution service 120. Distribution service 120 performs a "Payment Step" and when this is successful, it can send decryption message 440 to the second e-PVR 110b. This message allows second e-PVR 110b to decrypt SEPK 210, revealing program key 200, which in turn is used to decrypt media content 302 for presentation. However, as before distribution system can track which e-PVR 110 provided the copy of media content 302. Presumably, in this case LEPK 220 and local decryption information 222 (when present) can be removed from media package 306, as it cannot be used. However, a new LEPK 220a and local decryption information 222a can be created by second e-PVR 110b as explained in the third embodiment.

Also in the third embodiment, if the media package is transferred from e-PVR 110 to a second e-PVR 110a residing on the same digital system 250, the second e-PVR 110a has access to the same common local library 340 and other local information that can be accessed directly, for example MAC addresses 338 on the local digital system 250. Thus, this second e-PVR 110a can decrypt LEPK 220 if desired and therefore program key 200 and present the media content 302 to user 112. In this case, e-PVR 110a can find the information needed to decrypt program key 200 locally in the local security database 345. However, the ability to decrypt program key 200 and present media content 302 may be controlled by digital rights rules 152 as described below under "Paying for Media Content".

In each of these embodiments, stored media package 306 can be easily transferred from one e-PVR 110 to a second e-PVR 110b by making copies with a DVD or transferring it via network 150 or by any other means or media used to transfer electronic data. Distribution service 120 may not be involved in the transfer, but in order to present stored media content 302 using the second e-PVR 110b distribution service 120 must be contacted to get decryption message 440 and in some cases originating e-PVR 110 must be contacted as well.

In the fourth embodiment media content 302 cannot be shared outside of the digital system 250 that it was created in. When media package 306 is transferred to e-PVR 110b from e-PVR 110 where it was created or recorded, it contains only LEPK 220 and local decryption information 222 which e-PVR 110b does not have. Also, SEPK 210 and service decryption information 212 are not present so again e-PVR 110b cannot decrypt and obtain the program key and therefore cannot present media content 302.

Additionally, or alternately, application software 180 can, at regular intervals perform an inventory of all media packages 306 locally available and report their unique media content identifier 130 to distribution service 120. It can provide a comprehensive list or it can provide just the changes since the most recent previous update. Along with this information it can also provide e-PVR information 160 such as user account information and the like. Distribution service 120 can thus track each media package and provide a report to content owner 132 of a specific media content allowing them to improve their distribution efforts.

Paying for Media Content

Media content 102 is frequently very expensive to professionally produce. Writers, actors, directors, camera crews, as well as studio space must all be paid for. To be repaid for these costs, owner 132 of media content 102 may want to charge a price for it to be presented by e-PVR 110.

With conventional television broadcasting these costs are paid by sponsors who pay to have commercials promoting their products or services presented during a program. There are also publicly funded channels that operate commercial free and raise money in order to operate. There are also cable and satellite subscription services that charge fees monthly or on a pay-per-view basis. Also conventional distribution of video content using for example rentals or sales of physical media (DVD, Video cassettes etc.) consist of providing the user with media content and some business rules by which the user is charged and the owner is paid, often indirectly by the distributor who actually provides the content to the consumer.

Thus, it is anticipated that the distribution service 120 will have to charge users of e-PVRs to view media content 302 in order to provide payments to owner 132 of media content 102 that is obtained and presented. There are several payment plans envisioned such as recurring (e.g. monthly) fee, pay-per-view, content purchase, sponsor payment and others. These have many common elements described below. These and many other potential plans are compatible with any of the four embodiments previously described.

Each media package 106 is associated with cost 134. Cost 134 in its simplest form may simply be a number entered by owner 132 or an agent that is embedded in media package 106 as part of media information 104. However, cost 134 can be also a set of rules, or it can be a link to distribution service 120 or general purpose server 378 owned or operated by the owner 132 where a cost is computed. The difference is that in the case where cost or cost rules are entirely within media information 304, e-PVR 110 can present the cost 134 to the user without having to communicate with distribution service 120 or any other server, and in the other cases e-PVR 110 must communicate a portion of media information 304 from media package 306 and/or a portion of e-PVR information 160 to distribution service 120 or owner 132 in order to obtain the numeric cost.

It is expected that most owners 132 of media content 302 may enter a set of rules specifying different pricing based on geography, time-of-day and other such variables, many of them derived from e-PVR information 160. By supplying appropriate rules owner 132 can vary pricing not just by physical geography, but for example by markets, demographics and date/time parameters as well. To extend this example, by supplying rules that specify pricing only for specific geographies, and not including a "default" rule, that is a rule that is used when no rule is available for that condition, owner 132 can effectively block media content 102 from being presented (i.e. viewed) in some geographies. Also, rules can be very granular, since by using lists of users or user information in the rules, even a single user account can be targeted for a specific cost.

Additionally, owners 132 may simply provide link to additional information 140, such as a Uniform Resource Locator (URL) for example linking to general purpose server 378, where cost 134 can be obtained. Again, at the location specified by the URL, cost 134 need not be just a number but can be a set of rules, or an executable script or program that provides different pricing based on variables as specified above. To find a link-based cost, e-PVR 110 may send a portion of e-PVR information 160 and/or a portion of media information 304 as a variable parameter in the URL specified in cost 134 in order to allow the server at that URL to determine the actual numeric cost 134.

Thus, cost 134 can be specified by any combination of a numeric cost, local rules, link-based rules and link-based numeric costs with nested levels. Rules can use statements that specify combinations of numeric values and the variables described above, as well as operators such as "and", "if", "or" and others commonly used in scripting languages. In some cases, the URL can also be a script that executes on general purpose server 378 to provide cost 134. The input for the script can consist of portions of e-PVR information 160 or media information 304 described above.

An advantage of this method is that owner 132 of media content 302 can vary cost 134 at any time by editing a location on a general purpose server 378 owned or operated by them. Cost 134 can be varied based on the popularity of specific media content 302. Owner 132 can also make media content 102 unavailable by either making cost 134 prohibitive or invalid (for example, by using an infinite number), or by using rules that effectively result in a null set of users. Additionally, cost 134 can consist of multiple payments to multiple entities, such as owner 132, a distributor, an actor, or studio that receives part of their income as royalty when media content 102 is presented. These multiple payments can be created by the owner 132 as part of the cost rules in original media package 106; and it can optionally consist of at least one additional cost 134*a* added by a different user of a second e-PVR 110*b* in addition to the original cost 134 to create a new cost 134*b* as described later in "Enhancing Media Package". This additional payment may be for a value-added service such as enhancing media package 306 by adding subtitles for example, but a user 112 acting purely as a distributor may also add additional cost 134*a* to the initial cost 134. This cost 134*a* may be hidden from the user in the sense that only the sum of cost 134 and cost 134*a* (i.e. cost 134*b*) is presented to the user when asked to choose a payment option, or if a default payment option exists, it may automatically be charged in the amount of cost 134*b*. Finally, cost 134 can specify an automated charge to a specified sponsor 230 (as opposed to the user of e-PVR 110) who has included a sponsored message (commonly referred to as "product placement") as part of media content 102. The charge to the sponsor 230 results in a payment to owner 132 and/or distribution service 120 and may or may or may not be equal to the full cost 134 specified by owner. Sponsor 230 must of course have an account with distribution service 120 so that the appropriate amounts may be collected.

Each user 112 of e-PVR 110 is associated with at least one distribution service 120 payment account, for example e-PVR information 160 can store an account number that distribution service 120 uses to match with a similar number stored in payment server 372. In some cases, multiple users 112, 112*a* . . . 112*n* may be associated with the same account (such as multiple persons in a household), and any such user or users together or separately can be associated with multiple accounts. When a match is found in information in payment server 372, distribution service 120 may determine if it is in good standing. Payment server 372 can be run by distribution service 120 or can be an independent operation run by a credit card company or a service such as PayPal. User account described above may be different from an identifier or account used by e-PVR 110 to identify itself to distribution service 120 or to other entities such as other e-PVRs 110*b*.

Whenever a financial transaction may be involved such as when media content 302 has to be decrypted and presented, the process is as follows and is called the "Payment Step" throughout this document. As described previously in the various embodiments, decryption description 442 is used (often in conjunction with SEPK 210) to decrypt the media content 302. In order to obtain decryption description 442 from distribution service 120 security module 270 sends a decryption request message 430 in which user payment 434 is included and decryption flag 432 is set so that distribution service 120 recognizes this as a financial transaction. Decryption flag 432 or user payment 434 may also contain the type of transaction (i.e. subscription, pay-per-view, sponsor supported and so on). Several of these transaction types are described next, and any of them as well as a combination may be used to pay or a specific item of media content. Note that the "Payment Step" is typically performed when SEPK 210 is to be decrypted. However, in some scenarios, it is anticipated that it can be performed when media content 302 is to be decrypted.

User payment 434 contains the amount to be paid and can also contain the payee information. The user account information is included as part of e-PVR information 160 that is sent with decryption request message 430. The various servers then determine the validity of the account (e.g. if it is in good standing) or of the e-PVR 110, choose the type of transaction and complete the financial transaction with actual credits and debits to the various accounts if necessary, and if successful, a decryption message 440 is returned to the e-PVR.

The users financial account may be charged directly for the payment required, or in some cases it may be credited, if the net cost of the content is negative. User may also be able to pay using other means such as a credit card and presumably can enter the numbers using input devices 286 or even a credit card reader attached to e-PVR 110. In some cases, based on the contents of decryption flag 432, the "Payment Step" only recognizes that the media content will be watched free with informative messages 312 as described below and sets up the processes need to make that happen. The processes involved in using informative messages 312 for payment are described below in greater detail but it should be noted that using informative messages 312 is acceptable method of payment as part of "Payment Step". In some cases, "Payment Step" could also mean verification of a login and password combination and this combination may be passed on to an independent subscription service, which validates the login and returns a message to that effect. The subscription service may in turn pay content owners or not. This login process also constitutes an acceptable method of payment as part of "Payment Step". Any and all of these methods of payment may be used in combination.

Part of the financial transaction may involve transferring a portion of payment 434 to owner 132 or a subscription service and/or distribution service 120. Any and all of these parties may be responsible for checking the validity of the account and for the completion of the transaction and may return a "failed" or "successful" message as an outcome of the transaction. However, the original distribution service 120 will presumably deduct a transaction or service fee to manage the transaction.

Whether an actual transaction happens or the various accounts are simply verified depends on the type of payment (i.e. subscription, pay-per-view, sponsor paid and so on) as described below, and also depends on the amount of the transaction—for example, no account is charged when the cost 134 is zero. However, in some cases where effective cost 134 is zero to the user because the user's viewing of media content 302 is paid by including informative messages 312 from one or more sponsors 230, the account of sponsors 230 may be charged (i.e. debited) and the account of owner 132 (and others such as Media Enhancer) may be credited. Furthermore, no matter whether the transaction results in a charge to the user or not, distribution server 374 or in some cases payment server 372 records the transaction details for logging and reporting purposes.

All or part of this transaction can happen locally, if application software 180 detects, based on user input or current settings that it is the preferred method. Then at certain intervals, the consolidated record of all the transactions may be sent to the payment server 372 and the users financial account is reconciled. The length of the interval may be based on several administrative factors including qualification of users financial stability and the length and stability of the users account with the distribution service. Thus, if the connection to payment server 372 is not present for any reason and application software 180 determines that it may complete and save the transaction locally (based on the previously described parameters) for eventual reconciliation with a payment server, it may do so. This prevents user dissatisfaction from failed transactions due to failures of networks or servers.

Based on user preferences found for example in user preferences/profiles 334, user may not be shown the cost 134 and by extension payment 434 and it may automatically be charged, or the content may automatically be presented with informative messages 312 shown after each section 170. User can change this setting any time and can also override it for a single transaction if desired.

Also, some of the various payment plans are described next and it should be noted that a plan can be selected automatically by e-PVR 110 based again on user profile information described above and overridden as described through actions of user 112.

The recurring payment plan requires the owner of e-PVR 110 to pay a specified amount to a subscription service each time period (say monthly) in order to obtain and view a variety of media content 102. Presumably a list of such media content 102 is provided to the owner of e-PVR 110 to select amongst. When e-PVR 110 selects stored media package 306 to present, program key 200 is obtained as described in the various embodiments after one or more decryption steps and a "payment step" is completed as described above. The program key 200 is used to decrypt media content 302, which is then presented to the user by e-PVR 110, typically without commercial messages. The price to present this media content 302 is included in media information 304 as cost 134. Cost 134 can specify, using the rules based approach, a different (or even zero) cost for media content 102 obtained as part of a subscription. To present this cost 134 to the user, e-PVR 110 may send e-PVR information 160 to the distribution service which may in turn forward the information or relevant parts of it to the subscription service.

The pay-per-view plan requires the owner of e-PVR 110 to pay a specified amount to owner 132 and/or distribution service 120 to present media content 302. Note that in practice, pay-per-view can include multiple views or an allowed time period that the user can view the said content for a single payment. When stored media package 306 is selected for presentation, cost 134 may be presented to the user of e-PVR 110. Cost 134 can be obtained from media information 304 locally or externally as described above. When the user decides to view stored media content 302, after appropriate decryption steps are undertaken, the "Payment Step" detailed above is taken and a program key 200 is obtained. When a payment 434 is associated with multiple presentations of media content 302, SEPK 210 can be decrypted to reveal program key 200 which can then be encrypted locally as LEPK 220 and local decryption information 222 is created and stored as part of media package 306.

Digital rights rules 152 (for example how many times the content can be watched or for what time period) are encrypted and saved using any encryption code, algorithm, or process desired, for example the same as that used to encrypt program key 200 as LEPK 220 or one specified by distribution service 120, for example using encryption description 454. These rules are checked and any counters (such as number of times watched) are changed each time the content is presented to the user. When the number of views or the time period has elapsed, the e-PVR 110 can remove the LEPK 220 or media content 302 is re-encrypted so as to make the content unusable without another "payment step". Alternately, nothing may be changed, as the digital rights rules 152 will likely be checked by application software 180 any time the media content 302 is requested and will find that the content cannot be presented, or the counting process described earlier may disallow it when the counter reaches a specified level. Since the SEPK 210 remains usable, the content can be presented again after the "Payment Step" and subsequent steps are repeated, and possibly another payment 434 is made.

In some cases the pay-per-view option only charges the account of the user of e-PVR 110 a cost apportioned to the amount of media content 302 that was actually presented. This is possible if each of content sections 170 have been assigned individual section cost 178 as described above. For example, should the viewer decide that they do not like stored media content 302 they can discontinue watching it by turning off e-PVR 110 or instructing it to terminate the presentation. In this case their account may only be charged a portion of cost 134 they previously agreed to. As a courtesy, media content 302 might be presented for a few minutes with no charges accrued to let the user of e-PVR 110 determine if they like it or consider it appropriate for their family. This concept can also be used in the sponsor payment plan described below. It is conceivable, that user may view non-contiguous portions of the media content by watching non-contiguous sections for example section 170, then section 170c etc. effectively creating a custom "trailer". The cost rules can be constructed such that if users total cost 134 for watching such a trailer is below a certain pre-determined threshold, user may not be charged any cost.

The content purchase plan is similar to the pay-per-view plan described above, but effectively allows unlimited views. Alternately, it may set the number of views sufficiently high that user 112 can realistically view media content 302 so many times that it would last their lifetime. This may help limit piracy, since, in case a malicious user may distribute the content and the decryption information, the number of views may be exhausted because too many people attempted to view the content. In this case the user of e-PVR 110 agrees to pay cost 134 that is associated with unlimited views. When the user of e-PVR 110 agrees to a purchase payment, decryption message 440 sent from distribution service 120 may include information that media content 302 can be presented as many times as desired and can now be saved in digital rights rules 152. Program key is obtained by decrypting SEPK 210 and encrypted as LEPK 220 and made part of media package 306. Similarly digital rights rules 152 can be encrypted using a local code, algorithm, or process (even the same ones used to encrypt program key 200 as LEPK 220) and stored as part of media package 306.

As previously explained (in "Transferring Media Content") should stored media package 306 be moved or transferred from one e-PVR 110 to a second e-PVR 110b it will not be possible to decrypt or present transferred media content 302 using LEPK 220 and local decryption information 222 on second e-PVR 110b even when it has been paid for by user 112 of first e-PVR 110. Second e-PVR 110b is not capable of decrypting LEPK 220 encrypted by the first e-PVR 110 since for local decryption information 222 to be used to decrypt LEPK 220 local hardware identifiers 336 must be the same, but second e-PVR 110b will have differing local hardware identifiers 336 and differing common local library 340 from e-PVR 110 and therefore will not be able to decrypt LEPK 220 or digital rights rules 152.

The sponsor payment plan is compatible with the other plans described above but can also stand on its own. Thus, it can be used for example to pay for single views of media content 302 or for subscriptions to content. It allows one or more sponsors 230 to pay part or all of cost 134 to present media content 302. For example it is anticipated that application software 180 can insert informative messages 312 at the beginning or end of each section 170, if the user has chosen to watch media content 302 in this format (i.e. watch content free in exchange for the presence of informative messages 312). In a preferred embodiment, informative messages 312 are not inserted into media content 302, but presentation of media content 302 is paused at the juncture of a section 170, then at least one informative message 312 can be presented, and after which media content is resumed once again.

In some cases, media content 302 has not been segmented and section flags 136 and therefore sections 170 may not be present, or media content consists of a single section 170. In this case, media content 302 may be paused at random or pre-selected times and at least an informative message 312 may then be presented. After informative messages 312 have been presented, the presentation of media content 320 begins from the same location where it was paused. The number of informative messages 312 presented each time media content is paused can be determined by simple arithmetic or a series of rules. For example, one method is to simply divide the duration of the media content 302 by the number of informative messages 312 that are to be presented. This can further be improved by playing multiple informative messages 312 at one time, and dividing the number of times the media content 302 needs to be paused by this number. Further, the group of informative messages 312 that are to be presented can be divided into a number of groups comprised of a random number of informative messages 312 (within some boundary limits) and these can then be presented at certain time intervals that are randomized within a certain window of time. Thus it is possible to present informative messages 312 during presentation of media content 302 even when media content 302 does not have multiple sections 170.

When media content 302 is selected for presentation the user of e-PVR 110 can be presented with cost 134 to pay. Should they select to not pay cost 134 or only to pay a portion of cost 134, application software 180 determines the amount of cost 134 that needs to be made up in order for application software 180 to request a decryption message allowing e-PVR 110 to present media content 302. Storage device 254 on e-PVR 110 contains informative messages 312 provided by sponsors 230 (see FIG. 6) that are willing to pay all or a portion of cost 134 of presenting the selected media content 302 in exchange for their informative messages 312 being presented before, during or after the selected media content 302 is presented for example after content corresponding to section 170. In some cases informative messages 312 are obtained from distribution service 120 or informative message server 380 only after media content 302 is selected for presentation. In some cases they are obtained only as needed for presentation, and in other cases they can be obtained and stored in storage device 254 in anticipation of use. Informative messages can be obtained by user 112 by selecting them from various sources or they can be obtained by e-PVR based on parameters such as the type of content present in contents 330 of e-PVR or based on user preferences/profiles 334 or even based on user 112 choices of selection of media content 102 or election of informative messages 312.

If the sum of payments 238 these sponsors 230 are willing to make exceeds cost 134 minus user payment 434 (which may or may not be zero), "payment step" as described above is completed as normal and user 112 initially pays full cost 134 as user payment 434. However, as informative messages 312 are viewed by user 112, payment 238 of each informative message 312 are credited to the users account, ultimately resulting in a zero cost to user 112, and a charge is made to the sponsor 230 who paid to present an informative message 312. In some cases, distribution service 120 may not charge user 112 the full amount initially and may wait until viewing is completed before executing a transaction of zero cost to user 112. Application software 180 also informs distribution service 120 of the list of informative messages 312 that have been presented to user 112. Distribution service 120 then charges the respective sponsors 230 for payment 238 they have agreed to pay.

As the informative messages 312 are viewed or deployed, application software 180 tracks them (for example by recording media content identifier 130) and may send the tracked information as individual or consolidated messages to distribution service 120. In some situations it is possible that the user's account may be credited with more than cost 134, or may be credited in such a manner to let them present other media content 302 at no charge or at a reduced cost. It is also possible that if sum of payments 238 by sponsors 230 are in excess of cost 134 to present media content 302, that distribution service 120 can keep the excess payments. Presumably some limit will be enforced to prevent users 112 of e-PVR 110 from being excessively annoyed by having too many informative messages 312 presented to them. It then decrypts media content 302 and plays it with one or more informative messages 312 inserted as required at the beginning or end of all or selected sections 170. Actual selection of informative messages 312 and when they are presented depends on a number of factors described below.

To promote greater clarity in this description, informative messages 312 will be referred to as always being inserted after a section 170. Informative messages 312 presented before the media content 302 is presented will still be referred to as being presented after section 170, in this case the initial section 170 is empty, null, or otherwise containing no content. Conceivably, sponsors 230 may be requested to pay higher amounts to have their informative message 312 presented after specific section 170 of media content 302 has been presented, for example at the being or end of a presentation.

Informative message 312 can include advertisements, commercials, interactive surveys (for example a message that requires the user of e-PVR 110 to press one or more buttons 282 on a remote control 280 for presentation of media content 302 to continue), or even allowing the sponsor 230 to send to the user of e-PVR 110 e-mail, voice mail or conventional mail messages in the future. It is anticipated that a conventional mail message may take the form of a specific advertisement that is printed in a magazine that the user of e-PVR 110 receives, for example printed on the back cover. In this manner a sponsor 230 might customize each magazine printed to reflect media content 302 recently presented. Presumably, distribution service 120 will remain in charge of or supervise another service (for example an ad agency) in the distribution of these informative messages, so the e-mail or street addresses are not provided to the sponsor 230 and the distribution service 120 can limit the number of such messages sent.

It should be noted that user 112 of e-PVR 110 can indicate their preferences, as stored in e-PVR information 160, regarding informative messages 312 that can be presented to them. For example some users may specify only informative messages 312 with certain ratings can be presented to them or that certain products cannot be presented to them, such as cigarettes, liquor, or other products they do not want to have presented. These choices can be different for the different users 112 and 112a of a single e-PVR 110. These preferences may limit the choice of which sponsors 230 can offer them informative messages 312, but at least these sponsors 230 will know they are more likely to be presenting informative messages 312 to a more appreciative audience instead of inadvertently alienating some portion of the audience.

In addition, user 112 can delete informative message package 316 with informative message 312 that they no longer want to watch or for any reason. This may restrict viewing if sufficient informative messages 312 are not available on the system in the future when the user wants to watch content using the sponsor payment plan. Users can also manually obtain (by downloading, copying etc.) or capture informative messages from any source in a manner identical to obtaining or capturing media content 302. Of course informative messages 312 can be encrypted (for example using techniques that allow program key 200 to decrypt it) and contain information so that distribution service 120 can check their validity according to its business rules. This prevents malicious users from changing the informative messages 312 or substituting them with their own or even changing payment information to somehow benefit from their malicious activity.

When e-PVR 110 determines that section 170 has been presented it then presents the informative message(s) 312 designated to follow that section 170. Informative messages 312 can be obtained prior to presenting media content 302, while media content 302 is being presented (but in advance of section 170 ending), or only when they are to be presented, that is in real time. The user of e-PVR 110 will usually not be allowed to skip over these informative messages 312 provided by sponsors 230 who have paid part or all of cost 134 associated with presenting media content 302, ensuring to these sponsors 230 that their potential customers see their informative messages 312. In some cases, users may be allowed to skip the informative messages for example by using remote control 280, but as application software 180 keeps track of such events, user 112 will not be credited with the payment of the informative messages 312 that were skipped and may eventually pay for the content being watched instead of receiving it free, and sponsors will not be charged if their informative message 232 is not viewed. Presumably, when users resort to such actions, the application software 180 will warn them that their actions may result in a financial charge.

Should the user 112 of e-PVR 110 terminate watching media content 302 before all sections 170 have been presented; sponsors 230 who agreed to pay for informative messages 312 to be presented after sections 170 of media content 302 that were not presented will not be charged, or if they have already been charged, may receive a credit to offset the charge. As described above, user 112 may be charged for the content if the owner 132 has not made a provision in their cost rules for a lower cost on partially watched media content 302.

Distribution service 120 may maintain a list of sponsors 230 who are willing to pay a portion of cost 134 to present media content 302. Such a list may be readily maintained for the most popular media content 302, for example recent or first run movies or popular television programs. However, distribution service 120 can also provide user profile information to potential sponsors 230. For example this information might categorize the annual income of users 112, where they live, how many people are in their family, the ages of family members, etc. The purpose of this is to allow a sponsor 230 to best determine what informative messages 312 they want to present and to whom. For example, a sponsor 230 that sells snow blowers may not want to advertise these products to an e-PVR 110 located in Florida. Some sponsors 230 may only want to have their informative messages 312 presented to families with infants or families within a specific income level. In this manner two families that live next door to each other that select the same media content 102 to present may see completely different informative messages 312. Even the same user 112 that watches the same media content 302 at different times of the day (for example mid-morning versus late at night) may see completely different informative messages 312 presented. Finally different users 112 and 112a watching the same media content 302 on the same e-PVR 110 at different times (or different e-PVRs 110 and 110a on the same digital system 250 at the same time) may have different informative messages presented to them, because their user preferences/profiles 334 are different.

Informative Message Use and Storage

Distribution service 120 can store informative messages 312, however these can also be stored on separate informative message server 380 maintained by sponsors 230 of informative message 312. Informative messages 312 such as commercials or an email message or the information needed to create informative messages 312 are stored as individual packages and obtained by the e-PVR from the appropriate informative message servers 380 by choosing them based on e-PVR information 160. For example, a zip code present in the user information; the professed preferences of the user in the user preferences/profile(s) 334 in user list 333, or the information learned by the application software 180 based on user choice of programming and ratings levels can be used to determine the specific informative messages 312 that are downloaded and placed on the e-PVR 110.

Users 112 can also manually download or otherwise obtain informative message packages 236 in the same way that they obtain media package 106. In other words, informative messages 232 can be downloaded as files or they can be recorded from a cable TV, streaming video or other channel. Informative message packages 236 are also stored as informative message packages 316 similar to media package 306, but some important parts may not exist, specifically, local decryption information 222, LEPK 220 as well as irrelevant portions of media information 234. Also, in most cases, section flags 136 if any, may identify only a single section 170 within an informative message 312.

As previously mentioned payment 238 is used (instead of, but similar to cost 134) in message information 234 and 314. Typically, presenting informative message 312 results in a credit to the user of e-PVR 110 and a debit to the sponsor of the informative message 312. Thus payment 238 can be seen as the mirror of cost 134 but sharing its attributes such as the way it is stored or computed. Informative messages 312 can also be encrypted as described in the embodiments. The format for informative message 312 is most likely to be similar to the first or second embodiments. Thus, to decrypt and present informative messages 312, security module 270 obtains decryption information in a manner identical to that described for the decryption of media content 102, including using payment 238 (instead of, but similar to cost 134) as part of the transaction.

Also, as described separately, payment 238 can be a combination of a set of rules or fixed numbers and can consist of a combination of information contained within the file or it can be a link to a computer that computes and transmits back a numeric cost based on rules, a script or program. These may be determined at least in part based on portions of e-PVR information 160 transmitted as part of the URL. Thus payment 238 for presenting informative message 312 can be different in different geographies or for different demographics, or even for different times and dates and using these date/time based rules, and informative message 312 may be displayed for only the period when they are relevant. Any number of complex rules based on e-PVR information 160, or other known parameters can be used to calculate payment 238. When the payment 238 or part of the payment 238 is a link to additional information this can similarly be varied based on rules or can be manually or arbitrarily changed by informative message sponsors 230 on a general purpose server 378 owned or operated by them. Presumably once they have been selected for presenting to the user 112, the changes will not be reflected on e-PVR 110.

Similarly, payment 238 (in informative message package 316 and similar to cost 134 associated with media content) can also be any combination of numeric values, rules, or links to additional information 140, which link to informative messages server 380 where the value of payment 238 can be obtained. Again, at the location specified by the URL, payment 238 need not be just a number but can be a set of rules that provide different pricing based on variables as specified above. To find a link-based value, e-PVR 110 may send e-PVR information 160 to the URL specified in 134 in order to allow the server at that URL to determine the correct payment 238. In addition, the same syntax is allowed so that payment 238 can be specified by any combination of a numeric cost, local rules, link-based rules and link-based numeric costs with nested levels. Rules can use statements that specify combinations of numeric values and the variables described above, as well as operators such as "and", "if", "or" and others commonly used in scripting languages. In some cases, the URL can also point to a script or program that executes for example on a general purpose server 378 to provide payment 238. The input for the script can consist of the variables described above.

When decrypted, application software 180 can verify, using distribution service 120, that the Unique Media Content identifier 130 of informative message 312 is valid before using it. In one embodiment, program key 200 for informative message 312 can then be encrypted as LEPK 220 and local decryption information 222 can be created. Thus, whenever informative message 312 is to be presented to the user it can most likely be decrypted locally, without having to contact encryption/decryption server 370.

Sponsor 230 may want to present their informative message 312 at certain locations in the presentation of the media content 104 and may be willing to pay an enhanced monetary or other consideration for such accurate placement. There are several ways in which this can be achieved and some methods are described next, although more are anticipated. Application software 180 can attempt to match keywords present in message information 314 of informative messages 312 and media information 304 of the content 302 as well as in the section information 174 of each of these. Thus, if application software 180 is able to find matching keywords in section information 174 of a specific section 170 of media content 302, and in message information 314 of informative message package 316 it can present that informative message 312 immediately before or after that section 170.

Additionally, owner 132 can embed a unique key into each section information 174 of media content 102, and then can provide this key to a specific sponsor 230 of informative message 312 so that sponsor 230 can embed the same code into their informative message package 236. Application software 180 can match these codes and insert the informative message 312 with a matching key at the correct location (that is, before or after section 170 in media content 302 which has the same key) when presenting media content 302 to user 112 of e-PVR 110. Presumably, the actual key is not provided to sponsor 230 of informative message 312, but an encrypted version is provided.

As described above, informative message package 236 is similar to media package 106 and can therefore contain section flags 136 and by extension sections 170, section data 172 and section information 174. As described elsewhere in this document, some of the sections can be replaced with newer sections by application software 180, which can also replace portions of media information 304 especially cost rules that specify for example the dates and times that this commercial is valid. Also, this can be done remotely on informative messages server 380 or general purpose server 378 simply by replacing rules associated with payment 238 (for example making the payment infinite or so high it can't be paid). Thus by replacing a few seconds of informative message 312, for example by replacing at least one section 170, and/or adjusting the payment 238 rules, sponsor 230 can keep their informative messages 312 "fresh" and relevant for a significant period of time without requiring users to repeatedly download large files.

Section Ratings and Skipping Content

User 112 of e-PVR 110 can use one or more buttons 282 or combination of buttons 282, 282*a* etc. on remote control 280 to change or indicate the acceptable threshold for media content 302 or informative messages 312 at any given time (even while watching media content 302) thus skipping specific sections 170 or 170*a* which do not match or are outside the parameters of that threshold. Owner 132 can determine these ratings and the sections 170 to which they apply and this information can be placed into media information 104. Alternately, they can be created by a third-party and added to the media information 104 using media editing, creation or enhancement software 272 as described more fully later in this description under "Enhancing Media Content".

In one usage scenario, user 112 of e-PVR 110 is an adult in whose preferences/profile 334, saved in user list 333 within e-PVR information 160, the threshold for viewing violence is say "50". The media content 302 currently being presented has several scenes of which two scenes corresponding to two sections 170 and 170*a* are rated on a violence scale, at say "55" and an additional two sections 170*b* and 170*c* (again corresponding to two scenes) are rated "45", the rest of the sections being unrated or below the value of "45". User 112 will see all of the media content 302 except those two scenes represented by the two sections 170 and 170*a*. However, while still watching the same media content 302, presume that a child (user 112*a*) joins the viewing, in response to which the original viewer presses a sequence of buttons on the remote control 280 in order to lower the threshold of acceptable violence to "40". Now, these two scenes represented by sections 170*b* and 170*c* will additionally be skipped while viewing in this session since their rating levels are above the new threshold, thereby reducing the total number of scenes by four scenes. Simply selecting a different profile with an appropriate threshold again using buttons on remote control 280 can also provide the same result.

Ratings in preferences/profiles 334 can also specify a range, so that when the rating of section 170 falls above or below the range, it will be skipped. The ability to rate sections and skip them can be used for other ratings such as sex or language or any other quantitative or qualitative ratings not described here.

Differing Media Packages to Distinguish Media Content

Media package 306 and second media package 306*a* whether when residing on the same e-PVR 110 or different e-PVRs 110 in digital system 250 and e-PVR 110*b* on different digital system 250 (or even e-PVR 110*a* in same digital system 250) for identical media content 102 may be different in that media information 104 may be different. For example, any of program key 200, LEPK 220, and local decryption information 222 may be different for two media packages 306 of the same media content 302 because they were obtained from different e-PVRs. Further, enhancements may have been made to one media package 306 in the form of additional media information 304a and not to another media package 306a containing identical media content 302. Or, one media package may have had a portion of it re-encrypted by the re-encryption process described earlier. For this reason, media package 306 may be given a unique media package identifier 131 different from media package 306a.

Having different unique media package identifier 131 allows the use of different encryption for each package and thus helps to enhance the security of the copy protection scheme, because it allows the distribution service to maintain different service decryption information 212 and SEPK 210 for the same content. Thus, even when a malicious user is able to "crack" the encryption scheme for one media content 302 on e-PVR 110, it may be impossible to use this information to "crack" the encryption scheme of the identical media content 302a on another e-PVR 110b, or even the same package after it has changed for example as a result of re-encryption as described above.

Sections with Content Identification

As described above, media content 102 can have a unique media content identifier 130, which can be assigned by owner 132, and consists of a unique string identifying at least the account of owner 132 to distribution service 120. Media package 106 containing media content 102 can also have a unique identifier a portion of which is the identifier of media content 102. Each section 170, 170a, etc. of a specific media content 102 also has a unique identifier, a portion of which is the name of the main media content 102. Thus a media package 106a can be created which contains at least one section 170 of media content 102, and this media package 106a can be recognized as being part of media package 106 based on the identifiers for the entirety of media content 102 and the section 170 of that same media content 102 and/or the identifiers of media package 106 and 106a.

This allows for several features, for example, it allows sections 170 to be downloaded more efficiently, by specifying different download locations for different sections 170 within the same media package 106. In a peer-to-peer environment (i.e. where user of e-PVR 110 in one digital system 250 is downloading from e-PVRs 110b or PCs 350 from a second digital system 250a and optionally simultaneously from e-PVR 110c in a third digital system 250b), this can result in significant savings in download time for the user with plenty of bandwidth who may be downloading from several peers each of whom have very little bandwidth. Unlike other such download systems (e.g. BitTorrent), the portions downloaded are not arbitrary chunks, but sections 170 at recognizable events in the file, and they also have section information 174 associated with them. Again, unlike these other file protocols, these are permanent sections 170 that do not vary on each download (but may vary in different media packages 106 and 106a).

Another feature enabled by this format is the ability of the original content owner 132 to replace a specific part of the content (even after the file has been transmitted to thousands of users) simply by identifying and replacing that section 170 of the file on each users disk. By inserting blank video segments of a fractional length, for example a single frame, content owners 132 can also insert new video segments into existing programs. In reverse, news stories or sections of news stories can be "pulled" (i.e. removed from broadcast) by replacing some sections 170, 170a with blank sections 170b and 170c. For example, newscasts, which repeat many items of news, sometimes with additional information, and at other times information or segments are removed, can benefit from this feature. Additionally newscasts and similar programs can allow download of the media package 106 containing the program earlier than the actual scheduled time of the program but only containing news items that are already prepared and with "placeholders" for some news items that are yet to be created. This way, those portions that are completed later can be obtained by application software 180 at the last minute or even live as the program is being presented and the appropriate sections 170 can be replaced in media package 306, thus saving download time for these types of programs.

To facilitate this, each replaceable section 170 can contain a flag within corresponding section information 174, so that application software 180 can read this at any time and check for an updated version of the slice. Additionally media information 104 can contain a general flag or code that alerts application software of the presence of the flags in the section information portions (so application software does not have to search all of the information each time).

Recording Media Content from Video Input

In addition to receiving content as media package 306 by any form of file transfer, e-PVR 110 can also record and store media content 102 received by traditional sources such as television broadcast 400 or cable 396 or satellite wireless transmission 404. Additionally, e-PVR 110 can digitize a video recorded with a camcorder, receive content from film transferred through a translation device, receive a file transfer from a digital video camera, or receive or create an animated sequence using media editing, creation or enhancement software 272. In this case media content 102 can be stored as media content 302. It can be stored un-encrypted as it has been paid for by the user 112 or by sponsors 230. However, to limit copying of media content 302, e-PVR 110 can create stored media package 306 and encrypt media content 302 using program key 200 (a code, algorithm, or process or combination of these identified by security module 270 or obtained from encryption/decryption server 370 or local security database 345), and then create LEPK 220 and local decryption information 222 as previously described. In this case e-PVR 110 can present media content 302 as often as desired.

In some situations media content 102 is received from sources not providing media information 104. When it is desired that media content 302 be stored as media package 306, media information 104 can be created by other means. In many cases, there will be "participating owners" who not only want their media content 102 secured, but additionally want it to be distributed through this invention. To distribute their specific media content 102, media information 104 must contain at least enough information so that media content 102 can be distinguished from any other media content 102n and also, if desired, owner 132 can be paid (by including cost 134).

Participating owners are those owners 132 who have made the necessary modifications to their video or to their broadcasting process in order to embed flags into programming allowing e-PVR 110 to create media information 104. Non-Participating owners 132a may choose not to insert flags into their broadcasts or files, may be unwilling or unable to comply with the requirements of broadcasting in this manner, or may simply be unaware of this technology. However, content from non-participating owners will be able to transmitted to an e-PVR, but it will not be able to be used by others because it will be encrypted using local information only and will not be able to be presented on other e-PVRs outside of the first digital system 250 that it was received on.

One method is to use external information such as a database or broadcast schedule (such as a cable TV program listing), which includes among other information, the name and description of the content and the broadcast time and channel. Application software 180 on e-PVR 110 sends information request message 460 containing the above information as recording information 462 to distribution service 120. In addition e-PVR information 160 is sent so that based on location and subscription information the program recorded can be identified. At distribution service 120, media information 104 may be created automatically by software or manually by personnel using the information transmitted, or a combination of these two may be used. Distribution service 120 then returns information message 470 containing updated media information 104 to the e-PVR and this is then incorporated into media information 304.

Presumably, owner 132 of media content 102 has given permission for it's distribution and so has provided detailed media information 104 to distribution service 120. If permission has not been granted or information does not exist, distribution service will not allow distribution of media content 102 and therefore it will not provide an SEPK 210 for this media content 302. In fact media content 302 will be encrypted only with locally available information and will only be able to be decrypted and presented locally on the same digital system 250 where the broadcast was received and the content was recorded. Two scenarios are described below.

In the first case media content 102 can be distributed; encryption message 450 that is returned to e-PVR 110 contains encryption description 454, and content encryption description 452. Content encryption description 452 is used to encrypt the media content 102 (now media content 302 as it stored by e-PVR 110). Media content 302 is then encrypted and stored in media package 306 and program key 200 is generated. In addition program key 200 is further encrypted according to encryption description 454 and as SEPK 210 and service decryption information 212 is created and these are both stored in media package 306.

In the second case, content cannot be distributed and encryption message 450 is returned to e-PVR 110 containing content encryption description 452, but not encryption description 454. In addition encryption flag 472 specifies how content encryption information 452 is to be used to encrypt the media content 102 (now media content 302 as it stored by e-PVR 110). Media content 302 is then encrypted and stored in media package 306 and program key 200 is generated. In addition program key 200 is further encrypted and stored as LEPK 220 and local decryption information 222 is created with this information and again this is stored in media package 306.

An alternative method for recording and recognizing content is as follows. Participating owners 132 as described above may embed certain information such as Unique Media Content identifier 130 (as described under media information 104) into the broadcast signal. In addition, these participating broadcasters may independently transmit complete media information 104 to distribution service 120. Thus, with at least this minimum of information such as Unique Media Content identifier 130, media information 104 can be obtained by application software 180 from distribution service 120 and made a part of media information 304 in media package 306. Of course, broadcasters can transmit more information, for example they can transmit the entirety of media information 104 and application software 180 then incorporates into media information 304. However, that is time and resource intensive and therefore impractical. Alternately they can transmit a URL where media information 104 can be obtained by application software 180 and then incorporated into media information 304.

To minimize the information needed to be embedded in the video stream, a first part of the URL can be the location of the distribution server 374 or general purpose server 378 where the information is stored, and the remainder of the URL can be obtained by application software 180 from subsequent portions of the same video program transmission. The first part of the URL can be placed at the start of the program transmission, and may contain a flag or code identifying it as a first part of the URL. The first part of the URL is appended to the beginning of the additional URL address information.

Participating owners 132 have several options by which they can embed information in broadcast signals. It is common practice, for example, to include such information in the Vertical Blanking Interval of the signal. However, this invention allows for an additional method of embedding information into the signal. In this invention, broadcasters can transmit one or more frames consisting of a pattern of black and white squares in a pre-determined format that can be interpreted by Application Software 180 as a specific binary number. This binary number can be translated into any information such as the Unique Content identifier 130 of the media content 102. Thus, because only a few frames are transmitted, the user will not see the pattern, but Application Software 180 will be able to interpret it. Note that in addition to the frame containing the information, there may be an additional frame or frames at the beginning or end of the sequence (called "Marker Frames") that alert the software that the informational frames are bracketed within those Marker Frames. The advantage of this method is that such information is not lost or corrupted when translating the media from one media to another (say film to Video) or one format to another (say PAL to NTSC). Also, these frames, if limited to a few frames at each place they are inserted are invisible to viewer. Another advantage is that these informational frames can be scattered over the entire media transmission.

If owner is transmitting content using streaming video, codes can be embedded in a streaming video stream in several ways and two are described herein. When a content owner 132 creates an audio or a video stream, that content owner can add script commands (such as URL script commands and custom script commands) that are embedded in the stream. When the stream is played back, the script commands can trigger events in an embedded player program, or they can start a Web browser and then connect to a particular Web page. This is commonly done in most streaming software today, Application software 180 can monitor the incoming stream for these URLs and the URLs can contain or link to detailed information that describe sections flags 136, section data 172 and so on. The other method is the same as traditional video—embedding frames with information in the form of patterns as described above. Other ways of embedding URL's or scripts in the video transmission are also anticipated.

Thus media content 302 that can be distributed is contained within media package 306 that has an SEPK 210 and service decryption information 212. Hence when it is transferred form the original e-PVR 110 where it was recorded to another e-PVR 110b in a different digital system 250 where it is desired to be presented, e-PVR 110b can request decryption of SEPK 210 and then decryption of program key 200 using the usual methods which include a "payment step". In this manner media content 102 that is broadcast and has been recorded by one e-PVR 110 and shared with a second e-PVR 110b can be presented, but only when the financial interests or distribution controls of owner 132 of stored media content 302 have been met.

An optional step that can be performed once content has been recorded is to substitute the recording with another version that may be of higher quality. In this method, user 112 of e-PVR 110, selects content to be recorded using any of the input sources described earlier including live broadcasts on TV or streaming video. This media content 102 is then saved as media content 302 in media package 306. As described above, application software obtains and incorporates media information 304 into media package 306 and encrypts media content 302 using the methods specified above. At any time in this process or even after it is completed, application software 180 can contact content owner 132 for a higher quality or alternate version of media content 302 either directly or through distribution service 120. This can be accomplished either through a known URL or email or other address supplied by the content owner 132. Owner 132 may then manually or automatically respond by specifying a location for another version of the media content 102, which is referred to as media content 102a. This version may then be downloaded or otherwise obtained by application software 180 and substituted for media content 302 resulting in media content 302a being present in media package 306 instead of the original media content 302. This may presumably be used for example to allow users to record content from a low quality source (say broadcast television or Internet streaming) and allow substitution by a high quality version of the same content.

Creating Media Content e-PVR 110 can also be used to create media content 302. For example, to create media content e-PVR 110 can digitize a video recorded with a camcorder, receive a file transfer from a digital video camera, or receive or create an animated sequence using media editing, creation or enhancement software 272 and optionally other third party software. Also, the above sources can be combined with each other and other recorded content. Once the media content 302 is received or created by e-PVR it is stored on storage device 254 as media package 306, in accordance with and using the identical steps of the above section describing the recording of media content, with some important differences described below.

When user of e-PVR 110 is ready to distribute the above video, and before the steps of requesting media information, he or she may use media editing and enhancement software 272 to enter their identification such as a user account as content owner 132 along with other media information 304 that they choose to enter. Also, user 112 must register their media content 302 prior to distribution. As part of registration process, distribution service 120 provides a unique media content identifier 130, which can be used to obtain a code, algorithm, or process to encrypt their media content 102. Decryption information 138 can be provided by distribution service 120 or distribution service 120 can provide SEPK 210 and service decryption information 212 as part of encryption request message 480. When application software 180 sends encryption request message 480 to distribution service 120, it contains media content identifier 130 and hence distribution service 120 will provide both program key 200 and SEPK 210 using either method described above.

In some cases, distribution service may request a copy of the media package 306 so that it can be manually examined to eliminate the possibility that some users 112 may attempt to distribute content belonging to others as their own. Also, since user 112 account number and/or ID is contained in the media package, the user can be tracked in case of piracy.

Enhancing Media Package

It is anticipated that user 112 of e-PVR 110 can download a media package 106 containing selected media content 102 with a goal of enhancing the selected media package 106. As previously described, e-PVR 110 can decrypt locally stored media package 306 so media content 302 can be presented. However, in this instance user 112 wants to add or enhance media content 302 or media information 304, for example using media editing, creation or enhancement software 272. Such a user is henceforth referred to as Media Enhancer. These enhancements can include ratings, subtitles, commentary and so on, and can also include information needed to display it, such as a location on the screen for showing subtitles, or time codes at which the information is presented.

For example, Media Enhancer can provide an alternate audio language track or subtitles for media content 102. In the case of an audio track it can be recorded in synchronization with the presentation of media content 302. In the case of subtitles they can be scheduled to be presented at specific times during the presentation of media content 302, for example corresponding to section data 172. It is anticipated that the owner 132 of media content 102 may provide appropriate information to facilitate media enhancements for example time codes for the placement of subtitles in section information 174.

Another example is for Media Enhancer to provide rating levels for sections 170 of media content 302 to be used as described under "Section Ratings and Skipping Content". These can be incorporated as section information 174 and correlated to section data 172. In this case section data 172 and section information 174 etc. can be stored with media information 304 and can be used by another e-PVR 110b to limit what segments of media content 302 are shown. In some cases additional section information 174 can be provided, much like an annotated book.

While the above described enhancements may be stored as part of media information 304a, enhancements can also take the form of new media content 302a, for example new and expanded program material, interviews, accompanying commentary, or alternate viewpoints or opinions. These can be displayed as overlays over existing media content 302 or inserted as new sections 170aa . . . 170na interspersed between sections 170a . . . 170n (or even at the beginning and/or end) of existing media content 302.

It is anticipated that each Media Enhancer can add cost 134a to original cost 134 to create new total cost 134b in media information 104. Cost 134a is associated with Media Enhancer's account number and/or unique identifier so that additional cost 134a when paid, for example as part of user payment 434 for total cost 134b is credited to Media Enhancer. Additional cost 134a follows the same rules as cost 134 including being embodied by a set of rules, links to additional information 140 or any combination thereof. Additional cost 134a can also be zero or negative. Also, it is assumed that all the payment steps and payment scenarios described under "Paying for Media Content" apply to this additional cost 134a.

Adding enhancements in the form of additional media information 304a to media information 304 creates new media information 304b and similarly, if additional media content 302a is added to media content 302, new media content 302b is created. In any case, a new media package 306b is created and this can contain both the original and the enhancements. Conceivably enhancements could be in a media package 306a, which can be merged with original media package 306 to create media package 306b. Media Enhancer can make additions affecting either media information 304 only, media content 302 only or both. In some cases, although only media content 302 is enhanced, some necessary identification and payment information may need to be added to media information 304. These three scenarios are described in more detail below.

In the first scenario, only enhanced media information 304a is added to existing media information 304. User 112 acting as Media Enhancer obtains media package 106 and copies it to storage device 254 on local e-PVR 110 or personal computer 350, and stores it locally as media package 306. Media Enhancer then opens media package 306 using media editing, creation, or enhancement software 272. The software can use SEPK 210 or LEPK 220 or other appropriate algorithm, process or key to decrypt media information 304. In this case, if SEPK 210 needs to be decrypted, decryption flag 432 in decryption request message 430 indicates that such an operation is to be completed and the decryption is completed as described in the various embodiments, but the payment step can be skipped because the Media Enhancer is not being presented the content. Even when media information 304 is decrypted, at least a portion of it is not shown to Media Enhancer—as an example owner 132 information or associated account numbers and cost 134 (a specific number or the rules to generate the number) are not shown. Similarly privileged information from other Media Enhancers may not be shown to current Media Enhancer.

Media content 302 can also be decrypted if appropriate (for example as a background to allow Media Enhancer to better add subtitles), but decryption flag 432 in decryption request message 430 specifies that this decryption is originating from media editing, creation, or enhancement software 272 for a media enhancement activity. When media package 306 is decrypted in this manner and payment step has been skipped, some provision can be made (such as lowering the quality of the video, or presenting it with a logo or pattern overlaid on it) so that user 112 does not use this process to circumvent payment for presentation of media content 302.

Media Enhancer then enters or merges new media information 304a including any account number or Unique identifier 176, description of Media Enhancer (such as a name that can be displayed in a menu), additional cost 134a, and a category or service (for example subtitles) identifying the contribution of Media Enhancer, into original media package 306. Additionally, at least an identifier 176 for Media Enhancer is entered and identifier 176 is associated with each additional media information 304a added to existing media information 304 to create new media information 304b. For example, identifier 176 can be associated with additional cost 134a and with section information 174aa . . . 174na (described next). Thus identifier 176 identifies for example, section information 174aa associated with Media Enhancer as well as cost 134a, descriptions, menu selections and other more general information associated with Media Enhancer. New media information 304a can be added to existing media information 304 as section information 174aa, 174ba . . . 174na, and this is associated with section data 172a, 172b . . . 172n respectively, each of which may already have other section information 174a, 174b . . . 174n associated with it. Each new section 174aa can also have section cost 178a associated with it, and in fact it can have all the properties afforded to original section information generally.

When done, Media Enhancer saves new media package 306b and security module 270 then re-encrypts any portions of the package that were decrypted and/or changed. Since, in this scenario media content 302 is not changed, it can be saved without re-encryption, although in some cases, it may still be re-encrypted before saving. As described in the various embodiments, particularly in the third embodiment, media content 302b (or media content 302 if it is not changed) and optionally media information 304b and program key 200 are re-encrypted. Following that step LEPK and SEPK are recreated also as described in the embodiments, particularly the third embodiment. In some cases LEPK may not exist or cannot be decrypted and it is replaced with a new LEPK or a new LEPK can be created as described previously. Thus additional media information 304a and original media information 304 are encrypted, preferably using the same process, code or algorithm (or combination thereof) and these are saved in new media package 306b.

Media Enhancer then uploads or otherwise makes available new Media package 306b as new Media Package 106b and this can be obtained by another user 112a. For the sake of clarity, this package when obtained by a different user 112a, can be designated with the same notations as when it was being enhanced by Media Enhancer that is, as media package 306b containing media content 302b and media information 304b. However, media information 304b contains original media information 304 as well as additional media information 304a added by Media Enhancer as described above.

When user 112a selects media content 302b for presentation, a menu can show an option to choose the enhancements created by Media Enhancer and embodied in additional media information 304a. If user 112a selects this option, media information 304a (including additional section information 174aa . . . 174na associated with the identifier 176 of Media Enhancer) are used by e-PVR 110, for example when presenting the media content 302b or when calculating cost 134 to present it. In other words, section information 174aa is presented or used (depending on what kind of information it is) when section 170a of media content is presented (and in some cases before or after it is presented), and this may be in addition to or in conjunction with section information 174a if appropriate, and cost 134a added by and associated with Media Enhancer is added to cost 134.

In the second scenario, Media Enhancer adds only additional media content 102a to original media content 102 to create new media content 102b. Again, user 112 acting as Media Enhancer obtains media package 106 and copies it to storage device 254 on local e-PVR 110 or personal computer 350, and stores it locally as media package 306. Media Enhancer then opens media package 306 using media editing, creation, or enhancement software 272. The software can use SEPK 210 or LEPK 220 or other appropriate algorithm, process or key to decrypt media information 304. In this case, if SEPK 210 needs to be decrypted to decrypt media information, decryption flag 432 in decryption request message 430 indicates that such an operation is to be completed and the decryption is completed as described in the various embodiments. However, decryption flag 432 in decryption request message 430 specifies that this decryption is originating from media editing, creation, or enhancement software 272 for a media enhancement activity and payment step can conceivably be skipped Media content 302 can also be decrypted if appropriate (for example as a background to allow Media Enhancer to better add subtitles). When media package 306 is decrypted in this manner and payment step has been skipped, some provision can be made (such as lowering the quality of the video, or presenting it with a logo or pattern overlaid on it) so that user 112 does not use this process to circumvent payment for presentation of media content 302.

Figure 5A:
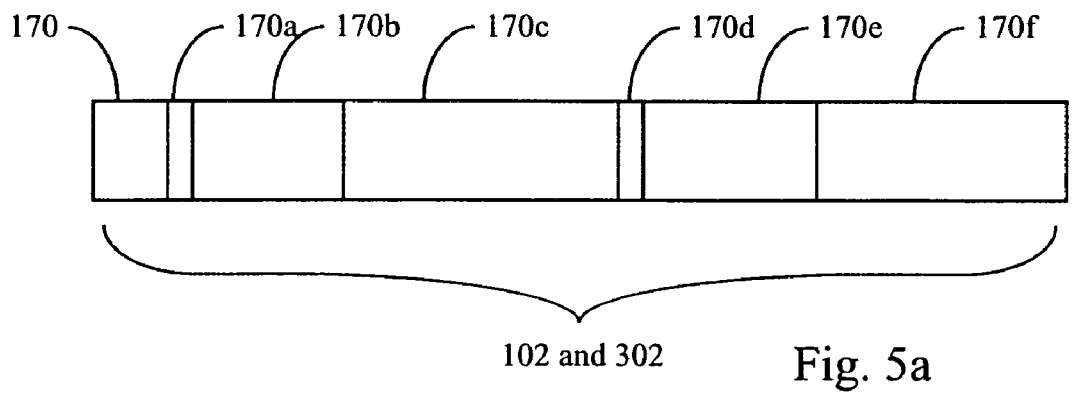
FIG. 5 shows media content divided into sections, before (a) and after (b & c) media enhancements.
Figure 5B:
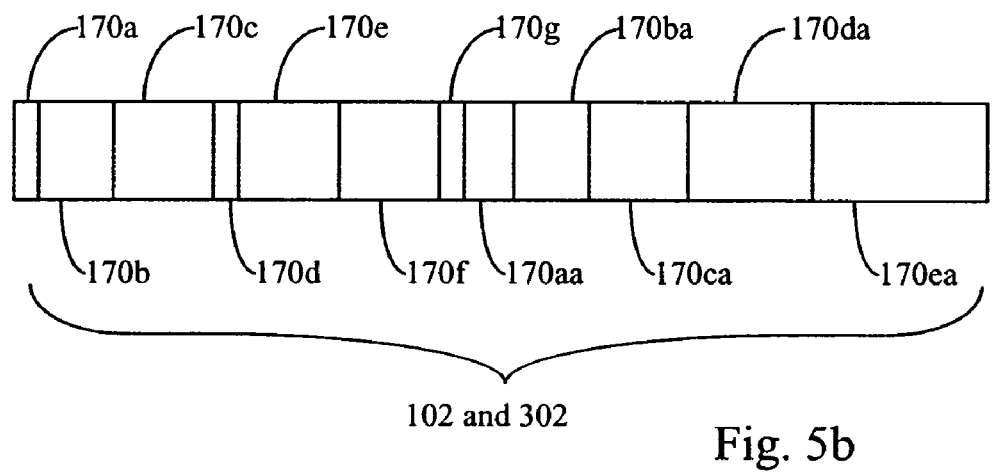
Figure 5C:
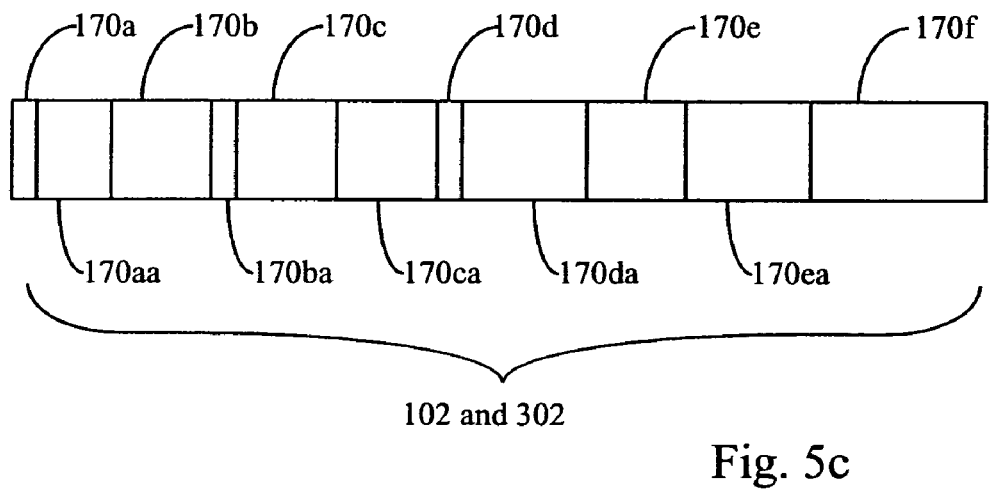

Media Enhancer then inserts or merges new media content 302b into media package 306 using one of two methods (See FIGS. 5A, 5B & 5C). In the first method, new media content 302a can be appended to media content 302 (although they need not be physically contiguous and can reside in different parts of the file representing media package 306), or in a second method it can be inserted so that sections of new media content 302a are interspersed with original media content 302. The latter may be possible only when both media content 302 and 302a are divided into physical sections and not just logical sections. Alternately when only logical sections are present, the sections can be re-numbered so that they are presented in the correct order. In either case, each new section 170*aa*, 170*ba* . . . 170*na* can be associated with original sections 170*a*, 170*b* . . . 170*n* by entering appropriate information (such as time codes) as new section flags 136*a* or by associating them with the appropriate existing section data 172 (for example by associating section data 172*a* for section 170*a* with section 170*aa*). In some cases an original section 170*i* may not have a corresponding section 170*1a* and in other cases multiple additional sections 170*1a*, 170*1b* etc may be added. It should be noted that although Media Enhancer may only be adding new media content 302*a*, new media information 304*a* may be created by media editing, creation, or enhancement software 272 to properly synchronize and place new media content 302*a*.

Each new section 170*aa* that is associated with original section 170*a* can be presented at the appropriate time in one of three modes. First, each new section 170*aa* can be presented following corresponding section 170*a*. Thus section 170*a* of media content 302 is presented, and then section 170*aa* of media content 302*a* is presented. In the second mode the process is the same, but the order is reversed. In other words, section 170*aa* of media content 302*a* is presented, and then section 170*a* of media content 302 is presented. The third mode is where each original section 170*a* of media content 302 and each new section 170*aa* of media content 302*a* are presented simultaneously. In this mode, at least one of the media content 302 or 302*a* must have an "alpha channel" or equivalent, so that one can overlay the other as is commonly done when compositing video. Media Enhancer can specify which mode is to be used and this is saved as a flag in section data 172. This flag can be different for each section 170*aa*, so that a different mode can be used for each section in a single media package 306*b* created in this manner. Additionally, each new section 170*aa* of new media content 302*a* is associated with identifier 176 uniquely identifying Media Enhancer.

In addition, Media Enhancer then enters or merges new media information 304*b* including any account number or Unique ID, description of Media Enhancer (such as a name that can be displayed in a menu), additional cost 134*a*, and a category or service (for example accompanying commentary) identifying the contribution of Media Enhancer, into original media package 306. Additionally, at least an identifier 176 for Media Enhancer is entered into media information 304 and this identifier 176 is associated with each additional media information 304*a* added to existing media information 304 to create new media information 304*b*. This process is similar to the process of adding additional media information as described in the first scenario above. Although in this scenario, Media Enhancer is not enhancing original media information 104 (now described as media information 304), some minimum amount of additional media information 304*a* may be required for identification and payment purposes.

When done, Media Enhancer saves new media package 306*b* and media editing, creation, or enhancement software 272 then re-encrypts any portions of the package that were decrypted and/or changed. As described in the various embodiments, particularly in the third embodiment, media content 302*b* and optionally media information 304*b* and program key 200 are re-encrypted. Following that LEPK and SEPK are recreated also as described in the embodiments, particularly the third embodiments. In some cases LEPK may not exist or cannot be decrypted and it is simply replaced with a new LEPK or a new LEPK can be created as described previously. Thus additional media information 304*a* and original media information 304 are encrypted, preferably using the same process, code or algorithm (or combination thereof) and these are saved in new media package 306*b*. Similarly, additional media content 302*a* and original media content 302 are encrypted preferably using the same process, code or algorithm (or combination thereof) and these are also saved in new media package 306*b*.

Media Enhancer then uploads or otherwise makes available new media package 306*b* as new media Package 106*b* and this can be obtained by another user 112*a*. For the sake of clarity, this package when obtained by a different user 112*a*, can be designated with the same notations as when it was being enhanced by Media Enhancer that is, as media package 306*b*, containing media content 302*b* and media information 304*b*. However, media content 302*b* contains original media content 302 as well as media content 302*a* added by Media Enhancer as described above and additionally contains original media information 304, plus new media information 304*a* that has been created by media editing, creation, or enhancement software 272 as described above. When user selects media content 302 for presentation, a menu can show an option to choose the enhancements embodied in additional media content 302*a*. If user selects this option, all media information 304*a* and media content 302*a* associated with the identifier 176 of Media Enhancer is used by e-PVR 110. For example when section 170*aa* is to be presented cost 134*a* added by and associated with Media Enhancer is added to cost 134 and when section 170*a* is to be presented, section 170*aa* is also presented in one of the three modes described earlier.

In the third and final scenario, Media Enhancer adds both additional media content 302*a* and additional media information 304*a* to create new media package 306*b*. Each of these can be construed to be a separate process and each process is performed as described in the two scenarios described above. Thus in this third scenario additional media information 304*a* is added as described in the first scenario and additional media content 302*a* is added as described in the second scenario, although Media Enhancer operating media editing, creation, or enhancement software 272 may perceive it as a single process.

Conceivably, some Media Enhancers may act purely as distributor and not enhance media content 302 or media information 304 but perhaps provide a different extrinsic value-added service such as delivery of media package 306 for example. They may choose to add cost 134*a* without any enhancements added to media information 304, for example no subtitles or ratings or any enhancements are added to section information 174. In this case, Media Enhancer may add a minimum of media information 304*a*, for example, only account number, identifier 176 and additional cost 134*a* may be added to create new media information 304*b* and by extension media package 306*b*. Thus, Media Enhancer enhances media package 306 by adding her name and/or marketing efforts to media package 306*b*. As before, media package 306*b* is uploaded to distribution service 120 or to another server (for example content server 376 or general purpose server 378) now as media package 106*b* for others to download, but now with cost 134 and 134*a* associated with it, ensuring payment to owner 132 as well as to Media Enhancer for her value added service such as delivery or distribution of media package 106*b*.

More than one Media Enhancer can add enhancements, and these can be stored cooperatively with the previous enhancements. For example, another Media Enhancer can add media content 102*c* or media information 104*c* or both to the above described media package 106*b* thus creating a new media package 106c. These two Media Enhancers may add their enhancements in the same category or in two different categories. When added to the same category these can conceivably be competing against each other. Any Media Enhancer can also add multiple enhancements in multiple categories for example adding both ratings and subtitles.

It is anticipated that when user 112 uses e-PVR 110 they will select media content 302 to present by using a menu shown on presentation device 274. When a specific item is selected to be viewed an additional menu can show a variety of information in media information 304 for example a title, but it can also include a descriptive name of one or more Media Enhancements (as entered in media information 304 by Media Enhancers) perhaps arranged in one or more specific categories (e.g. subtitles or ratings). User 112 operates remote control 280 or other selection means to not only choose media content 302 to present but can also choose one or more of the Media Enhancements thus displayed that they wish to have associated with that presentation of media content 302. When this is done additional media content 302a or additional media information 304a associated with the identifier 176 of Media Enhancer is used as part of the selection as described above. Presumably, user 112 will not be allowed to (or they may be advised not to) choose more than one set of section information in any one category. However, a situation can be conceived where more than one Media Enhancer's section information may be used simultaneously (for example, subtitles in two languages can be viewed simultaneously on different parts of the screen).

As described above, each Media Enhancer may also add an additional cost 134a to content owners original cost 134 and this cost 134a when received as part of user payment 434 or paid by sponsor 230 is credited to Media Enhancers financial account with distribution service 120 or other payment service. This amount is only credited to Media Enhancer if user 112 chooses their identifier 176 and/or descriptive name representing that identifier 176 in a menu in order to avail themselves of the enhancements added by Media Enhancer as described above. When user 112 selects multiple items in the menu, thereby selecting multiple media enhancements, user 112 will be required to pay (again as part of user payment 434 or paid by sponsor 230) the sum of the costs 134a . . . 134n associated with the media enhancements of each Media Enhancer chosen as well as the original cost 134.

In yet another presentation selection process, the descriptive name for a Media Enhancer or a title corresponding to media content 102a or 302a may be shown in the menu, but no selection is associated with this menu item, and user 112 must pay additional cost 134a associated with Media Enhancers identifier 176 as described above. In one scenario, a Media Enhancer may add enhancements and additional cost 134a to media information 104, and may add a flag that forces the user to always pay this additional cost 134a in addition to cost 134 whether or not they choose the enhancements created by this Media Enhancer. Media Enhancer may additionally add a flag that forces the selection of their enhancements so that user 112 must watch media content 102 with their enhancements no matter what other enhancements may be chosen when viewing.

Media Enhancer, by not adding a descriptive name and only adding an identifier 176 and a cost 134a, can get paid without user 112 choosing the work of the Media Enhancer. In this scenario, when user 112 desires to play the media content 302, they will not be given a choice in a menu as described above and must pay both costs 134 and 134a. Alternately, the same result can be achieved by setting a flag that instructs application software 180 to not show Media Enhancers descriptive name on the menu and to simply add the additional cost 134a to original cost 134.

All or part of this new media information 304 can also be a link to additional information 140 on a server such as general purpose server 378, and can be a script or set of rules either locally in media information 304 or interpreted on general purpose server 378. Thus, in some cases, enhancements may be stored separately, for example on general purpose server 378 and these enhancements can be linked to using links to additional information 140. Preferably enhanced media content 102a and media information 104a are encrypted using the same keys, processes and algorithms as media content 102 or media information 104 respectively, whether or not the enhancements are stored in their entirety in media package 106b or if these enhancements actually reside on a server as described above.

It should be understood that while Media Enhancer adds media information 304a (for example cost 134a) and possibly media content 302a to existing media package 306, that cost 134 is not removed. Therefore it is anticipated that user 112a downloads/obtains an enhanced media package 106b (stored on e-PVR 110 as media package 306b) and in order to have it presented, with or without enhancements, that cost 134 be paid to owner 132. When media information 304a or media content 302a are also used or presented Media Enhancer is paid cost 134a. In the above description it is anticipated that distribution service 120 may be paid a fee or commission as part of the payment or cost 134 or 134a or distribution service 120 may correspond to owner 132 and be paid all of cost 134 or even cost 134a when service buys the enhanced media information 104a/304a and/or media content 102a/302a. It is conceivable that in some cases, cost 134a added by Media Enhancer may be zero or negative, so that total cost 134b and by extension user payment 434 needed to present this content may be the same as or less than original cost 134.

Enhanced Actions Based on Media Content

Media package 306 can contain a practically unlimited number of instructions, which link actions by user of e-PVR 110 through a remote control 280 or other input devices 286 to actions or events related to e-PVR 110 and by extension distribution service 120 or other parts of distribution system 100. For example, users of e-PVR 110 can use the remote control 280 to order a specific item from a merchant at a specific time in the program by pressing one or more buttons 282 on the remote control 280, presumably when that item is displayed on the presentation device 274 as part of informative message 312 or media content 302. Section information 174, or media information 104 if it applies to all sections, can contain the information that allows user of e-PVR 110 to execute interactive instructions via remote control 280 or other input devices 286.

e-PVR 110 can have a list of buttons 282 on remote control 280 or other input devices 286 that are mapped to numbers or other identifiers. Each model of remote control 280 or other input device 286 can have a separate button list 490, 490a etc. During setup or configuration of system, or simply by user 112 using it, application software 180 can determine which device is being used (by recognizing the port or operating frequency for example). The list of buttons can have an alphanumeric code associated with it. When user presses a button the corresponding alphanumeric code is passed to application software 180 by the hardware and/or operating system 262. This alphanumeric code is standard and known to all those who may benefit from this feature such as content owners 132, sponsors 230 or Media Enhancers.

For the sake of illustration, suppose the alphanumeric code is simply a series of numbers from 1 to 999. FIG. 18 then shows part of a possible list. Meanwhile, section information 174 contains actions such as showing a menu or placing an order. Multiple actions can be accommodated in each section information 174 and these can be grouped together. Each action can be associated with a button or combination of buttons or a sequence of buttons. To do this, the creator (for example sponsor 230) of the instructions 492 simply uses the buttons alphanumeric code as shown in FIG. 19. The alphanumeric codes can be used both for display purposes and to execute an action. As shown in FIG. 19, multiple buttons in combination (here for illustration only shown as two alphanumeric codes with a "+" in between) and in sequence (again for illustration only shown as two alphanumeric codes separated by a "/") can be associated with an action. Of course, as shown, a single button press can also be associated with an action.

Figure 20:
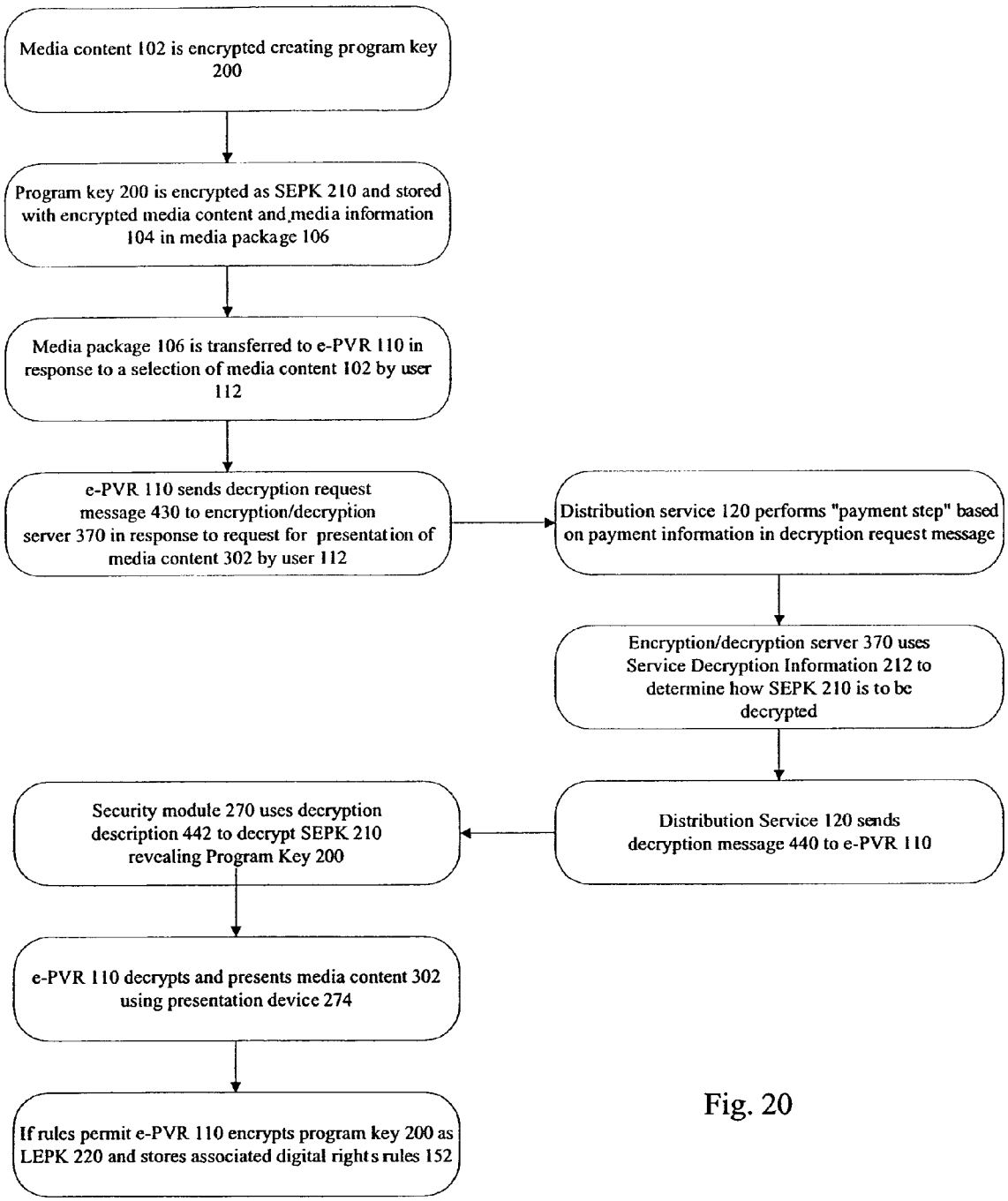
FIG. 20 is a flowchart showing the typical steps used to obtain, decrypt, and present media content in the second embodiment.

This entire set of actions as shown for illustrative purposes in FIG. 20 can be placed in section information 174 and will be available for use to the user of e-PVR 110 when the section 170 associated with section information 174 is presented. Note that each section 170 can be part of media content 302 or informative message 312. Presumably some text or graphics may also be associated with each set of instructions 492, so that user of e-PVR 110 can be instructed which button to press for a specific action or outcome. In some cases, time codes, for example section information 174, can be associated with the actions so that an action is valid at a certain time, but a different action may be valid at a different point in the presentation. For example, in the first few seconds, a message may appear asking the user to press a button to buy a certain item. If the user presses the appropriate button, he/she can buy it. However, after a few seconds, the message may be replaced with another one that asks the user to press a different button if they want an email with more information to be sent to them. If user presses the assigned button, sponsor 230 can send an email message with information about the product.

This system can be used to order products, enter survey information and has potentially a myriad of uses. One of the many uses possible can include automatically obtaining (for example by automatically downloading or scheduling a recording) media content 102*a*, by user simply pressing the appropriate button while watching a commercial or trailer of that media content 102*a*.

Instructions 492 can also be entered into section information 174 that do not require user of e-PVR 110 to interact or provide input. Thus, instruction 492 can simply execute whenever section 170 associated with it is presented. This can be used for example to activate a button 282 that in turn activates the menus etc. described earlier and may even display a message or icon on presentation device 274 that informs a user that a menu or enhanced action is available. This feature can also be used to collect data for example when a certain media content 302 is presented or if a specific informative message 312 is presented the time it was presented can be recorded. In the case of informative messages 312, the sponsor 230 can also correlate the time and location (provided in e-PVR information 160) with external data such as user purchase actions immediately following presentation of their informative message 312.

Actions can be in the form of programs or scripts that are executed locally on the e-PVR 110 or on remote servers such as a general purpose server 378 operated by content owner or a informative message server 380 operated by sponsors 230 of informative messages 232. Thus the actions and even the entire instruction 492 (that is, including the alphanumeric codes and actions) can be composed in whole or part of links to additional information 140.

In some cases instructions can have a persistence flag 494. The persistence flag 494 can describe if the instructions 492 will continue to be valid beyond the current section 170 and can also specify either in number (how many more sections) or by time (how much more time) that the instruction 492 may remain active. Thus, an instruction placed in the first section information 174 may be active for the entire length of the program represented in media content 302. In the absence of this parameter, the instruction will end with the section 170 it is associated with. Also another instruction 492*a* in later section information 174*a* may override any settings created by instruction 492. Instructions can also be placed in a general area of media information 304 and in this case can apply to the entire media content 302 (i.e. all sections 170 . . . 170*n*).

Encryption Information Cloaking

Security module 270 is primarily responsible for the encryption and decryption of various parts of media package 106 especially media content 102 and the various keys. Security module 270 contacts the encryption/decryption server 370 to obtain the encryption or decryption information it needs. However, in order to return a message containing the needed information, encryption/decryption server 370 can first use the first identifier of the process, algorithm or key as received by it and specified in media package 106 for example in service decryption information 212, and lookup the corresponding second, or actual identifier in a database. When found, it returns the process, key or algorithm identified by this second identifier to security module 270 on e-PVR 110 for example as decryption description 442. This way a malicious user may discover say, the first identifier of the algorithm needed to decrypt media content 302 for example by decrypting and reading service decryption information 212, but cannot identify the actual algorithm used because they do not have access to the database on the encryption/decryption server 370 to identify the actual (i.e. second) identifier and therefore cannot learn the actual process, key or algorithm. Also, the second identifier can be changed when a threshold is reached (for example an elapsed time, number of times the database was queried and so on). Thus, even if a malicious user were to steal or guess the second identifier, it might have changed by the time they use it or at least by the time they disseminate it to multiple other users.

Note that the identifier of an algorithm, process or key may be different depending on the e-PVR information 160, so that again, if the first identifier of an algorithm is discovered by one malicious user on one e-PVR 110, it cannot be used on another e-PVR 110*b* for another user, because server will either not have the information or will return a different algorithm or which will not be usable on e-PVR 110*b* in a different digital system 250. Similarly, identifiers may be matched to media package 106, for example by linking it to media package identifier 131 so that if the identifier for one media package 306 is discovered, it cannot be used on another media package 306*a* even if it contains the identical media content 302.

The information that is normally obtained from an encryption/decryption server may also be obtained from the local security database 350, which duplicates information on the encryption/decryption server in part to minimize the communication required between an e-PVR 110 and an encryption/decryption server 370. The local security database 350 is also encrypted and re-encrypted in order to maintain the security of the encryption/decryption process. The e-PVR 110, through security module 270 manages the duplication and synchronization of information between the local security database 350 and the encryption/decryption server 370.

Searchable Information

Plain text information residing in media package 306 may be searchable by the application software 180 or even external services and software that provide searching capabilities. Thus a service can be envisioned that searches for and catalogs keywords that are part of a description or list of actors for example in media packages 306 in the known universe of e-PVRs 110 using a form of "Spider" technology. A remote computer (for example a general purpose server 378) may be set up with software that finds or determines the logical addresses of e-PVRs 110. The server 378 can potentially learn the logical addresses from a distribution service 120 for example one where the e-PVR is registered. Alternately user 112 who wishes to allow their e-PVR 110 may register with such a server 378 or the operator of the service. Server 378 reads the media information 304 of each media package 306 stored on e-PVRs 110. It then stores this information in a database and can further parse it if necessary for example to store specific items of information derived from parsing in more appropriate fields. As an example, it can store cost 134 in a cost field and title in a title field of a database. Additionally it can store the logical location of the e-PVR containing the media package 306. The information is then indexed for faster searching and can even be cataloged either manually by personnel or automatically by algorithms.

When a different user 112a desires a specific piece of media content 102 and either guesses or knows words or phrases that may be in media information 104 of a media package 106 containing desired media content 102, user 112a may connect to a service or a web page where these words or phrases may be entered in a form. When the form is submitted to the application software responsible for maintaining the web page or service, it can search the database on the general purpose server 378 and if the words or phrases are found, it can return the logical location of the media package 106 and the corresponding e-PVR 110 in which the words or phrases were obtained. User 112a can then obtain the desired media package 106 in several ways. For example, if a link or URL is available, user 112a can select it. Alternately, user 110 can make a request using email or any other protocol, even proprietary communication protocols. In any method, the e-PVR 110 can transmit it to e-PVR 110b belonging to user 112a or e-PVR 110b can download it.

In some cases the above described functions can be performed on media information 104 even when it is encrypted. To do this, e-PVR 110 may allow some trusted "spiders" access to portions of media information 104 by performing some decryption steps as described in various embodiments later in this description. "Trusted spiders" can be those that have registered with a distribution service 120, and distribution service 120 may have verified that the decryption will not subvert the copyrights protected by the encryption. The e-PVR 110 may obtain decryption information locally if available or it may send a decryption request message 430 to encryption/decryption server 370 with decryption flag 432 containing an indication that decryption is solely for the purpose of supplying portions of media information to a search service. Thus encryption/decryption server 370 can skip payment step for this event.

User 112 may perform this search function locally on their own e-PVR 110 or another local e-PVR 110a on local digital system 250. In this case a remote computer or service is not needed. e-PVR 110 simply searches media information 304 of each media package 306 on its own storage device 254. It can also read media packages 306 on storage device 254a on e-PVR 110a. This is done through standard file-sharing and network protocols available on most standard operating systems today. In another scenario, application software and forms in general purpose server as described above can be present on e-PVRs 110. Each e-PVR 110 in a digital system 250 can maintain the database or it can be shared between these e-PVRs.

When the plain text is associated with sections 170, users 112 can also, using remote control 280 or other input devices 286, use it to jump to that section 170 or even to a place within section 170. As an alternative to using fast-forward or rewind for example, user 112 can search for a specific item of plain text. To do this, user presses a button 282 to launch the search interface on the presentation device 274. User 112 enters the search text in a form on the e-PVR and application software 180 searches through section information 170, 170a ... 170n. When found, it identifies the section 170i in which it was found and can also if available further specify where it is in that section 170i, for example by specifying the number of seconds or frames from the beginning of that section 170i. Exact location of the information can be the same as that used to show subtitles in the correct location of the section for example. e-PVR 110 can then skip ahead or back to that location (either the section 170i, or the location within that section 170i) and user 112 can then choose to let e-PVR 110 present this content from that point onward.

In order to prevent malicious users from editing the plain text, a checksum can be calculated for all the plain text and then hidden in an encrypted portion of the file. Before presenting the file, application software 180 may test against the checksum to determine the integrity of the file and if the test fails, not show the file and optionally provide the user with a message asking if they want to see it anyway.

Multiple Users

Any e-PVR 110 can have multiple users 112, 112a ... 112n that can be recognized by e-PVR 110 and these users may each be represented by a user identity. For example, if e-PVR 110 is in a typical household, the parents may have a user identity that is different from that of the children, and they may each have their own user identity. There may be additional user identities that represent the family or even a group comprising some members from outside that home (say a movie watching club, or a sports team fan group). Each user identity can be associated with different preferences/profiles 334, 334a etc. and optionally can be protected by passwords. User preference/profile 334 can contain for example, favorite genres, preferred channels, ratings for sex and violence and so on. Different sets of preferences/profiles 334 can be pre-programmed into an e-PVR 110, so that a user 112 can select one closest to her preference and either use it as is, or make minor modifications to tailor it to their needs. Of course user 112 can create new profiles from scratch. It is envisioned that a typical user identity for children in this scenario has preset thresholds for various scales such as sex and violence that are much lower than those for the profiles of the adults' user identities.

Users will be able to switch to different identities by using remote control 280 or any other input devices 286 for example by selecting them on presentation device 274 or by entering the names of the identities. Passwords if set on a specific identity can also be entered using any of the input devices. When a user 112 using preferences/profile 334 interacts with e-PVR 110 and changes to a different user identity, the preferences/profile 334a for that new identity is read and all the variables are changed to match the values associated with that user identity. This can happen while media content 302 is being presented, and the presentation will change to reflect the changes if any.

Real Time Viewing e-PVR 110 allows input by means of file transfers (including downloads, copying and others), streaming video and traditional video protocols. All of these methods can be used for real-time viewing as well as for creating stored media content 302 in the form of stored media packages 306 in e-PVR 110 and viewing them later. Real-time viewing deals primarily with content that is desired to be watched as it is created—often referred to as "live" content such as sporting events or news.

File transfers can use any of traditional FTP, HTTP or similar protocols, but in addition can use progressive downloads, as well as other technologies such as BitTorrent and others. Traditional video protocols include analog and digital video that are delivered using for example broadcast TV or Cable TV. Traditional Video sources may include, as described earlier, a Cable TV service 394, Broadcast TV source 398, Satellite Broadcast 402 or even VCR and DVD players whose output is connected to the video input of e-PVR 110. Streaming video is usually obtained over a network of some kind—typically network 150. During input, the video is captured as media content 302 into media package 306 while it is being presented.

To prepare for real-time viewing by user 112 employing downloading, owner 132 can create a media package 106 with media information 104 already present including section flags 136 and section data 172 etc. In some cases some media information 104 may exist and more may be added later as the program or event progresses and existing information may be modified. However, media package 106 may initially contain only space or logical space allocation reserved for media content 102. Later as the program or event progresses, media content 302 may be added to the media package 306 as a single section 170 or as multiple sections 170, 170a etc. progressively. In one scenario, media content 102 may be divided not only into logical sections 170, but also physical sections 170, and this may be beneficial for quicker downloading.

To use downloads for real-time viewing, user selects media content 102 from a menu presented by a media content 102 source, such as distribution service 120, media content servers 376, or any other source such as other e-PVRs 110b. When the media package is selected for viewing, e-PVR 110 downloads media package 106 and stores it locally as media package 306. At this time, media package 306 may or may not contain media content 302, and if not, only space for it can be reserved. Alternately, it may contain only a portion of the media content 302. At frequent intervals, e-PVR 110 polls the source and requests a checksum, size, date code or other information about the media content 102 or if appropriate the next (or first) section 170. If this is different from the information within media package 306 (for example if section 170 was empty or had only a place holder, or even if it was complete, but different from the current version on the source), it downloads the portion of media content 102 (for example a section 170) that has changed. If this is a first section, it can then be presented to the user. Meanwhile, a counter or location within e-PVR 110 is updated so that it is aware of the next section 170 or portion of media content 102 that needs to be downloaded. Again, e-PVR 110 continues to poll the source as described above and the process repeats until the whole of the media package 306 with updated media content 102 is downloaded and an end of file marker message is reached and received by e-PVR 110.

For traditional video broadcast and streaming video capture there are similarities as well as differences. For these two modes, as the video is received, it is analyzed and encoded into a digital format such as MPEG4 for example. It may additionally be encrypted as described in embodiments one through four and then incorporated into media package 306 as media content 302. Additionally, media information 304 may simultaneously be created including the creation of section flags 136 to define sections 170 . . . 170n. This may be done simultaneously while it is being presented to user 112 on presentation device 274, or it may happen in the background as content is being recorded for later presentation. Depending on the processing power, memory and other features of the e-PVR 110, and the characteristics of the media content 102 being captured, it may not be possible to capture, encode, section and encrypt the video in real time. In such cases, the video may be captured to a temporary file and processed later by e-PVR 110.

In those cases where it is possible to analyze the video in real-time, e-PVR 110 may skip those portions of the video input that it is able to identify as commercials not belonging to main media content 302. Alternately, it can pause the playing of the media content 102 while it displays locally available informative messages 312 instead of or in addition to the commercials broadcast with the media content 102. User 112 may use remote control 280 to disable this feature at any time and enable it again when needed. The preferences can be setup by user 112 so that the feature remains disabled when disabled by user 112 or alternately, user 112 may have to disable it for each program. In order to use this feature, however, sections 170 of media content 102 need to be recognized by the application software 180.

In one scenario, section information can be automatically generated by assigning sections based on significant changes in the video content. Presumably such changes in the video will also represent changes in the substantive content such as changes in the story, interactions of the characters or venue within a program. Such boundaries are ideal for section data 172 and section information 174, as well as for inserting informative messages 312. Scenes are the most common natural sections of any program, although there can be others; so hereafter this description may refer to these natural sections as scenes or scene changes for the sake of clarity, although any natural sections can be created with these methods.

Hence, scene changes can be sensed automatically and embodied as section flags 136 which define one or more sections 170 corresponding to those scenes. Alternately, sections 170 . . . 170n can be derived from codes embedded in the video by "participating" owners 132. Other information about the video can also be derived from the embedded codes and saved as media information 304 as part of media package 306. The codes can also identify sections 170 that are part of the media content 302 and those that are not (for example commercials broadcast over TV at intervals within the main content 302), for example, by providing unique IDs for the sections and no unique IDs for the commercials. The methods for recognizing and using embedded codes are described under "Recording Media Content from Video Input" elsewhere in this description.

Yet another way of creating sections for the created media content 302 is by simply downloading media information 104 from distribution service 120 and incorporating it into media package 306 as media information 304. In order to do this, media content 302 must be recognized by distribution service 120 (for example by embedding media content identifier 130 in the transmission) and the methods for this are also described under "Recording Media Content from Video Input" elsewhere in this description.

e-PVR 110 may remove or delete portions of the video input that it is able to identify as commercials not belonging to main media content 302. Thus the media content 102 can be saved as media content 302 in real-time or later, with commercials already removed. However, in one embodiment, all of the content is stored, and the user may edit the media package 306 using media creation, editing and enhancement software 272 to further refine the results of automatic section detection. Thus user 112 may move, add or delete one or more section data 172 to remove the commercials for example, however, this may result in the media content 302 becoming non-distributable as described in embodiment four.

e-PVR 110 also allows input through Streaming Video protocols. This may include, as described earlier, streaming video source 382 providing a Multicast or Unicast stream over network 150. During input, the streaming video is captured into the media package 306. In a manner similar to that described above, streaming video input may be recorded and stored. As the stream is received over the network interface 256, it is analyzed and encoded into a digital format such as MPEG4 for example. It may additionally be encrypted as described in embodiments one through four and then incorporated into media package 306 as media content 302. Additionally, media information 304 may simultaneously be created including the creation of section flags 136 to define sections 170 . . . 170*n*. These processes may occur while the content is being presented to user 112 on presentation device 274, or it may happen in the background as content is being recorded for later presentation. Depending on the processing power, memory and other features of the e-PVR, and the characteristics of the media content 102 being captured, it may not be possible to capture, encode, section and encrypt the video in real time. In such cases, the video may be captured to a temporary file and processed later by e-PVR 110.

In those cases where it is possible to analyze the video in real-time, e-PVR 110 may skip those portions of the video input that it is able to identify as commercials not belonging to main media content 302. Alternately, it can pause the playing of the media content 102 while it displays locally available informative messages 312 instead.

There are some difference between the presentation of Streaming Video and traditional video using e-PVR 110. In order to provide the best experience to user 112, the network bandwidth can be managed so that a sufficient amount is available to the stream being viewed and the content can be watched without jerkiness and other problems typical in streaming video. Typically, the input will be "buffered", so that e-PVR 110 always has some media content 302 that can played while the next part of the content is being obtained.

The bandwidth management system will allocate bandwidth to several processes. For example, the process representing the Internet "channel" showing the streaming video being watched will be allocated the majority of the bandwidth. This may be controlled by various defaults and user preferences obtained from user list 333 preferences/profiles 334, but may also be read from a system configuration file. The streaming video source may also supply a recommended bandwidth that can be used by e-PVR 110. However, other "favorite channels" are presumably also simultaneously being recorded or downloaded, so the remaining bandwidth is allocated (typically equally) to those processes as well. This is done so that if a user 112 changes to a different Internet Channel, there is an existing buffer that is then played. Also, the new "channel" to which the user has switched becomes the current channel and is allocated the majority of the bandwidth.

When any program finishes, the user will typically interact with a menu, in order to choose a new show or the rating level etc. of the next cued up show on the same channel. The system displays a message on the screen asking the user for some input. User will typically provide a response using remote control 280 or other input devices 286. If there is no input, the system then assumes that no one is watching, confirms this with a message on the screen, and then pauses the display. It then reallocates the bandwidth—dividing it among other channels instead of favoring the current channel and this is presumably done equitably for all channels. However, in some cases e-PVR 110 may allocate bandwidth unequally even when user 112 is not viewing any channels for example in order to download more content from favorite channels.

In all of these modes, media content 102 received from the respective source is likely to be encrypted and it can be decrypted using decryption information 138. Hence the preferred process for obtaining keys and payment is described under the first embodiment for all real-time viewing. However, once the media content 302 is stored locally or in some cases when it is identified based on embedded media content identifier 130, it may obtain service keys or local keys or both and thus fall under the provisions of the other embodiments.

The invention claimed is:

1. A method to securely distribute media content with associated media information as part of a media package in a media distribution system, the method comprising the steps of:
   a) encrypting the media content prior to distribution and storing it as part of the media package so that it can be decrypted using a program key;
   b) encrypting the program key using a first set of local hardware identifiers available on a first digital system and creating local decryption information that is used with the first set of local hardware identifiers to decrypt the encrypted program key;
   c) storing the locally encrypted program key and local decryption information in the media package;
   d) transferring the media package to an e-PVR in a second digital system with a second set of local hardware identifiers when presentation of the media content is requested by a user;
   e) attempting to decrypt the locally encrypted program key using the local decryption information and the second set of local hardware identifiers; and
   f) failing to decrypt the locally encrypted program key when first and second set of local identifiers is not the same and the first and second digital system is not the same, and succeeding when the first and second digital system is the same and the first and second hardware identifiers are the same, and when successful presenting the media content.

2. The method of claim 1 wherein the step of encrypting the program key using a first set of local hardware identifiers includes using media access control addresses of multiple devices on the local digital system as the hardware identifiers.

3. The method of claim 1 where the step of attempting to decrypt the encrypted program using local hardware identifiers involves using a common local library.

4. The method of claim 1 further including the steps of: a) determining that a threshold has been reached; b) attempting to decrypt the local encrypted program key; c) determining that the locally encrypted program key was decrypted and obtaining the program key; d) re-encrypting the program key using the first set of local hardware identifiers available on the first local digital system so that the re-encrypted program key is not the same as the locally encrypted program key and creating new local decryption information that is used with the first set of local hardware identifiers to decrypt the re-encrypted program key; and e) storing the re-encrypted program key and the new local decryption information in the media package to replace the locally encrypted program key and local decryption information respectively.

5. The method of claim 1 also including the step of requiring that a payment be made prior to e-PVR decrypting the encrypted portion of media package prior to presenting the stored media content and when the second digital system is the same as the first digital system, the step of decrypting the portion of media package does not require a payment.

6. A method to ensure the security of a media package which includes a first decryption information used to decrypt a first encrypted portion of media package, when distributed by a media distribution service and received and stored by an e-PVR by using communication with the media distribution system, the method comprising the steps of: a) determining that a threshold has been reached; b) selecting the first encrypted portion of media package; c) sending a decryption request message including a least a portion of the media information to the distribution service and receiving a re-encryption message; d) using the re-encryption message to re-encrypt the first encrypted portion of the media package with a new encryption process, thus creating a second encrypted portion of the media package; e) storing the second encrypted portion of the media package in the media package on the storage device to replace the first encrypted portion of media package; and f) replacing first decryption information with a second decryption information needed to decrypt the second encrypted portion of the media package.

7. The method of claim 6, where the step of using the re-encryption message to replace the encrypted portion of the media package with a second encrypted portion of the media package further includes the steps of: a) using the re-encryption message to decrypt the first encrypted portion of the media package to reveal an unencrypted portion of the media package; b) using the re-encryption message to re-encrypt the unencrypted portion of the stored media package as the second encrypted portion of media package.

8. The method of claim 6, where the step of using the re-encryption message to replace the encrypted portion of the media package with a second encrypted portion of the media package instead substitutes the step of using the re-encryption message to re-encrypt the encrypted portion of the stored media package as the second encrypted portion of media package without decrypting the first encrypted portion and appending the second decryption information to the first decryption information.

9. The method of claim 6 where the step of determining that a threshold has been exceeded includes testing that a condition has been met and the condition is selected from the list of an elapsed time, a presentation count related to the number of times the media content has been presented by the e-PVR, a randomly selected time, a change to a common local library of the e-PVR, a change to a list of local hardware identifiers, and a re-encryption command sent by the media distribution service.

10. The method of claim 6 also including the step of requiring that a payment be made prior to e-PVR decrypting the encrypted portion of media package prior to presenting the stored media content and when the step of determining that a threshold has been exceeded, the step of decrypting the portion of media package does not require a payment.

11. The method of claim 6 further including the steps of: a) encrypting the media content; b) providing a program key that is used to decrypt the media content; c) encrypting the program key arid storing it in the media package as the first encrypted portion of media package; d) providing and storing decryption information as part of media package, where the decryption information is used to decrypt the encrypted program key; e) including the decryption information as part of the decryption request messages sent to the distribution service.

12. The method of claim 6 further including the step of storing a decryption description under control of the distribution service where the decryption description is part of the re-encryption message received by the e-PVR.

13. A method to securely distribute media content with associated media information as part of a media package in a media distribution system, the method comprising the steps of: a) encrypting the media content prior to distribution and storing it as part of the media package so that it can be decrypted using a program key; b) encrypting the program key as a service encrypted program key so that the service encrypted program key can only be decrypted using a decryption message from a distribution service and storing the service encrypted program key as part of the media package; c) receiving the media package by an e-PVR in response to a request by a user for presentation of the media content, the e-PVR being part of a first digital system and storing the media package; d) decrypting the service encrypted program key revealing the program key and encrypting the program key as a locally encrypted program key so that the locally encrypted program key can only be decrypted by devices that are part of the first digital system and can only be decrypted within the parameters of associated digital rights rules and storing the locally encrypted program key and encrypted digital rights rules as part of the media package; e) decrypting the locally encrypted program key when the media package is on the first digital system to reveal the program key; and f) decrypting the service encrypted program key when the media package is on a second digital system to reveal the program key; g) using the program key to decrypt and present media content.

14. The method of claim 13 further including prior to the initial step of decrypting the service encrypted program key the steps of: a) creating service decryption information to assist with the decryption of the service encrypted program key and storing the service decryption information as a part of the media package; b) sending a decryption request message from the first e-PVR to a distribution service where the decryption request message includes the service decryption information and a payment method and if required, a payment by a user of the first e-PVR; c) receiving by the first e-PVR a decryption message sent from the distribution service; and d) using the decryption message by the first e-PVR to enable the decryption of the service encrypted program key revealing the program key.

15. The method of claim 13 where the step of encrypting the program key as the locally encrypted program key includes the steps of encrypting the program key by the first e-PVR using a first set of local hardware identifiers and creating local decryption information that is used with the first set of local hardware identifiers to decrypt the locally encrypted program key and where a second e-PVR in a second digital system does not share the local hardware identifiers and so cannot decrypt the local encrypted program key.

16. The method of claim 13 wherein the step of decrypting the service encrypted program key when the media package is on a second digital system to reveal the program key includes the step of encrypting the program key as a locally encrypted program key so that locally encrypted program key can only be decrypted by devices that are part of the second digital system and can only be decrypted in association with local decryption information and digital rights rules and storing the locally encrypted program key, local decryption information and encrypted digital rights rules as part of the media package.

17. The method of claim 13 wherein the step of encrypting the program key as a locally encrypted program key uses a set of local hardware identifiers.

18. The method of claim 17 where the step of using local hardware identifiers involves using media access control addresses of multiple devices on the local digital system as the hardware identifiers.

19. The method of claim 17 wherein the step of encrypting the program key as a locally encrypted program key using local hardware identifiers involves using a common local library.

20. A method to securely distribute media content with associated media information as part of a media package in a media distribution system, the method comprising the steps of: a) encrypting the media content prior to distribution and storing it as part of the media package; b) creating a program key that is used to decrypt the media content; c) encrypting the program key to create a service encrypted program key and creating service decryption information that is used with a decryption description to decrypt the encrypted program key, storing the service encrypted program key and service decryption information in the media package; d) transferring the media package to a first e-PVR in a first digital system with a first set of local hardware identifiers when a user has requested presentation of the media content; e) sending a decryption request message from the first e-PVR to a distribution service where the decryption request message includes the service decryption information and a payment method and if required, a payment by a user of the first e-PVR and receiving by the first e-PVR a decryption message sent from the distribution service; f) using the decryption message by the first e-PVR to enable the decryption of the service encrypted program key revealing the program key; g) encrypting the program key by the first e-PVR using the first set of local hardware identifiers to create a locally encrypted program key and creating local decryption information that is used with the first set of local hardware identifiers to decrypt the locally encrypted program key within the parameters of associated digital rights rules, storing the locally encrypted program key, local decryption information and encrypted digital rights rules in the media package; h) transferring the media package to a second e-PVR on a second digital system with a second set of hardware identifiers; i) selecting the media content for presentation by the second e-PVR and attempting to decrypt the locally encrypted program key using the local decryption information and the second set of local hardware identifiers; j) failing to decrypt the locally encrypted program key when first and second set of local identifiers is not the same and the first and second digital system is not the same, and succeeding when the first and second digital system is the same and the first and second hardware identifiers are the same, and when successful presenting the media content.

21. The method of claim 20 when the second e-PVR has failed to decrypt the locally encrypted program key further including the steps of: a) sending a decryption request message from the second e-PVR to a distribution service where the decryption request message includes the service decryption information and a payment method and if required, a payment by a user of the second e-PVR and receiving by the second e-PVR a decryption message sent from the distribution service; b) using the decryption message by the second e-PVR to enable the decryption of the service encrypted program key revealing the program key; c) encrypting the program key by the second e-PVR using a set of local hardware identifiers to create a locally encrypted program key and creating local decryption information that is used with the set of local hardware identifiers to decrypt the locally encrypted program key within the parameters of associated digital rights rules, storing the locally encrypted program key, local decryption information and encrypted digital rights rules in the media package; and d) using the program key to decrypt and present the media content on the second e-PVR.

22. A method to secure media content where the media content is recorded by a first e-PVR that is part of a first digital system to allow unlimited use on the first digital system and to prevent use by a second e-PVR that is part of a second digital system consisting of the steps of: a) recording the media content by the first e-PVR and storing it as part of a media package; b) encrypting the media content and creating a program key comprising at least a portion of decryption information required to decrypt the media content; c) encrypting the program key so that it can be decrypted only by using information related to the first digital system and storing it in the media package as a local encrypted program key; and d) transferring media package to another e-PVR in the same local digital system; e) decrypting the locally encrypted program key to obtain program key using locally available information; f) using the program key obtained to decrypt media content for presentation.

23. The method of claim 22 further including the steps of: a) transferring the media package to second e-PVR in a second digital system; b) attempting to decrypt the locally encrypted program key using information related to the second digital system; and c) failing to decrypt the locally encrypted program key when the information related to the second digital systems is not the same as the information related to the first digital system.

* * * * *